United States Patent
Lee et al.

(10) Patent No.: US 12,456,165 B2
(45) Date of Patent: Oct. 28, 2025

(54) DISPLAY DEVICE AND METHOD FOR CONTROLLING SAME

(71) Applicant: SAMSUNG ELECTRONICS CO., LTD., Suwon-si (KR)

(72) Inventors: Eunjin Lee, Suwon-si (KR); Kyerim Lee, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 18/073,701

(22) Filed: Dec. 2, 2022

(65) Prior Publication Data

US 2023/0110543 A1  Apr. 13, 2023

Related U.S. Application Data

(63) Continuation of application No. PCT/KR2021/006401, filed on May 24, 2021.

(30) Foreign Application Priority Data

Jul. 1, 2020 (KR) .......................... 1020200081121

(51) Int. Cl.
  *G06T 3/60*  (2024.01)
  *G06F 3/04845*  (2022.01)
  *G06F 3/14*  (2006.01)

(52) U.S. Cl.
  CPC ............ *G06T 3/60* (2013.01); *G06F 3/04845* (2013.01); *G06F 3/14* (2013.01)

(58) Field of Classification Search
  CPC ......... G06T 3/60; G06F 3/04845; G06F 3/14; G06F 2200/1614; G06F 1/1601;
  (Continued)

(56) References Cited

U.S. PATENT DOCUMENTS 8,300,065 B2  10/2012  Kim et al.
8,484,681 B2  7/2013  Koo et al.
(Continued)

FOREIGN PATENT DOCUMENTS

JP  2014-232228 A  12/2014
JP  6257329 B2  1/2018
(Continued)

OTHER PUBLICATIONS

Written Opinion (PCT/ISA/237) issued Aug. 26, 2021 by the International Searching Authority for International Patent Application No. PCT/KR2021/006401.
(Continued)

*Primary Examiner* — Phi Hoang
(74) *Attorney, Agent, or Firm* — Sughrue Mion, PLLC

(57) ABSTRACT

Provided is a display device and a method for controlling same. The display device of the present disclosure may include a display, a communication interface, a motor configured to rotate the display, and a processor configured to control the display to display an image content on the display disposed in a first orientation, display a user interface (UI) for rotating the image content and the display, receive a signal, from an external device through the communication interface while the UI is displayed, for rotating at least one of the image content or the display, and based on the received signal, rotate the image content displayed on the display or control the motor to rotate the display to a second orientation.

19 Claims, 37 Drawing Sheets

(58) Field of Classification Search
CPC ........ G06F 1/16; G06F 16/738; G06F 3/0484;
G06F 3/04812; G06F 16/739; G09G
2340/0442; G09G 2340/0464; G09G
5/38; G09G 2340/0492; F16M 11/10;
H04N 21/8549
See application file for complete search history.

(56) References Cited

U.S. PATENT DOCUMENTS

| | | | |
|---|---|---|---|
| 9,317,899 | B2 | 4/2016 | Sakai |
| 9,628,744 | B2 | 4/2017 | Phang et al. |
| 9,756,126 | B2 | 9/2017 | Miyake |
| 10,192,472 | B1 | 1/2019 | Nocon et al. |
| 10,445,050 | B2 | 10/2019 | Park et al. |
| 10,477,134 | B2 | 11/2019 | Lim et al. |
| 10,955,960 | B2* | 3/2021 | Saito ................ H04N 9/3185 |
| 11,250,544 | B2 | 2/2022 | Jang et al. |
| 2005/0041147 | A1 | 2/2005 | Kim et al. |
| 2005/0114788 | A1* | 5/2005 | Fabritius ............ G06F 1/1626 715/767 |
| 2011/0154406 | A1 | 6/2011 | Koo et al. |
| 2012/0315954 | A1* | 12/2012 | Ahn .................... G09G 5/36 345/173 |
| 2013/0169687 | A1* | 7/2013 | Williamson ........ G06F 1/1626 345/656 |
| 2013/0212484 | A1* | 8/2013 | Joshi ................... G06F 9/541 715/740 |
| 2014/0076475 | A1* | 3/2014 | Galicia ................. B65C 9/42 156/64 |
| 2014/0152695 | A1 | 6/2014 | Ishiwata |
| 2014/0333671 | A1* | 11/2014 | Phang ................. G06F 3/017 345/659 |
| 2014/0354695 | A1 | 12/2014 | Sakai |
| 2014/0358981 | A1 | 12/2014 | Miyake |
| 2015/0009237 | A1* | 1/2015 | Sirpal .................... G06T 3/00 345/659 |
| 2016/0162270 | A1* | 6/2016 | Kumar ............... G06F 3/04842 717/177 |
| 2018/0060015 | A1 | 3/2018 | Park et al. |
| 2018/0107354 | A1* | 4/2018 | Wheeler .............. G06F 3/0482 |
| 2018/0199001 | A1 | 7/2018 | Lim et al. |
| 2018/0232506 | A1* | 8/2018 | Kumar .................. G06F 21/62 |
| 2020/0177934 | A1 | 6/2020 | Park et al. |

FOREIGN PATENT DOCUMENTS

| | | |
|---|---|---|
| KR | 10-0580174 B1 | 5/2006 |
| KR | 10-2009-0126374 A | 12/2009 |
| KR | 10-2011-0069564 A | 6/2011 |
| KR | 10-2014-0133363 A | 11/2014 |
| KR | 10-2017-0000714 A | 1/2017 |
| KR | 10-2017-0118318 A | 10/2017 |
| KR | 10-2018-0024501 A | 3/2018 |
| KR | 10-2018-0057473 A | 5/2018 |
| KR | 10-2018-0082812 A | 7/2018 |
| KR | 10-2019-0017614 A | 2/2019 |

OTHER PUBLICATIONS

Search Report (PCT/ISA/210) issued Aug. 26, 2021 by the International Searching Authority for International Patent Application No. PCT/KR2021/006401.

Communication issued on Aug. 5, 2024 by the Korean Intellectual Property Office for Korean Patent Application No. 10-2020-0081121.

Communication dated Feb. 13, 2025, issued by the Korean Patent Office in Korean Application No. 10-2020-0081121.

* cited by examiner (1)

(2)

(3)

(4)

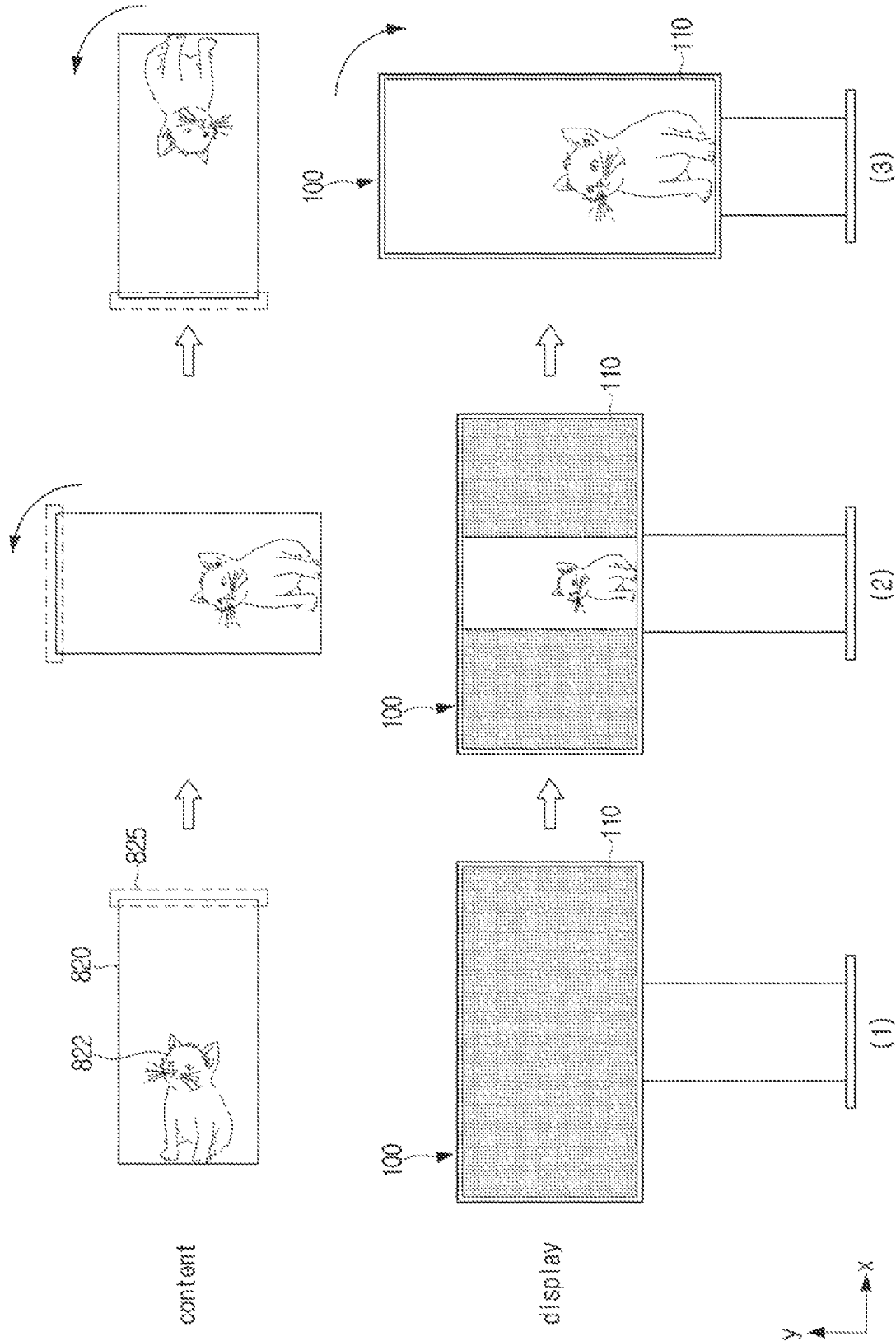

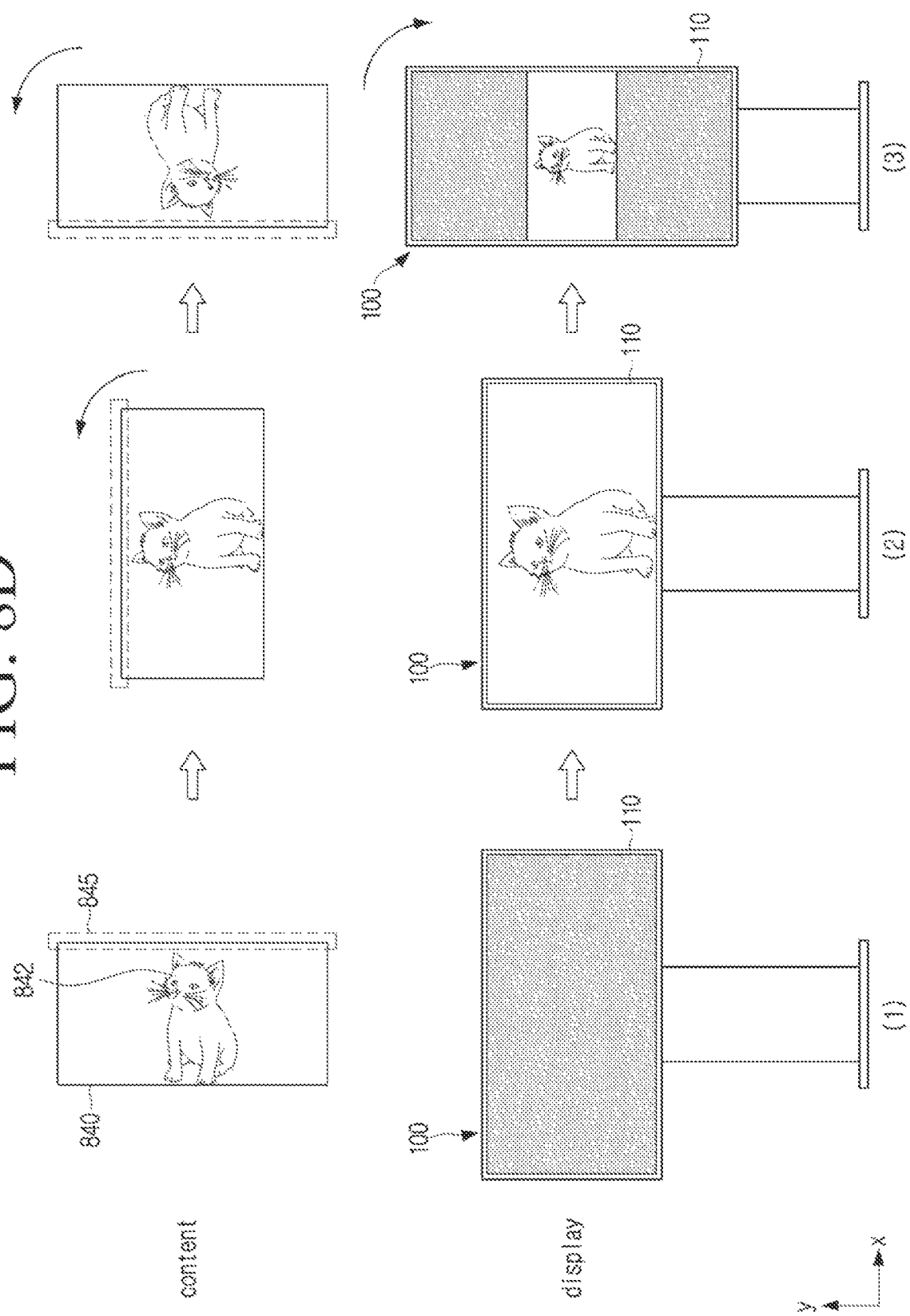

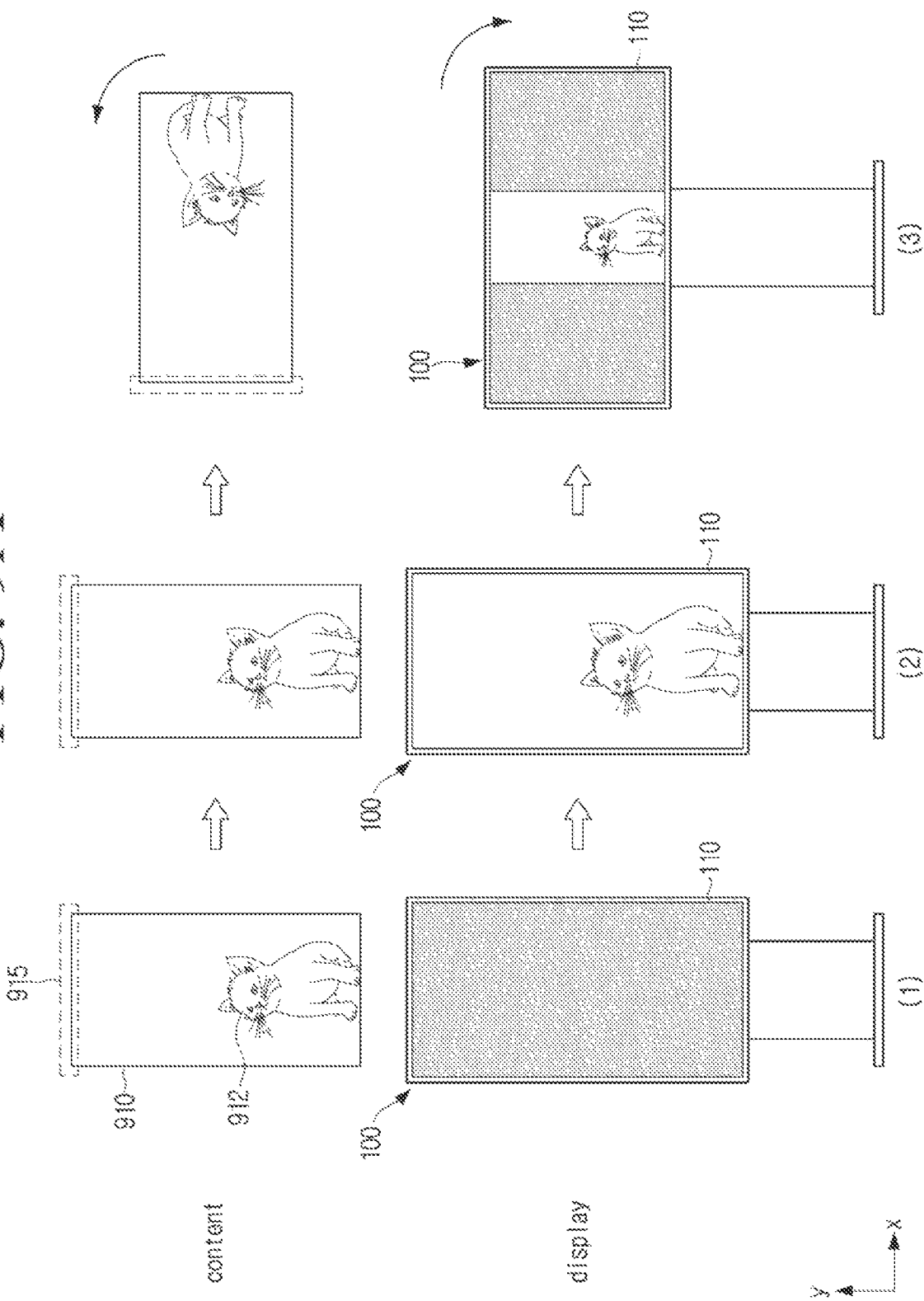

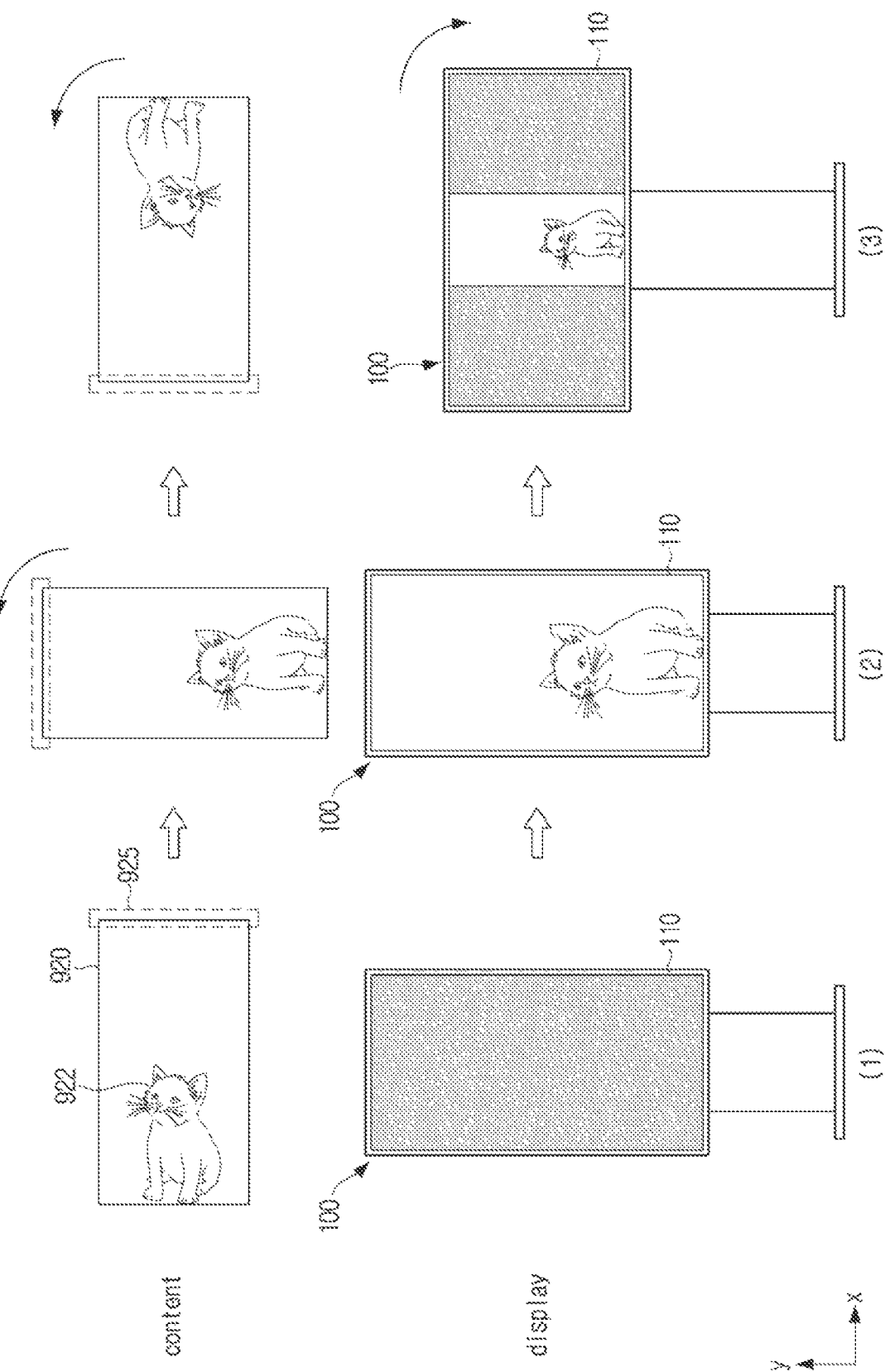

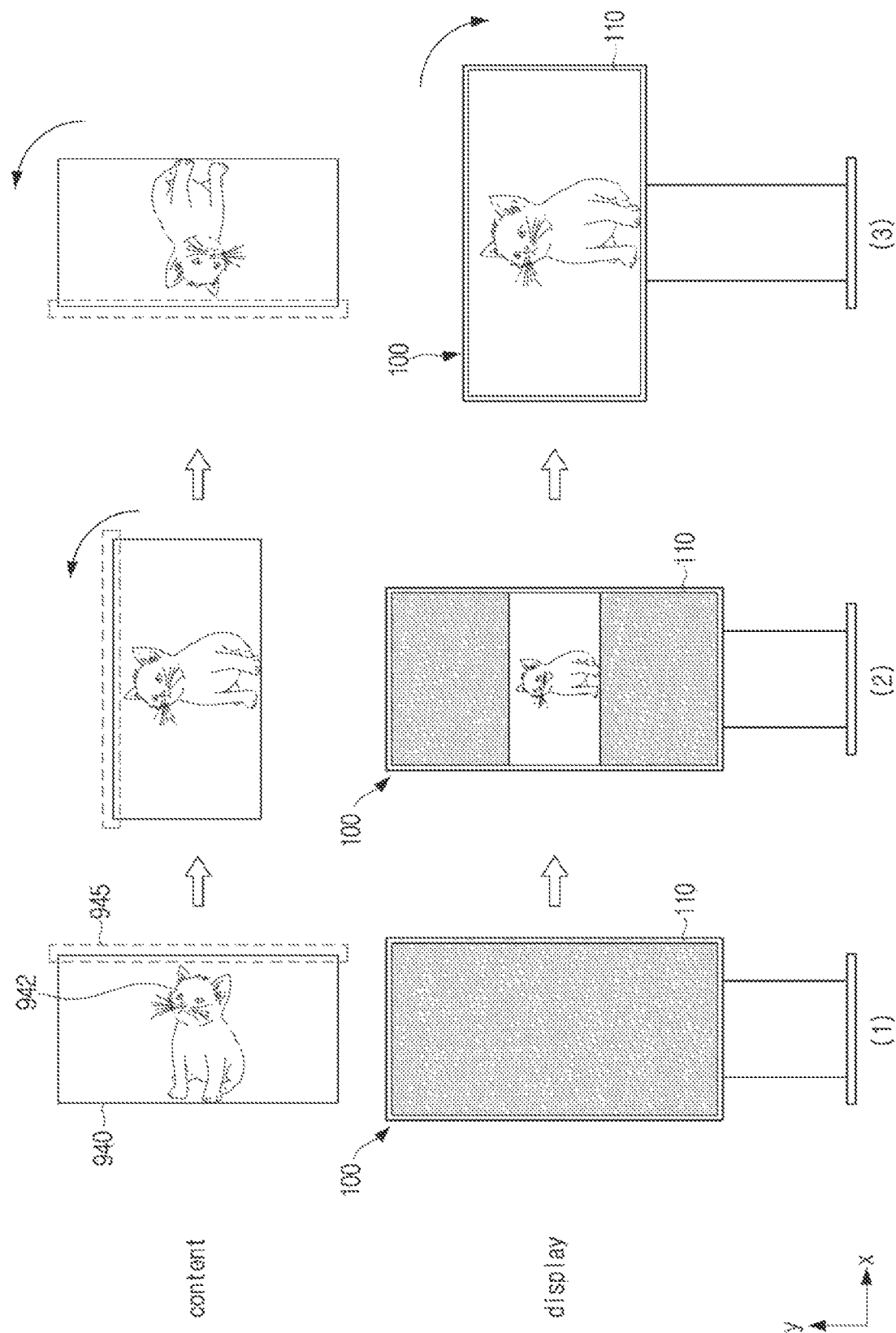

| USER INPUT | FIRST FUNCTION | SECOND FUNCTION(OPTION) |
|---|---|---|
| ONE SHORT INPUT OF KEY (LESS THAN PREDETERMINED TIME) | - ROTATE DISPLAY BY 90 DEGREES IN CLOCKWISE (OR COUNTERCLOCKWISE) DIRECTION | - ROTATE IMAGE CONTENT BY 90 DEGREES IN CLOCKWISE (OR COUNTERCLOCKWISE) DIRECTION |
| ONE LONG PRESS INPUT OF KEY (PREDETERMINED TIME OR MORE) | - ROTATE IMAGE CONTENT BY 90 DEGREES IN CLOCKWISE (OR COUNTERCLOCKWISE) DIRECTION<br>- ROTATE IMAGE CONTENT BY 90 DEGREES IN CLOCKWISE (OR COUNTERCLOCKWISE) DIRECTION WHENEVER KEY INPUT TIME ELAPSES PREDETERMINED TIME INTERVAL | - ROTATE DISPLAY BY 90 DEGREES IN CLOCKWISE (OR COUNTERCLOCKWISE) DIRECTION<br>- ROTATE DISPLAY BY 90 DEGREES IN CLOCKWISE (OR COUNTERCLOCKWISE) DIRECTION WHENEVER KEY INPUT TIME ELAPSES PREDETERMINED TIME INTERVAL |
| ONE INPUT OF KEY FOR PREDETERMINED TIME | - ROTATE DISPLAY BY 90 DEGREES IN CLOCKWISE (OR COUNTERCLOCKWISE) DIRECTION | - ROTATE IMAGE CONTENT BY 90 DEGREES IN CLOCKWISE (OR COUNTERCLOCKWISE) DIRECTION |
| TWICE INPUT OF KEY FOR PREDETERMINED TIME | - ROTATE IMAGE CONTENT BY 90 DEGREES IN CLOCKWISE (OR COUNTERCLOCKWISE) DIRECTION | - ROTATE DISPLAY BY 90 DEGREES IN CLOCKWISE (OR COUNTERCLOCKWISE) DIRECTION |
| POINT EXTERNAL DEVICE LEFT/RIGHT WHILE KEY IS INPUT | - ROTATE IMAGE CONTENT BY 90 DEGREES IN CLOCKWISE (OR COUNTERCLOCKWISE) DIRECTION | - ROTATE DISPLAY BY 90 DEGREES IN CLOCKWISE (OR COUNTERCLOCKWISE) DIRECTION |
| POINT EXTERNAL DEVICE (UP/DOWN) WHILE KEY IS INPUT | - ROTATE IMAGE CONTENT BY 90 DEGREES IN CLOCKWISE (OR COUNTERCLOCKWISE) DIRECTION | - ROTATE DISPLAY BY 90 DEGREES IN CLOCKWISE (OR COUNTERCLOCKWISE) DIRECTION |

DISPLAY DEVICE AND METHOD FOR CONTROLLING SAME

CROSS-REFERENCE TO RELATED APPLICATIONS

This application is a bypass continuation application of International Application No. PCT/KR2021/006401, filed on May 24, 2021, which claims priority to Korean Patent Application No. 10-2020-0081121, filed on Jul. 1, 2020, the disclosures of which are herein incorporated by reference in their entireties.

BACKGROUND

1. Field

The present disclosure relates to a display device and a method for controlling the same, and more particularly, to a display device which may rotate a display and a method for controlling the same.

2. Description of Related Art

A general display device, such as a television (TV) or a monitor, may be disposed in a landscape orientation having a ratio in which a width is longer than a height (e.g., 16:9 or 16:10), and may be optimized to display an image content of a landscape type having a ratio in which a width is longer than a height (i.e., type in which a long axis is oriented in a horizontal direction and a short axis is oriented in a vertical direction).

The display device of this type may display an image content of a portrait type having a ratio in which the height is longer than the width (i.e., type in which the long axis is oriented in the vertical direction and the short axis is oriented in the horizontal direction). In this case, a blank (e.g., left and right blanks or letterbox) in which no image content is displayed may occur on a screen of the display device depending on the ratio of the image content. Alternatively, a blank (e.g., upper and lower blanks or pillarbox) may occur in case that the display device disposed in a portrait orientation displays the image content of the landscape type. Accordingly, the image content may be displayed only on a partial area of the display instead of an entire area thereof, and a user in viewing may thus have lower immersion and a lower visibility of visual information.

In this case, there are methods such as removing a portion of the image content (e.g., cropping) or enlarging the image content to match the ratio (or aspect ratio) of the image content to the ratio (or aspect ratio) of the display to prevent the occurrence of the blank, which may result in loss of a portion of the image content or provide the user viewing the image content with a poor viewing experience.

In addition, the display device may display the image content in a specific direction on the basis of the type (e.g., landscape type or portrait type) of the image content or content resolution information (e.g., width 1920×height 1080 or width 1080×height 1920) of the image content. In this case, a direction of an object included in the image content and the direction of the display may not match each other.

For example, in case of the image content (width 1080×height 1920) produced in the portrait type, its object may also be disposed in a direction corresponding to the portrait type. Here, in order to display the image content without a blank, the display device disposed in the landscape orientation (e.g., width 1920×height 1080) may display the image content of the portrait type (width 1080×height 1920) by rotating the same by 90 degrees to the image content of the landscape type (e.g., width 1920×height 1080). In this case, the object may be displayed on the display as lying down rather than in a normal direction.

For another example, the user may capture an object (e.g., human or text) for the upper or lower end portion of the object to be oriented toward a long axis of an image in a state where a camera device is set to take the image in the landscape type or the user may capture the object for the upper or lower end portion of the object to be oriented toward a short axis of the image in a state where the camera device is set to take the image in the portrait type. In this case, the object may be displayed as lying down on the display rather than in the normal direction.

As such, the object such as an animal or the text included in the image content may not be viewed in the normal direction, and may be viewed as lying down or upside down.

SUMMARY

Provided is a display device which may display an image content optimized in a normal direction and a method for controlling the same.

In accordance with an aspect of the disclosure, a display device includes: a display; a communication interface; a motor configured to rotate the display; and a processor configured to: control the display to display an image content on the display disposed in a first orientation, display a user interface (UI) for rotating the image content and the display, receive a signal, from an external device through the communication interface while the UI is displayed, for rotating at least one of the image content or the display, and based on the received signal, rotate the image content displayed on the display or control the motor to rotate the display to a second orientation.

The processor may be further configured to: based on the received signal being for rotating the image content, rotate the image content displayed on the display in a clockwise direction or a counterclockwise direction and maintain the display in the first orientation; and based on the received signal being for rotating the display, rotate the display in the clockwise direction or the counterclockwise direction for the display to be disposed in the second orientation and maintain a direction of the image content displayed on the display disposed in the first orientation.

The UI may include a first object for rotating the image content by 90 degrees in a clockwise direction, a second object for rotating the image content by 90 degrees in a counterclockwise direction, a third object for rotating the display by 90 degrees in the clockwise direction, and a fourth object for rotating the display by 90 degrees in the counterclockwise direction.

The processor may be configured to, based on the received signal being for selecting an object among the first object, the second object, the third object and the fourth object, rotate the image content or rotate the display by 90 degrees in a direction corresponding to the selected object.

The first object may include a preview image in which the image content may be rotated by 90 degrees in the clockwise direction and is displayed on the display disposed in the first orientation, the second object may include a preview image in which the image content may be rotated by 90 degrees in the counterclockwise direction and is displayed on the display disposed in the first orientation, the third object may include a preview image in which the image content may be displayed on the display rotated by 90 degrees in the clockwise direction and disposed in the second orientation, and the fourth object may include a preview image in which the image content may be displayed on the display rotated by 90 degrees in the counterclockwise direction and disposed in the second orientation.

The first object, the second object, the third object, and the fourth object are displayed on the display to correspond to an arrangement of a plurality of direction keys of the external device, and the processor may be further configured to: based on the received signal indicating a direction key among the plurality of direction keys is selected, identify an object corresponding to a selected direction key among the first object, the second object, the third object, and the fourth object; and rotate the image content or the display by 90 degrees in a direction corresponding to the identified object.

The processor may be configured to: display a cursor on an object among the first object, the second object, the third object, and the fourth object; based on the received signal indicating that a direction key among a plurality of direction keys is selected, move the cursor displayed on the object to another object positioned in a direction corresponding to the selected direction key; and based on the received signal being for selecting the object on which the cursor is displayed, rotate the image content or the display by 90 degrees in a direction corresponding to the object on which the cursor is displayed.

The first orientation may be a portrait orientation or a landscape orientation, and the second orientation may be the landscape orientation in a case that the first orientation is the portrait orientation, and the second orientation may be the portrait orientation in a case that the first orientation is the landscape orientation.

In accordance with an aspect of the disclosure, a method for controlling a display device, the method includes: displaying an image content on a display disposed in a first orientation; displaying a user interface (UI) for rotating the image content and the display on the display; receiving a signal, from an external device while the UI is displayed, for rotating at least one of the image content or the display; and based on the received signal, rotating the image content displayed on the display or rotating the display to a second orientation.

The rotating of the image content or the display may include: based on the received signal being for rotating the image content, rotating the image content displayed on the display in a clockwise direction or a counterclockwise direction and maintaining the first orientation; and based on the received signal being for rotating the display, rotating the display in the clockwise direction or the counterclockwise direction for the display to be disposed in the second orientation and maintaining a direction of the image content displayed on the display disposed in the first orientation.

The UI may include a first object for rotating the image content by 90 degrees in a clockwise direction, a second object for rotating the image content by 90 degrees in a counterclockwise direction, a third object for rotating the display by 90 degrees in the clockwise direction, and a fourth object for rotating the display by 90 degrees in the counterclockwise direction.

The rotating of the image content or the display, based on the received signal being for selecting an object among the first object, the second object, the third object and the fourth object, the image content or the display may be rotated by 90 degrees in a direction corresponding to a selected object.

The first object may include a preview image in which the image content may be rotated by 90 degrees in the clockwise direction and is displayed on the display disposed in the first orientation, the second object may include a preview image in which the image content may be rotated by 90 degrees in the counterclockwise direction and is displayed on the display disposed in the first orientation, the third object may include a preview image in which the image content may be displayed on the display rotated by 90 degrees in the clockwise direction and disposed in the second orientation, and the fourth object may include a preview image in which the image content may be displayed on the display rotated by 90 degrees in the counterclockwise direction and disposed in the second orientation.

The first object, the second object, the third object, and the fourth object are displayed on the display to correspond to an arrangement of a plurality of direction keys of the external device, and in the rotating of the image content or the display, based on the received signal indicating a direction key among the plurality of direction keys is selected, an object corresponding to a selected direction key among the first object, the second object, the third object, and the fourth object may be identified, and the image content or the display may be rotated by 90 degrees in a direction corresponding to the identified object.

The rotating of the image content or the display may include displaying a cursor on an object among the first object, the second object, the third object, and the fourth object, based on the received signal indicating that a direction key among a plurality of direction keys is selected, moving the cursor displayed on the object to another object positioned in a direction corresponding to the selected direction key, and based on the received signal being for selecting the object on which the cursor is displayed, rotating the image content or the display by 90 degrees in a direction corresponding to the object on which the cursor is displayed.

In accordance with an aspect of the disclosure, a display device includes: a display; and a processor configured to: identify a first orientation of an image content; identify a second orientation of the display; receive a signal, from an external device, for rotating at least one of the image content or the display, and based on receiving the signal and identifying that the first orientation may be different than the second orientation, rotate the image content displayed on the display or control a motor to rotate the display to the first orientation.

The processor may be further configured to: based on identifying the first orientation is 90 degrees different than the second orientation in a clockwise direction, rotate the image content in a counterclockwise direction; and based on identifying the first orientation is 90 degrees different than the second orientation in the counterclockwise direction, rotate the image content in the clockwise direction.

The display may include a user interface for selecting a direction to rotate the image content or the display.

In accordance with an aspect of the disclosure, a non-transitory computer readable storage medium having instructions stored thereon which, when executed by a processor of a server, cause the processor to execute the instructions to implement: displaying an image content on a display disposed in a first orientation; displaying a user interface (UI) for rotating the image content and the display on the display; receiving a signal, from an external device while the UI is displayed, for rotating at least one of the image content or the display; and based on the received signal, rotating the image content displayed on the display or rotating the display to a second orientation.

The processor may be further configured to execute the instructions to implement: based on the received signal being for rotating the image content, rotating the image content displayed on the display in a clockwise direction or a counterclockwise direction and maintaining the first orientation; and based on the received signal being for rotating the display, rotating the display in the clockwise direction or the counterclockwise direction for the display to be disposed in the second orientation and maintaining a direction of the image content displayed on the display disposed in the first orientation.

According to one or more embodiments, it is possible to provide the display device which may display the image content optimized in the normal direction and the method for controlling the same.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8B is a view illustrating the operation of the display device in a state where the display is disposed in the landscape orientation according to an embodiment;

FIG. 8B is a view illustrating an operation of the display device in a state where the display is disposed in the landscape orientation according to an embodiment;

FIG. 8D is a view illustrating an operation of the display device in a state where the display is disposed in the landscape orientation according to an embodiment;

FIG. 9A is a view illustrating an operation of the display device in a state where the display is disposed in a portrait orientation according to an embodiment;

FIG. 9B is a view illustrating an operation of the display device in a state where the display is disposed in the portrait orientation according to an embodiment;

FIG. 9D is a view illustrating an operation of the display device in a state where the display is disposed in the portrait orientation according to an embodiment;

FIG. 18C is a view illustrating a user command for controlling the rotation of the display or image content according to an embodiment;

DETAILED DESCRIPTION

Figure 1:
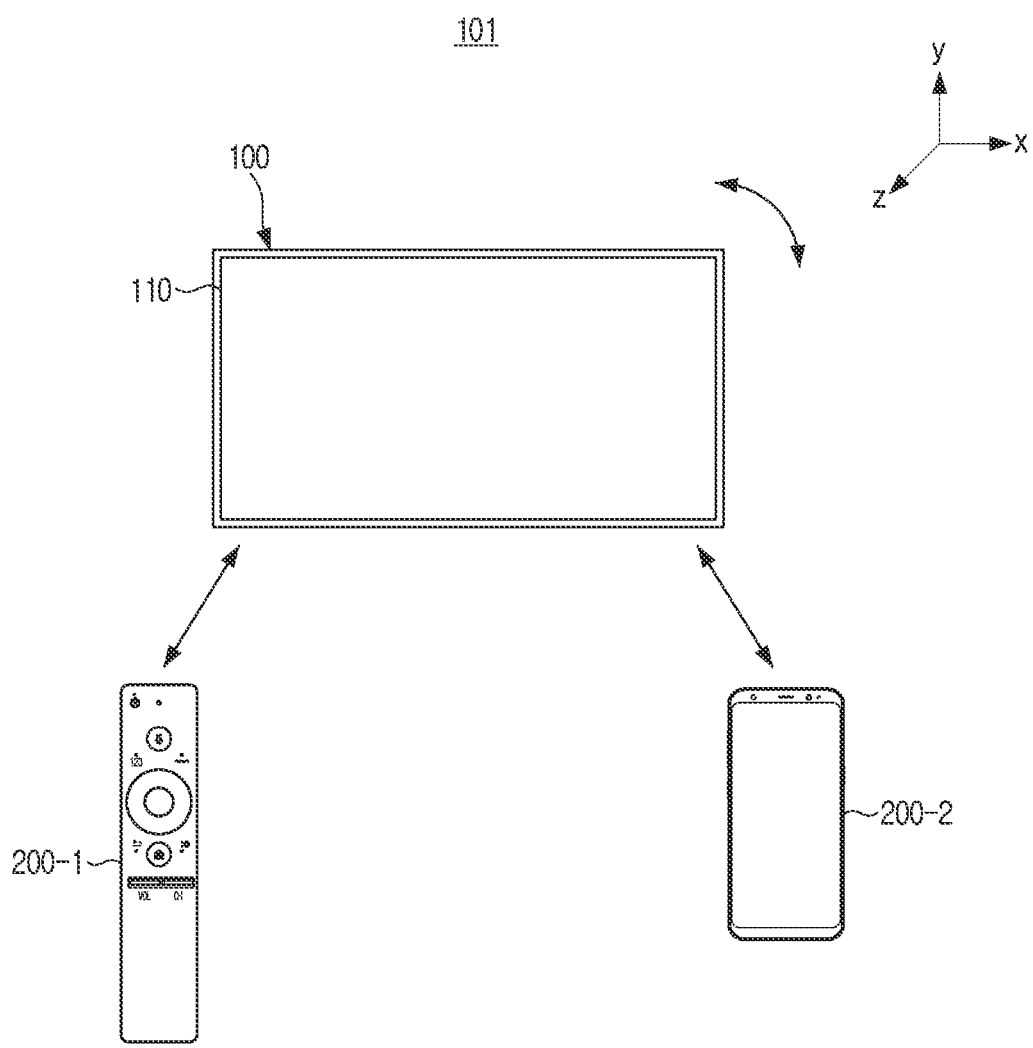
FIG. 1 is a view illustrating a system according to an embodiment.

The embodiments described below do not represent all technical aspects of the disclosure. It should be understood that various equivalents or variations that may be substituted for them at the time of the present application belong to the scope of rights of the disclosure.

If a detailed description for the functions or configurations related to the present disclosure may unnecessarily obscure the gist of the present disclosure, the detailed description may be omitted. In addition, the following embodiments may be modified in several different forms, and the scope and spirit of the disclosure are not limited to the following embodiments. Rather, these embodiments are provided to make the present disclosure thorough and complete, and to completely transfer the spirit of the present disclosure to those skilled in the art.

However, it is to be understood that technologies mentioned in the present disclosure are not limited to specific embodiments, and include all modifications, equivalents and/or substitutions according to embodiments of the present disclosure. Throughout the accompanying drawings, similar components are denoted by similar reference numerals.

The expressions "first," "second" and the like, used in the present disclosure may indicate various components regardless of a sequence and/or importance of the components. These expressions are only used in order to distinguish one component from the other components, and do not limit the corresponding components.

In the present disclosure, the expression "A or B," "at least one of A and/or B" or "one or more of A and/or B" or the like, may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

A term of a singular form may include its plural forms unless the context clearly indicates otherwise. It is to be understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In case that any component (for example, a first component) is mentioned to be "(operatively or communicatively) coupled with/to" or "connected to" another component (for example, a second component), it is to be understood that the any component is directly coupled to the another component or may be coupled to the another component through other component (for example, a third component). On the other hand, in case that any component (for example, the first component) is mentioned to be "directly coupled" or "directly connected to" another component (for example, the second component), it is to be understood that the other component (for example, the third component) is not present between any component and another component.

An expression "configured (or set) to" used in the present disclosure may be replaced by an expression "suitable for," "having the capacity to," "designed to," "adapted to," "made to" or "capable of" based on a situation. A term "configured (or set) to" may not necessarily indicate "specifically designed to" in hardware. Instead, an expression "an apparatus configured to" may indicate that the apparatus may "perform-" together with other apparatuses or components. For example, "a processor configured (or set) to perform A, B, and C" may indicate a dedicated processor (for example, an embedded processor) for performing the corresponding operations or a generic-purpose processor (for example, a central processing unit (CPU) or an application processor) which may perform the corresponding operations by executing one or more software programs stored in a memory apparatus.

FIG. 1 is a view illustrating a system according to an embodiment of the present disclosure.

Referring to FIG. 1, a system 101 according to an embodiment of the present disclosure may include a display device 100 and external devices 200-1 and 200-2 each communicating with the display device 100.

The display device 100 may be implemented as any of various display devices such as a television (TV), a smart TV, a monitor, a signage, an electronic picture frame, an electronic blackboard, an electronic table, a laptop computer, an all-in-one display computer, a personal digital assistant (PDA), a portable multimedia player (PMP), a large format display (LFD), a cinema display, an electronic signboard, a tablet PC, a smartphone and a dashboard of a vehicle. However, this device is only an example, and the display device 100 is not limited to the above-described example and may be implemented as any of various electronic devices including a display.

The display device 100 may include a display 110. The display 110 may display an image content. In addition, the display 110 may be rotated. For example, assuming that the display 110 is disposed on an x-y plane as shown in FIG. 1, the display 110 may be rotated based on an x-axis, a y-axis and a z-axis perpendicular thereto as its central axes. Here, the display 110 may be rotated in a clockwise or counter-clockwise direction.

In case of receiving a user command, the display device 100 may perform an operation corresponding to the received user command.

Here, the user command (or a predetermined event) may refer to a trigger of any of various types for the display device 100 to perform a specific operation. For example, the user command may be implemented in any of various ways such as a key input, a touch input, a user voice input and a gesture input. The specific operation may be an operation of rotating the display 110, an operation of locking a direction of the image content displayed on the display 110 or the like. In addition, the specific operation may be an operation of turning on/off power of the display device 100, an operation of changing a channel of a broadcast content, an operation of changing a sound volume or the like.

To this end, the display device 100 may receive the user command. For example, the display device 100 may receive the user command through an input interface (e.g., touch panel, button, jog dial or microphone) included in the display device 100.

Alternatively, the display device 100 may receive the user command from the external device 200-1 or 200-2. For example, as shown in FIG. 1, the first external device 200-1 may be implemented as a remote controller, and the second external device 200-2 may be implemented as the smartphone. However, this device is only an example, and the external device 200-1 or 200-2 may be implemented as any of various external devices such as a keyboard, a mouse, a pen or an artificial intelligence speaker.

To this end, the external device 200-1 or 200-2 may receive the user command through the input interface (e.g., touch panel, button or microphone) positioned in the external device 200-1 or 200-2. In addition, the external device 200-1 or 200-2 may transmit the user command to the display device 100 by using any of various communication methods (e.g., infrared, near field communication (NFC), bluetooth or wi-fi communication) with the display device 100. Here, the external device 200-1 or 200-2 may directly transmit the user command to the display device 100 or transmit the user command to the display device 100 through another electronic device (e.g., server or access point (AP)).

Furthermore, in case that an event occurs in which the external device 200-1 or 200-2 is rotated, the external device 200-1 or 200-2 may transmit information on the occurrence of the event to the display device 100. Here, the display device 100 may be in a mirrored (or remote controlled) state with the external device 200-1 or 200-2. In this case, the display device 100 may rotate the display 110 based on the received information.

Meanwhile, the display device 100 according to an embodiment of the present disclosure may display the image content on the display 110 for an object included in the image content to be oriented in a predetermined direction. Here, a ratio (i.e., aspect ratio) of a width of the image content to a height thereof may be implemented in any of various ratios (e.g., 16:10, 16:9, 10:16 and 9:16).

In addition, the display device 100 may display the object in a normal direction by displaying the image content based on a direction of the object included in the image content, and the display device 100 may also display a size of the image content to correspond to a size of the display 110 by rotation of the display 110. That is, the display device 100 may minimize occurrence of a blank by displaying the image content in an optimized ratio.

Accordingly, the display device 100 may provide a user viewing the image content with an optimized viewing service for the image content. That is, the display device 100 may prevent a lower viewing immersion for the image content and effectively deliver information included in the image content to the user.

Hereinafter, the display device 100 and a method for controlling the same according to embodiments of the present disclosure are described in more detail with reference to the accompanying drawings.

Figure 2:
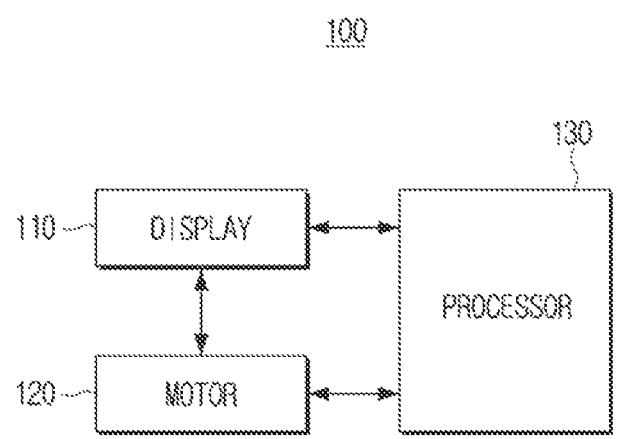
FIG. 2 is a block diagram illustrating a configuration of a display device according to an embodiment.

FIG. 2 is a block diagram illustrating a configuration of a display device according to an embodiment.

Referring to FIG. 2, the display device 100 may include the display 110, a motor 120, and a processor 130.

The display 110 may display the various image contents. Here, the image content may indicate a content including at least one of a still image or a moving image. For a more specific example, the image content may refer to any of various contents which may provide the user with various visual information or effects such as broadcast contents, multimedia contents, photos, texts, documents, animations (e.g., powerpoint or keynote), games, web pages and widgets. Meanwhile, the image content may include data for a plurality of pixels. Here, the data for the plurality of pixels may refer to information indicating specific brightness and color at different positions (or coordinates) in a digital space.

To this end, the display 110 may be implemented in any of various forms such as a liquid crystal display (LCD) that controls light emitted from a backlight unit (e.g., light emitting diode (LED)) through liquid crystal, and a display that uses a self-luminous device (e.g., mini LED having a size of 100 to 200 μm, micro LED having a size of 100 μm or less, organic LED (OLED), quantum dot LED (QLED)) without a separate backlight unit as a light source. In addition, the display 110 may include a plurality of drive circuits corresponding to the plurality of pixels. Here, the drive circuit may be implemented in a form of an amorphous silicon (a-Si) thin film transistor (TFT), a low temperature poly silicon (LTPS) TFT or an organic TFT (OTFT). Here, a pixel of the display 110 may indicate a minimum unit capable of independently expressing color and gradation. The pixel of the display 110 and the pixel of the image content may have a corresponding positional relationship with each other.

Meanwhile, the display 110 may be implemented as a flexible display having a certain portion which may be bent, folded and unfolded again, or the display 110 may be implemented as a transparent display that allows a thing positioned behind the display 110 to be transmitted therethrough.

In addition, the display 110 may be implemented as a touch screen (or touch panel) by being coupled with a touch detection part (or touch sensor) that identifies a user touch position. To this end, the touch detection part may be implemented in any of various types such as a pressure-detection type in which the user touch position is identified by detecting a physical pressure on a surface of the display 110, a capacitive type in which the user touch position is identified by detecting a change in an electrical signal on the surface of the display 110, and an electromagnetic wave type in which the user touch position is identified by detecting that an electromagnetic wave (e.g., infrared wave or ultrasonic wave) emitted in a form of a grid on the surface of the display 110 is blocked by an obstacle (e.g., user finger or pen).

Meanwhile, the display 110 may be rotated. For example, the display 110 may be rotated by driving of the motor 120. In detail, the display 110 may be driven to be rotated based on a rotation shaft 10 (see FIG. 3) in the clockwise or counterclockwise direction by the motor 120. In this case, the display 110 may be rotated in units of angles such as 90 degrees or 180 degrees.

However, this driving force is only an example, and the display 110 may be rotated by another external force. For example, the direction of the display 110 may be rotated by the user's external force.

The motor 120 may rotate the display 110 based on the body 30 of the display device. Here, the body 30 may support the display 110 and may be in a fixed state even in case that the display 110 is rotated. This case is described with reference to FIG. 3.

Figure 3:
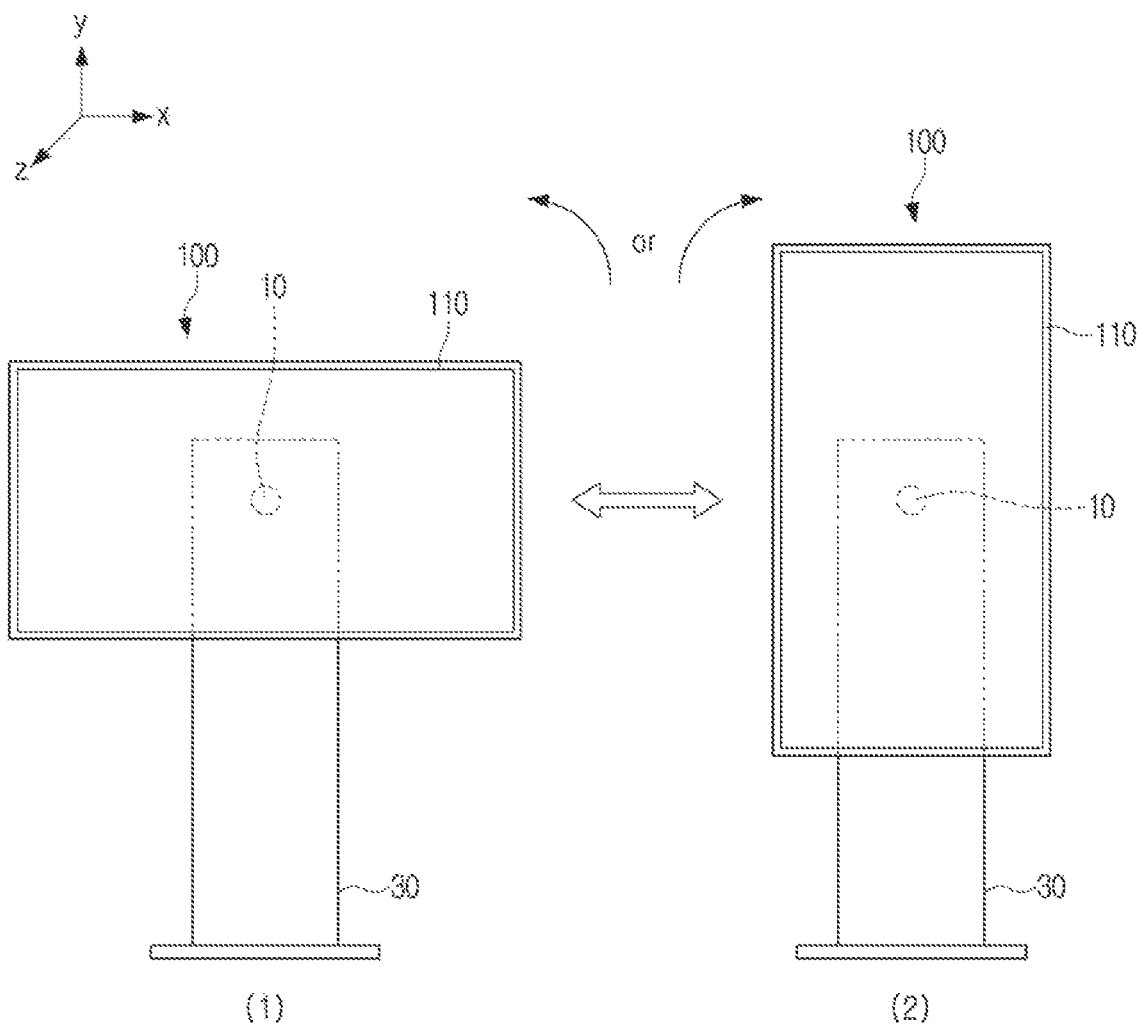
FIG. 3 is a view illustrating a rotation state of the display device according to an embodiment.

FIG. 3 is a view illustrating a rotation state of the display device according to an embodiment.

Referring to FIG. 3, the display device 100 may include the rotation shaft 10 and the body 30. Here, the rotation shaft 10, the body 30 and the motor 120 may be included in the rotation drive part (not shown). That is, the display device 100 may include the rotation drive part, and the rotation drive part may include the rotation shaft 10, the body 30 and the motor 120.

The rotation shaft 10 may rotate the display 110 by transmitting a rotational force caused by driving the motor 120 to the display 110. To this end, the rotation shaft 10 may be coupled to the motor 120 and a body 30. Meanwhile, according to an embodiment, a separate bearing may be positioned outside the rotation shaft 10. Here, the bearing may smoothly rotate the rotation shaft 10 by fixing the rotation shaft 10 at a certain position and reducing its frictional force with the rotation shaft 10 while supporting a load applied to the rotation shaft 10. Meanwhile, the rotation shaft 10 may be implemented as a rotation shaft of the motor 120 or as a rotation shaft separate from the rotation shaft of the motor 120.

The body 30 may support the display device 100. In addition, the body 30 may fix the display device 100 to a specific position. To this end, the body 30 may include a bracket of a video electronics standards association (VESA) standard (e.g., width and height of 100×100 mm, 200×100 mm or 400×400 mm), or a bracket dedicated for the display device 100. For example, the body 30 may be implemented as a wall-mount type support for fixing the display device 100 to a wall, or the body 30 may be implemented as a stand-type support for erecting the display device 100 on the floor (or the ground or the like). Furthermore, the body 30 may be implemented as an arm-type support attached (or fastened) to a desk or the like.

The motor 120 may rotate the display 110 based on the rotation shaft 10. The motor 120 may transmit a rotational force in the clockwise or counterclockwise direction to rotate the display 110 in the clockwise or counterclockwise direction. To this end, the motor 120 may be coupled to the display 110. Alternatively, the motor 120 may be coupled to a gear (e.g., circular gear) coupled to the display 110.

Here, the motor 120 may refer to an electric motor that receives electrical energy (or power) and converts the same into kinetic energy (or rotational force). To this end, the motor 120 may be implemented as any of various motors such as an alternating current (AC) motor using the AC as its driving power source, and a direct current (DC) motor using the DC as its driving power source. Here, the AC motor may generally use an armature as a stator and a field magnet as a rotor, and a DC motor may generally use the field magnet as the stator and the armature as the rotor. Here, the stator may refer to a fixed part, and the rotor may refer to a part connected to a power load (i.e., display 110 or gear connected to the display 110) to supply the rotational force. The field magnet may refer to a winding portion where magnetic flux is provided, and the armature may refer to a winding portion where the magnetic flux is broken and a voltage (electromotive force) is induced.

As such, the display 110 may be disposed in a landscape orientation as in (1) of FIG. 3 or a portrait orientation as in (2) of FIG. 3. That is, the display 110 may be disposed in the landscape orientation or the portrait orientation by being rotated in the clockwise or counterclockwise direction.

Here, the landscape orientation as shown in (1) of FIG. 3 may define that the display 110 is disposed in a state where the display 110 has a width (or length in an x-axis direction) longer than a height (or length in a y-axis direction) That is, the landscape orientation may define that the display 110 is disposed in a state where the display 110 has a long axis (or longer axis among side lengths of the display 110) oriented toward the x-axis (or in a state where a short axis (or shorter axis among side lengths of the display 110) oriented toward the y-axis).

Meanwhile, the portrait orientation as shown in (2) of FIG. 3 may define that the display 110 is disposed in a state where the display 110 has the height (or length in the y-axis direction) longer than the width (or length in the x-axis direction). That is, the portrait orientation may define that the display 110 is disposed in the state where the display 110 has the long axis oriented toward the y-axis (or in the state where the display 110 has the short axis oriented toward the x-axis).

Referring back to FIG. 2, the processor 130 may control an overall operation of the display device 100. To this end, the processor 130 may be implemented as a general-purpose processor such as a central processing unit (CPU) or an application processor (AP); a graphics-only processor such as a graphics-processing unit (GPU) or a visual processing unit (VPU); or an AI-only processor such as a neural processing unit (NPU). In addition, the processor 130 may include a volatile memory for loading at least one instruction or module.

The processor 130 may identify the direction of the object included in the image content, adjust the direction of the image content for the identified object to be oriented in the predetermined direction, control the display 110 to display the image content whose direction is adjusted, and control the display 110 to rotate the displayed image content in a direction opposite to a rotation direction of the display 110 in case that the display 110 is rotated by the motor 120.

In detail, the processor 130 may identify the direction of the object included in the image content.

To this end, the processor 130 may provide the image content from a source. For example, the processor 130 may receive the image content from the external device through a tuner (or TV reception card) of the display device 100. Alternatively, the processor 130 may load the image content stored in a memory 160 of the display device 100 (see FIG. 20). Alternatively, the processor 130 may receive the image content from the external device through the communication interface 170 of the display device 100 (see FIG. 20). For example, the communication interface 170 may be a high definition multimedia interface (HDMI), thunderbolt, wi-fi module or the like, and its specific details are described below with reference to FIG. 20.

Here, a type of the image content type may be either a landscape type or a portrait type. Here, the landscape type may have a ratio (or aspect ratio) in which a length in a width direction (e.g., x-axis direction) is longer than a length in a height direction (e.g., y-axis direction), and the portrait type may have a ratio (or aspect ratio) in which a length in a width direction (e.g., x-axis direction) is shorter than a length in a height direction (e.g., y-axis direction).

In addition, the processor 130 may identify the object included in the image content. Here, the object may include at least one of a text or an animal. The text may be at least one of the letters (e.g., alphabet such as a, b, c, . . . and Korean alphabet such as 가, 나, 다, . . . ), numbers (e.g., 0, 1, 2, 3, . . . ) or symbols (e.g., !, @, #, $, %, ^, . . . ) of various languages. The animals in the present disclosure are intended to identify the direction through a body of the animal, and indicate a concept that includes various species of animals (e.g., dogs and cats) and humans. The detailed description describes a method for identifying the object included in the image content in detail with reference to FIGS. 5 to 7.

In addition, the processor 130 may then identify the direction of the identified object. As an example, the processor 130 may identify, as the direction of the object, the direction oriented from a lower end portion of the identified object to an upper end portion thereof.

For example, in case that the object is "a human whole body (or entire body)," the processor 130 may identify, as the direction of the object, the direction oriented from the "legs," which are the lower end portions of the object, to the "face," which is the upper end portion of the object. For another example, in case that the object is a "human face," the processor 130 may identify, as the direction of the object, the direction oriented from the "mouth (or nose)," which is the lower end portion of the object to the "eyes," which are the upper end portions of the object. For still another example, in case that the object is a text (e.g., alphabet "T"), the processor 130 may identify, as the direction of the object, the direction oriented from the lower end portion of the object "l" to the "-," which is the upper end portion of the object. For yet another example, in case that the object is a text (e.g., Korean alphabet "삼"), the processor 130 may identify, as the direction of the object, the direction oriented from the lower end portion of the object, the final (or base) consonant (e.g., "ㅁ"), to the initial consonant (e.g., "ㅅ") or the neutral consonant (e.g., "ㅏ"), which is the upper end portion of the object.

Meanwhile, the above-mentioned direction of the object is only an example, and the processor 130 may identify, as the direction of the object, various directions such as the direction oriented from the upper end portion of the object to the lower end portion thereof, the direction oriented from the left portion of the object to the right portion thereof, the direction oriented from the right portion of the object to the left portion thereof, or the like. Hereinafter, for convenience of explanation, the description is provided assuming that the direction of the object is defined as the direction oriented from the lower end portion of the object to the upper end portion thereof.

Then, the processor 130 may adjust the direction of the image content for the identified object to be oriented in the predetermined direction. Here, the predetermined direction may indicate a reference direction with which the direction of the object included in the image content is matched. In addition, adjusting the direction of the image content may indicate a concept that includes not only rotating the image content (or direction of the image content) but also maintaining the image content (or direction of the image content).

That is, the processor 130 may rotate the image content for the identified object to be oriented in the predetermined direction. For example, in case that the direction of the identified object is the +x-axis direction, the processor 130 may rotate the image content by +90 degrees (or by 90 degrees in the counterclockwise direction) for the identified object to be oriented in the predetermined direction (e.g., +y-axis direction). Hereinafter, for convenience of explanation, +x-axis direction may be referred to as a zero degree direction, +y-axis direction may be referred to as a 90 degree direction, −x-axis direction may be referred to as a 180 degree direction, and −y-axis direction may be referred to as a 270 degree direction.

As an example, the predetermined direction may include an upward direction of the display 110 disposed in the landscape orientation in case that the display 110 is disposed in the landscape orientation. In addition, the predetermined direction may include the upward direction of the display 110 disposed in the portrait orientation in case that the display 110 is disposed in the portrait orientation. That is, the predetermined direction may be set to the +y-axis direction.

Meanwhile, the above predetermined direction is only an example, and may also be set to various directions. For example, the predetermined direction may be set to the −y-axis direction in case that the direction oriented from the upper end portion of the object to the lower end portion thereof is identified as the direction of the object. For another example, the predetermined direction may be set to the +x-axis direction in case that the direction oriented from the left portion of the object to the right portion thereof is identified as the direction of the object. For still another example, the predetermined direction may be set to the −x-axis direction in case that the direction oriented from the right portion of the object to the left portion thereof is identified as the direction of the object.

Hereinafter, for convenience of explanation, the direction of the object is defined as the direction oriented from the lower portion of the object to the upper portion thereof, and the predetermined direction is assumed to be the +y-axis direction.

Meanwhile, the processor 130 may adjust the direction of the image content for the text to be oriented in the predetermined direction based on the direction of the text in case that the image content includes the text and the animal in directions different from each other. That is, priority may be given to a type of the object in case that at least one object among the plurality of objects included in the image content has a different direction from that of another object. In this manner, the display device may give the priority to the text to display the image content based on the text, thereby preventing a lower transmission power of information indicated by the text.

However, this priority is only an example. In case that at least one object among the plurality of objects has a different direction from that of another object, the processor 130 may identify a direction of each of the plurality of objects included in the image content, and adjust the direction of the image content for the object to be oriented in the predetermined direction based on the direction of the object having the most directions.

In addition, the processor 130 may control the display 110 to display the image content whose direction is adjusted.

As such, the display device 100 may display the image content by adjusting the direction of the image content based on the direction of the object included in the image content, rather than displaying the image content based on the type (or aspect ratio) of the image content or content resolution information of the image content, received from the source. Accordingly, the display device 100 may solve the problem that the object included in the image content is displayed as lying down or upside down, and provide the user with an improved viewing experience and improved information delivery by displaying the object included in the image content in the normal direction.

In addition, the processor 130 may control the display 110 to rotate the displayed image content in the direction opposite to the rotation direction of the display 110 in case that the display 110 is rotated by the motor 120. The reason is to maintain the direction of the image content (or object) displayed on the display 110 not to be changed before and after the rotation of the display 110 by rotating the image content in the opposite direction to the rotation direction of the display 110.

Here, the processor 130 may control the motor 120 to rotate the display 110 in case that the predetermined event is provided.

In detail, the processor 130 may control the motor 120 to rotate the display 110 at a specific rotation angle in case that the predetermined event is provided. For example, the processor 130 may control the motor 120 to rotate the display 110 at the specific rotation angle by applying a pulse signal whose width (length/ratio of time during which a high signal (, voltage or the like) is applied during an entire cycle) is adjusted to the motor by using a pulse width modulation (PWM) method. Here, the width of the pulse signal may be identified in consideration of a weight of the display 110, a torque of the motor 120, a gear ratio, etc. In addition, the rotation angle may be +90 degrees (or clockwise direction) or −90 degrees (or counterclockwise direction). For example, in case that the processor 130 transmits the pulse signal for rotating the display 110 at an angle of +90 degrees to the motor 120, the display 110 may be rotated gradually in the clockwise direction by 90 degrees from zero degrees based on the driving of the motor 120 based on the pulse signal. Meanwhile, this control is only an example, and the processor 130 may control the motor 120 according to various modified examples.

Here, the case where the predetermined event is provided may be at least one of a case where the orientation of the display 110 and the type of the image content displayed on the display 110 are different from each other or a case where the processor 130 receives the user command corresponding to the user interface (UI) for rotating the display 110.

First, according to an embodiment, the description describes the case where the orientation of the display 110 and the type of the image content displayed on the display 110 are different from each other.

As an example, the processor 130 may identify whether the image content is the image content of the landscape type or the image content of the portrait type on the basis of the direction of the identified object.

For example, the processor 130 may identify one direction of the image content as the height direction of the image content in case that an angular difference between the direction of the identified object and the one direction of the image content is less than a predetermined value (e.g., 45 degrees). In addition, the processor 130 may identify the other direction of the image content as the width direction of the image content in case that the angular difference between the direction of the identified object and the other direction of the image content is greater than or equal to the predetermined value (e.g., 45 degrees). Here, one direction and the other direction of the image content may have a vertical relationship with each other.

Here, the processor 130 may identify the image content as the image content of the landscape type in case that the identified number of pixels in the width direction of the image content is greater than the identified number of pixels in the height direction of the image content. On the other hand, the processor 130 may identify the image content as the image content of the portrait type in case that the identified number of pixels in the width direction of the image content is smaller than the identified number of pixels in the height direction of the image content.

In this case, the processor 130 may display the image content whose direction is adjusted on the display 110 disposed in the landscape orientation. In addition, the processor 130 may control the motor 120 to rotate the display 110 to the portrait orientation in case that the displayed image content is identified as the image content of the portrait type. In addition, the processor 130 may control the display 110 to rotate the displayed image content in the direction opposite to the rotation direction of the display 110.

On the other hand, the processor 130 may display the image content whose direction is adjusted on the display 110 disposed in the portrait orientation. In addition, the processor 130 may control the motor 120 to rotate the display 110 to the landscape orientation in case that the displayed image content is identified as the image content of the landscape type. In addition, the processor 130 may control the display 110 to rotate the displayed image content in the direction opposite to the rotation direction of the display 110.

The display device 100 according to an embodiment as described above may minimize the occurrence of the blank, have no loss for the image content, and display the image content at a maximum size on the display 110 while maintaining the ratio of the image content, thereby providing the user with an optimized viewing experience. In addition, the display device 100 may improve user convenience in not requiring the user's special manipulation to perform the above-described operation.

Meanwhile, as another example, the processor 130 may control the display 110 to display the user interface (UI) for rotating the display 110 on a region of the display 110. Here, the UI may be implemented to include at least one of a message (e.g., "Do you want to rotate the display?"), an image or an icon.

In addition, the processor 130 may control the motor 120 to rotate the display 110 in case that the user command corresponding to the UI is received. Here, the user command corresponding to the UI may be a touch command input to select a selectable icon included in the UI, a button press command, etc. In addition, the user command may be received through an input interface 150 (see FIG. 20) of the display device 100, or the user command may be received from the external device 200-1 or 200-2 through the communication interface 170 (see FIG. 20) of the display device 100.

Meanwhile, the processor 130 according to an embodiment may control the display 110 to display a user interface (UI) for locking the rotation of the image content in one region of the display 110.

In detail, the processor 130 may control the display 110 to display the UI for locking the rotation of the image content in one region of the display 110 in case that the direction of the object included in the image content is not identified. Here, the UI may be implemented to include at least one of a message (e.g., "Do you want execution of a function to lock the rotation of the display?"), an image or an icon.

Here, the processor 130 may control the display 110 to maintain the direction of the image content displayed before the display 110 is rotated in case that the display 110 is rotated by the motor 120 after the user command corresponding to the UI is received. For example, the user command corresponding to the UI may be the touch command input to select a selectable icon included in the UI, the command to press a button, etc. In addition, the user command may be received through the input interface 150 (see FIG. 20) of the display device 100, or the user command may be received from the external device 200-1 or 200-2 through the communication interface 170 (see FIG. 20) of the display device 100.

Figure 20:
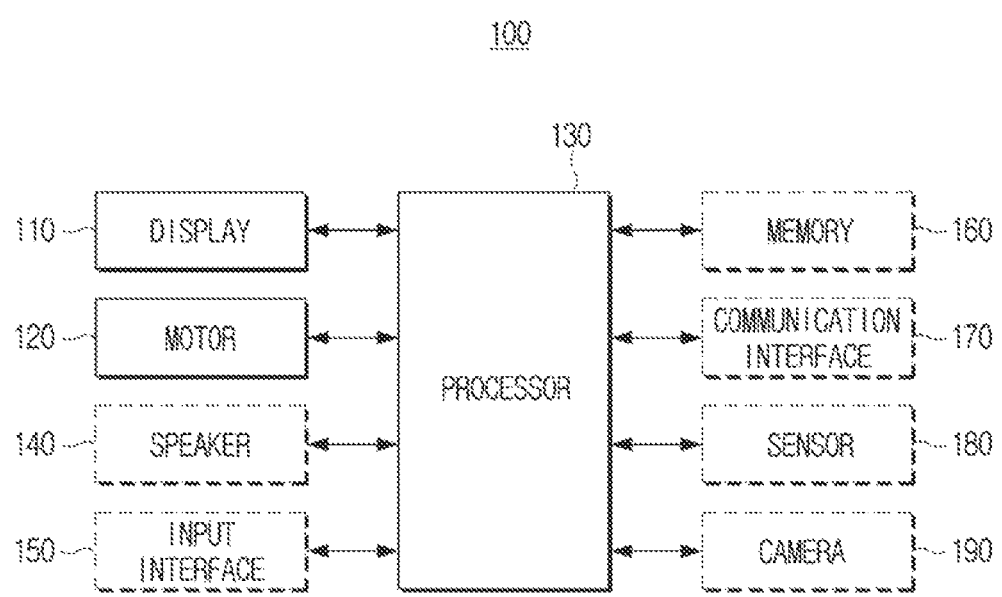
FIG. 20 is a block diagram illustrating an additional configuration of the display device according to an embodiment.

Meanwhile, the display device 100 according to an embodiment may include the display 110, the motor 120, the processor 130 and the communication interface 170 (see FIG. 20).

The display 110 may display the various image contents. In addition, the display 110 may display the various user interfaces (UIs). Here, the UI may refer to a graphical user interface (GUI) displayed to perform a specific function. For example, the UI may include various objects (e.g., messages, figures, icons or images) displayed to perform the rotation of the image or the rotation of the display. Accordingly, the user may conveniently input the user command to the display device 100 or the external device 200-1 or 200-2 through the UI displayed on the display 110 in order for the display device 100 to perform the desired function.

The motor 120 may rotate the display 110 based on the body 30 of the display device. The description omits a content overlapping with the above description.

The communication interface 170 may transmit/receive various types of data by performing communication with the various types of external devices 200-1 and 200-2 according to various types of communication methods.

The processor 130 may control the display 110 to display the image content on the display 110 disposed in a first orientation, and to display the user interface (UI) for rotating the image content and the display 110, receive a signal for rotating the image content or the display 110 from the external device 200-1 or 200-2 through the communication interface while the UI is displayed, and control the motor 120 to rotate the image content displayed on the display 110 or rotate the display 110 to a second orientation on the basis of the received signal.

In detail, the processor 130 may control the display 110 to display the image content on the display 110 disposed in the first orientation. Here, the first orientation of the display 110 may be the portrait orientation or the landscape orientation.

In addition, the second orientation of the display 110 may be the landscape orientation in case that the first orientation of the display 110 is the portrait orientation. In addition, the second orientation of the display 110 may be the portrait orientation in case that the first orientation of the display 110 is the landscape orientation.

In addition, the processor 130 may control the display 110 to display the user interface (UI) for rotating the image content and the display 110.

In addition, the processor 130 may receive the signal for rotating the image content or the display 110 from the external device 200-1 or 200-2 through the communication interface 170 while the UI is displayed. Here, the external device 200-1 or 200-2 may be implemented as an electronic device such as a remote controller, a smartphone, a personal computer (PC), a tablet PC, a laptop computer or a wearable device (e.g., watch, glasses or bracelet).

To this end, the signal for rotating the image content or the display 110, corresponding to the user command, may be transmitted to the display device 100 in case that the various user commands are input to the external device 200-1 or 200-2. Here, the user command may refer to a command that allows the user to manipulate the display device 100 or the external device 200-1 or 200-2 by using various methods such as the key input (e.g., method of pressing a key (or button) positioned on the external device 200-1 or 200-2), the touch input (e.g., method of touching a touch panel positioned on the external device 200-1 or 200-2 by using a user finger (, a portion of a user body, a pen or the like), the user voice input (e.g., method of uttering a user voice including a specific keyword into the microphone positioned in the external device 200-1 or 200-2), the gesture input (e.g., method of performing a gesture by using a user finger (or a portion of the user body or the like) with respect to a camera (, a sensor or the like) positioned in the external device 200-1 or 200-2.

In addition, the processor 130 may control the motor 120 to rotate the image content displayed on the display 110 or rotate the display 110 to the second orientation on the basis of the received signal.

In detail, the processor 130 may rotate the content displayed on the display 110 in the clockwise or counterclockwise direction while the display 110 maintains its orientation in the first orientation in case that the signal for rotating the image content is received.

Alternatively, the processor 130 may rotate the display 110 in the clockwise or counterclockwise direction for the display 110 to be disposed in the second orientation while the image content displayed on the display 110 in the first orientation maintains its direction in case that the signal for rotating the display 110 is received. That is, in this case, it is possible to maintain (or fix) the direction in which the image content is displayed.

As an example, the processor 130 may control the display 110 to display the user interface (UI) for rotating the image content and the display 110. In this case, the UI may include a first object for rotating the image content by 90 degrees in the clockwise direction, a second object for rotating the image content by 90 degrees in the counterclockwise direction, a third object for rotating the display 110 by 90 degrees in the clockwise direction, and a fourth object for rotating the display 110 by 90 degrees in the counterclockwise direction. A detailed description thereof is described with reference to FIGS. 16A to 16E.

Meanwhile, the processor 130 may rotate the image content or the display 110 by 90 degrees in a direction corresponding to a selected object on the basis of a received signal in case that the signal for selecting one of the first to fourth objects is received.

For example, in case that the first object for rotating the image content by 90 degrees in the clockwise direction is selected, the processor 130 may rotate the image content by 90 degrees in the clockwise direction (i.e., +90 degrees) corresponding to the first object selected on the basis of the received signal. For another example, in case that the second object for rotating the image content by 90 degrees in the counterclockwise direction is selected, the processor 130 may rotate the image content by 90 degrees in the counterclockwise direction (i.e., −90 degrees) corresponding to the second object selected on the basis of the received signal. For still another example, in case that the third object for rotating the display 110 by 90 degrees in the clockwise direction is selected, the processor 130 may rotate the display 110 by 90 degrees in the clockwise direction (i.e., +90 degrees) corresponding to the third object selected on the basis of the received signal. For yet another example, in case that the fourth object for rotating the display 110 by 90 degrees in the counterclockwise direction is selected, the processor 130 may rotate the display 110 by 90 degrees in the counterclockwise direction (i.e., −90 degrees) corresponding to the fourth object selected on the basis of the received signal.

Meanwhile, the first object according to an embodiment may include a preview image in which the image content is displayed on the display 110 rotated by 90 degrees in the clockwise direction and disposed in the first orientation. In addition, the second object may include a preview image in which the image content is rotated by 90 degrees in the counterclockwise direction is displayed on the display 110 disposed in the first orientation. In addition, the third object may include a preview image in which the image content is displayed on the display 110 rotated by 90 degrees in the clockwise direction and disposed in the second orientation. In addition, the fourth object may include a preview image in which the image content is displayed on the display 110 rotated by 90 degrees in the counterclockwise direction and disposed in the second orientation.

Meanwhile, the first to fourth objects may be displayed on the display 110 to correspond to arrangement of a plurality of direction keys of the external device 200-1 or 200-2, and the processor 130 may identify an object corresponding to a selected direction key among the first to fourth objects on the basis of a received signal in case that the signal indicating that one of the plurality of direction keys is selected is received from the external device 200-1 or 200-2, and rotate the image content or the display 110 by 90 degrees in a direction corresponding to the identified object.

Meanwhile, the processor 130 may display a cursor on one of the first to fourth objects, move the cursor displayed on the object to another object positioned in a direction corresponding to a selected direction key on the basis of a received signal in case that the signal indicating that one of the plurality of direction keys of the external device 200-1 or 200-2 is selected is received from the external device 200-1 or 200-2, and rotate the image content or the display 110 by 90 degrees in a direction corresponding to the object on which the cursor is displayed on the basis of a received signal in case that the signal for selecting the object on which the cursor is displayed is received from the external device 200-1 or 200-2.

The plurality of objects included in the above-described UI are described with reference to FIGS. 16A to 16F.

Figure 4:
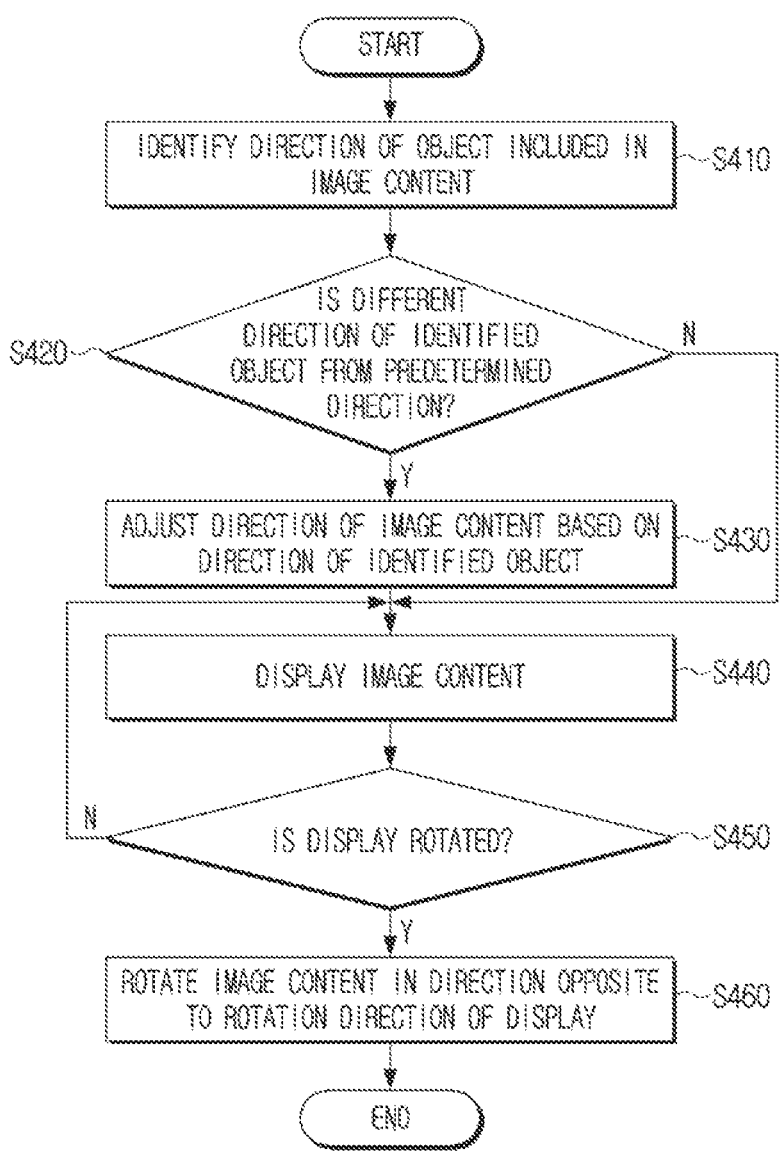
FIG. 4 is a view illustrating an operation of the display device according to an embodiment.

FIG. 4 is a view illustrating the operation of the display device according to an embodiment.

Referring to FIG. 4, the display device 100 may identify the direction of the object included in the image content (S410). In detail, the display device 100 may receive the image content from the source, and the display device 100 may identify the object included in the image content. The display device 100 may then identify the direction of the object included in the image content. In this case, the display device may perform the operation of identifying the object and the operation of identifying the direction of the object sequentially or simultaneously.

The display device 100 may then identify whether the direction of the object included in the image content is different from the predetermined direction.

Here, the direction of the object included in the image content may be different from the predetermined direction (S420-Y). In this case, the display device 100 may adjust the direction of the image content based on the direction of the identified object (S430). That is, the display device 100 may adjust the direction of the image content for the identified object is oriented in the predetermined direction. The display device 100 may then display the image content whose direction is adjusted on the display 110 (S440). Here, the adjusted direction of the image content may be different from the direction of the image content, received from the source.

On the other hand, the direction of the object included in the image content may not differ from the predetermined direction (S420-N), the display device 100 may display the image content on the display 110 (S440). Here, the direction of the image content may be the same as the direction of the image content, received from the source.

The display 110 may then be rotated (S450-Y). In this case, the display device 100 may rotate the displayed image content in the direction opposite to the rotation direction of the display 110 (S460).

Meanwhile, the display device 100 may not rotate the image content even in case that the display 110 is rotated in a state where the function to lock the rotation is set. Specific details thereof are described with reference to FIGS. 11 and 12.

Figure 5:
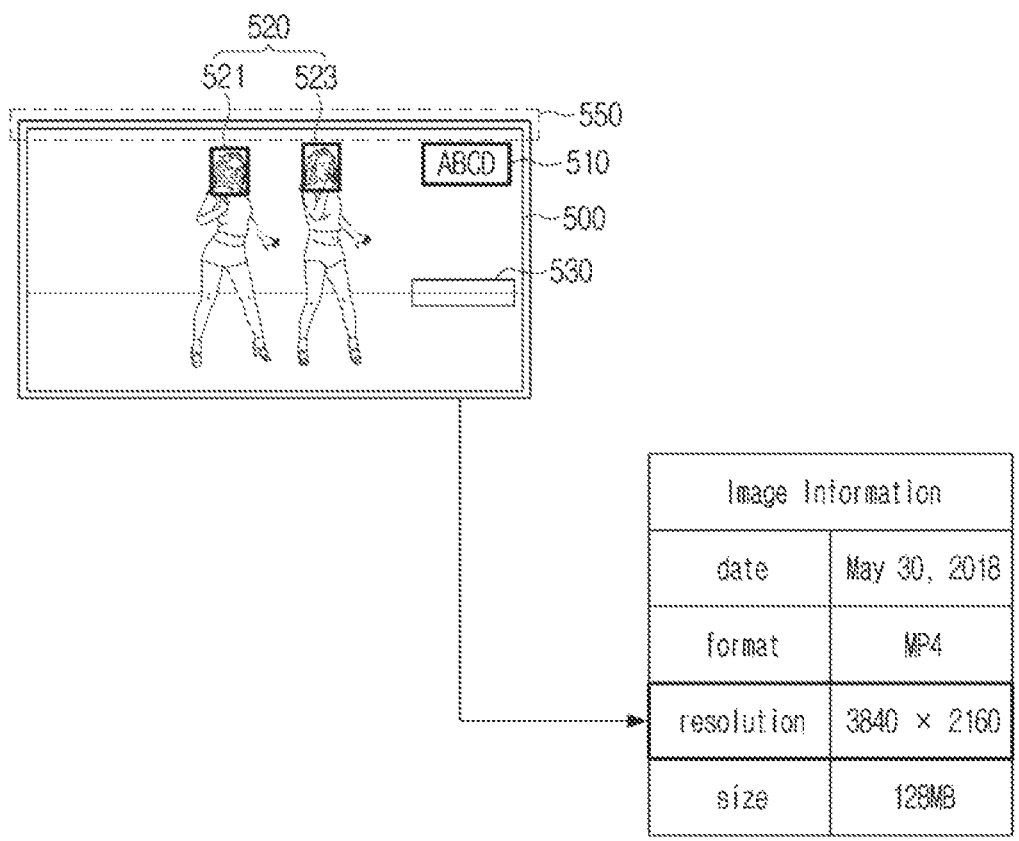
FIG. 5 is a view illustrating an object and a method for identifying a direction of the object according to an embodiment.
Figure 6:
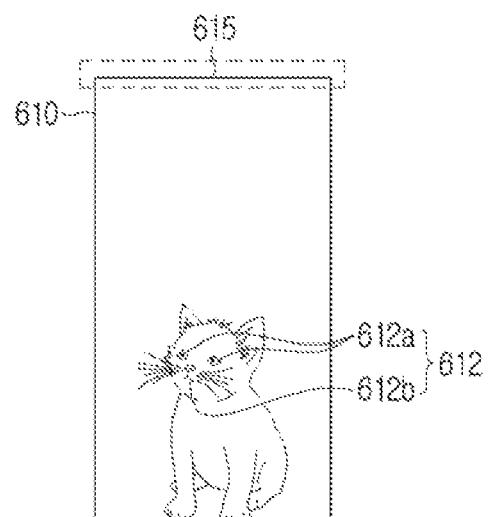
FIG. 6 is a view illustrating the object and a method for identifying a direction of the object according to an embodiment.
Figure 6:
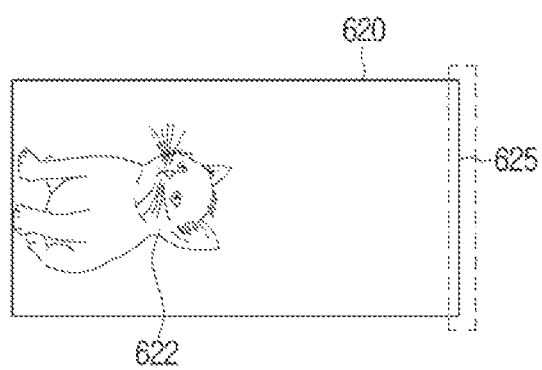
Figure 6:
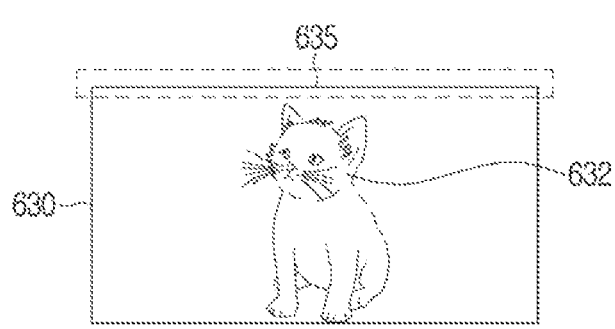
Figure 6:
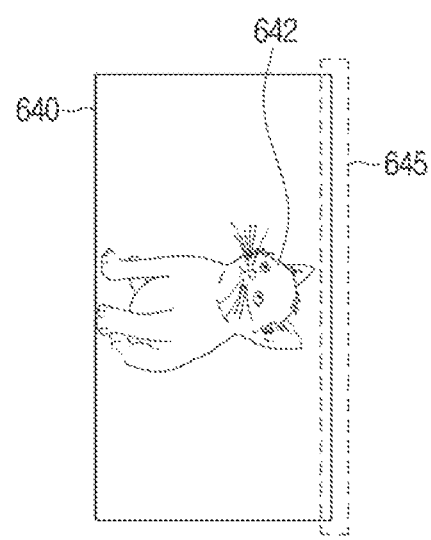
Figure 6:
Figure 7:
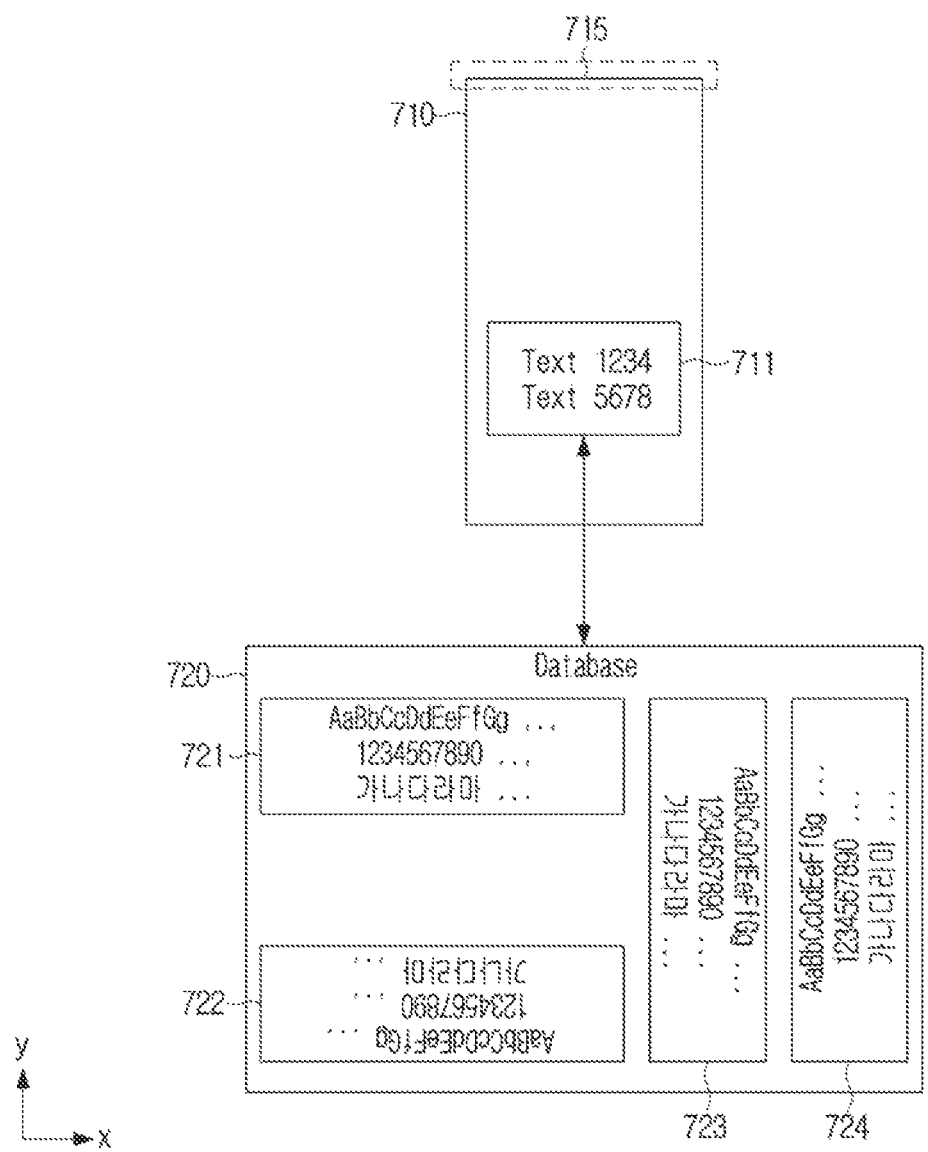
FIG. 7 is a view illustrating the object and a method for identifying a direction of the object according to an embodiment.

FIGS. 5 to 7 are views illustrating the object and a method for identifying a direction of the object according to an embodiment.

Referring to FIG. 5, the processor 130 may receive an image content 500 from the source. Here, the image content 500 may include metadata. The metadata may include at least one of date (or time) at which the image content 500 is provided, date (or time) at which the image content 500 is modified, a file format of the image content 500, and a content resolution (or the number of pixels in width and height directions, or an aspect ratio) of the image content 500 or a size of the image content 500. Meanwhile, the metadata may be data separate from the image content 500, in which case the processor 130 may receive the image content 500 and the metadata for the image content from the source.

The processor 130 may then identify objects 510, 520 and 530 included in the image content 500 by using an image recognition algorithm.

In detail, the processor 130 may change a color value (or gradation) of a pixel having a value within a first predetermined range among the plurality of pixels included in the image content to a black color value, and change a color value of a pixel having a value within a second predetermined range to a white color value by the image recognition algorithm.

In addition, the processor 130 may identify an outline by connecting the pixels each having the black color value to each other, and identify the pixels each having the white color value as a background.

In addition, the processor 130 may calculate, as a probability value (or score), a degree to which a shape of the object (e.g., text, human, eyes, nose, or mouth) pre-stored in a database matches the detected outline. In addition, the processor 130 may identify, as the object included in the image content, the object in a shape having the highest probability value among the calculated probability values.

For example, in case of FIG. 5, the processor 130 may identify the text 510 and human faces 521 and 523, included in the image content 500, as the objects included in the image content 500. However, this case is only an example, and the human entire body, the horizon 530 or the like may be identified as the object included in the image content 500.

Meanwhile, the above-described algorithm is only an example, and the processor 130 may identify the object such as the text, the thing, the animal or the human, included in the image content, by using various algorithms such as an algorithm to identify the object by using an analysis for the color value of the image content or an algorithm to identify the object by using an analysis for a pattern of the object included in the image content. In addition, the processor 130 may identify the object included in the image content by using an artificial intelligence model. Here, the artificial intelligence model may be a model based on machine learning or a deep neural network (DNN). However, this case is only an example, and the artificial intelligence model may be any of various models such as a convolution neural network (CNN), a recurrent neural Network (RNN), and a bidirectional recurrent deep neural network (BRDNN).

In addition, the processor 130 may identify a direction of the object included in the image content 500. Specific details thereof are described with reference to FIGS. 6 and 7.

First, the description is provided assuming that an object included in an image content 610, 620, 630 or 640 is a cat among the animals with reference to FIG. 6.

According to the above description, the processor 130 may identify the cat's eyes 612*a* and the cat's mouth 612*b* included in the image content 610, 620, 630 or 640 by using the various image recognition algorithms. Here, the processor 130 may identify the cat's face 612, 622, 632, or 642 including the cat's eyes 612*a* and the cat's mouth 612*b* as the object included in the image content 610, 620, 630 or 640.

In addition, the processor 130 may identify, as the direction of the object, a direction oriented from a lower end portion of the object (e.g., cat's mouth 612*b*) to an upper end portion (e.g., cat's eyes 612*a*) of the object. For example, the processor 130 may identify the direction oriented from a position of the cat's mouth 612*b* to an average position of the cat's eyes 612*a*.

Here, the processor 130 may identify the direction of the object corresponding to a predetermined range in case that the angle of the identified direction is within the predetermined range. For example, the direction of the corresponding object may be the zero degree direction in case that the predetermined range is 315 degrees to 45 degrees, the direction of the corresponding object may be the 90 degree direction in case that the predetermined range is 45 degrees to 135 degrees, the direction of the corresponding object may be the 180 degree direction in case that the predetermined range is 135 degrees to 225 degrees, and the direction of the corresponding object may be the 270 degree direction in case that the predetermined range is 225 degrees to 315 degrees. However, the predetermined range and the direction of the corresponding object are only examples, and may be variously modified.

In this manner, in cases of portions 1 and 3 of FIG. 6, the processor 130 may identify the +y-axis direction as the direction of the object. On the other hand, in cases of portions 2 and 4 of FIG. 6, the processor 130 may identify the +x-axis direction (or the zero degree direction) as the direction of the object. Furthermore, in case of portions 1 and 3 of FIG. 6, a region 615 or 635 corresponding to the +y-axis direction in the image content 610 or 630 may be an upper region based on the direction of the object, and in portions 2 and 4 of FIG. 6, a region 625 or 645 corresponding to the +x-axis direction in the image content 620 or 640 may be the upper region based on the direction of the object.

Meanwhile, identifying the direction of the object by using a positional relationship between the eyes and mouth included in the animal's face is only an example, and it is possible to use the positional relationship between various body portions of the animal.

The processor 130 may then adjust the direction of the image content for the identified object to be oriented in the predetermined direction.

For example, in case that the predetermined direction is the +y-axis direction, the processor 130 may identify the direction of the object included in the image content 620 or 640 as the +x-axis direction (or zero degree direction) as shown in portions 2 and 4 of FIG. 6. In this case, the processor 130 may adjust the direction of the image content 620 or 640 for the object to be oriented in the +y-axis direction which is the predetermined direction. Meanwhile, as shown in portions 1 and 3 of FIG. 6, the processor 130 may identify the direction of the object included in the image content 610 or 630 as the +y-axis direction (or the 90 degree direction). In this case, the processor 130 may adjust the direction of the image content 610 or 630 for the object to be oriented in the +y-axis direction which is the predetermined direction. That is, in this case, the directions may match each other, and the processor 130 may thus maintain the direction of the image content 610 or 630 as it is.

In this manner, the processor 130 may adjust the direction of the image content for the upper region 615, 625, 635 or 645 of the image content 610, 620, 630 or 640 to be displayed in an upper region of the display 110 based on the orientation of the disposed display 110.

Next, with reference to FIG. 7, the description is provided assuming that an object included in an image content 710 is the text.

The processor 130 according to an embodiment may identify a text 711 included in the image content 710 on the basis of a shape of the text itself.

In detail, the processor 130 may identify the text 711 included in the image content 710 on the basis of text information 721 to 724 pre-stored in a database 720.

Here, the text information 721 to 724 may include information for identifying the shape of the text and the text matched with each other. Here, the text information 721 to 724 may further include direction information. For example, the first text information 721 may include information on the shape of the text disposed in the +y-axis direction and the direction information indicating the +y-axis direction. In addition, the second text information 722 may include information on the shape of the text disposed in the −y-axis direction and the direction information indicating the −y-axis direction. In addition, the third text information 723 may include information on the shape of the text disposed in the +x-axis direction and the direction information indicating the +x-axis direction. In addition, the fourth text information 724 may include information on the shape of the text disposed in the −x-axis direction and the direction information indicating the −x-axis direction.

For example, the processor 130 may change the color value (or gradation) of the pixel having the value within the first predetermined range among the plurality of pixels included in the image content to the black color value, and change the color value of the pixel having the value within the second predetermined range to the white color value by the image recognition algorithm.

In addition, the processor 130 may identify an outline by connecting the pixels each having the black color value to each other, and identify the pixels each having the white color value as a background.

In addition, the processor 130 may calculate, as a probability value, a degree to which the shape of the text included in the text information 721 to 724 pre-stored in the database 720 matches the detected outline. In this case, the processor 130 may identify, as the direction of the object included in the image content, the direction of the text in a shape having the highest probability value among the calculated probability values.

However, the above-described case is only an example, and in case that the text includes a plurality of letters, the processor may identify the direction of the object in various ways such as identifying the direction of the object in consideration of the positional relationship (or arrangement) of the plurality of letters. For example, in case of identifying the plurality of letters included in the image content, the processor 130 may identify, as a group, the plurality of letters positioned at intervals within the predetermined range. In addition, the processor 130 may identify, as the direction of the object, a direction perpendicular to a direction in which the plurality of letters are arranged in the group. This identification takes into account that the letters are generally written in a horizontal direction.

In addition, the processor 130 may adjust the direction of the image content for the identified text to be oriented in the predetermined direction.

As described above, the display device 100 according to an embodiment may identify the direction in which the image content is displayed on the display 110 based on the direction of the object included in the image content rather than identifying the direction in which the image content is displayed on the display 110 based on the content resolution information of the image content provided from the source. Accordingly, the display device 100 may prevent the object included in the image content from being displayed as lying down or upside down.

FIGS. 8A to 8D are views illustrating the operation of the display device in a state where the display is disposed in the landscape orientation according to an embodiment.

The first portions of FIGS. 8A, 8B, 8C, and 8D show an image content 810, 820, 830 or 840 provided from the source and a state before the display device 100 displays the image content 810, 820, 830 or 840 on the display 110. Here, the image content 810, 820, 830 or 840 may include an object 812, 822, 832 or 842 such as the cat, and the display 110 may be disposed in the landscape orientation. However, the display device 100 may identify a type of the image content 810, 820, 830 or 840 based on the object 812, 822, 832 or 842 rather than the type of the image content 810, 820, 830 or 840 provided from the source.

Figure 8A:
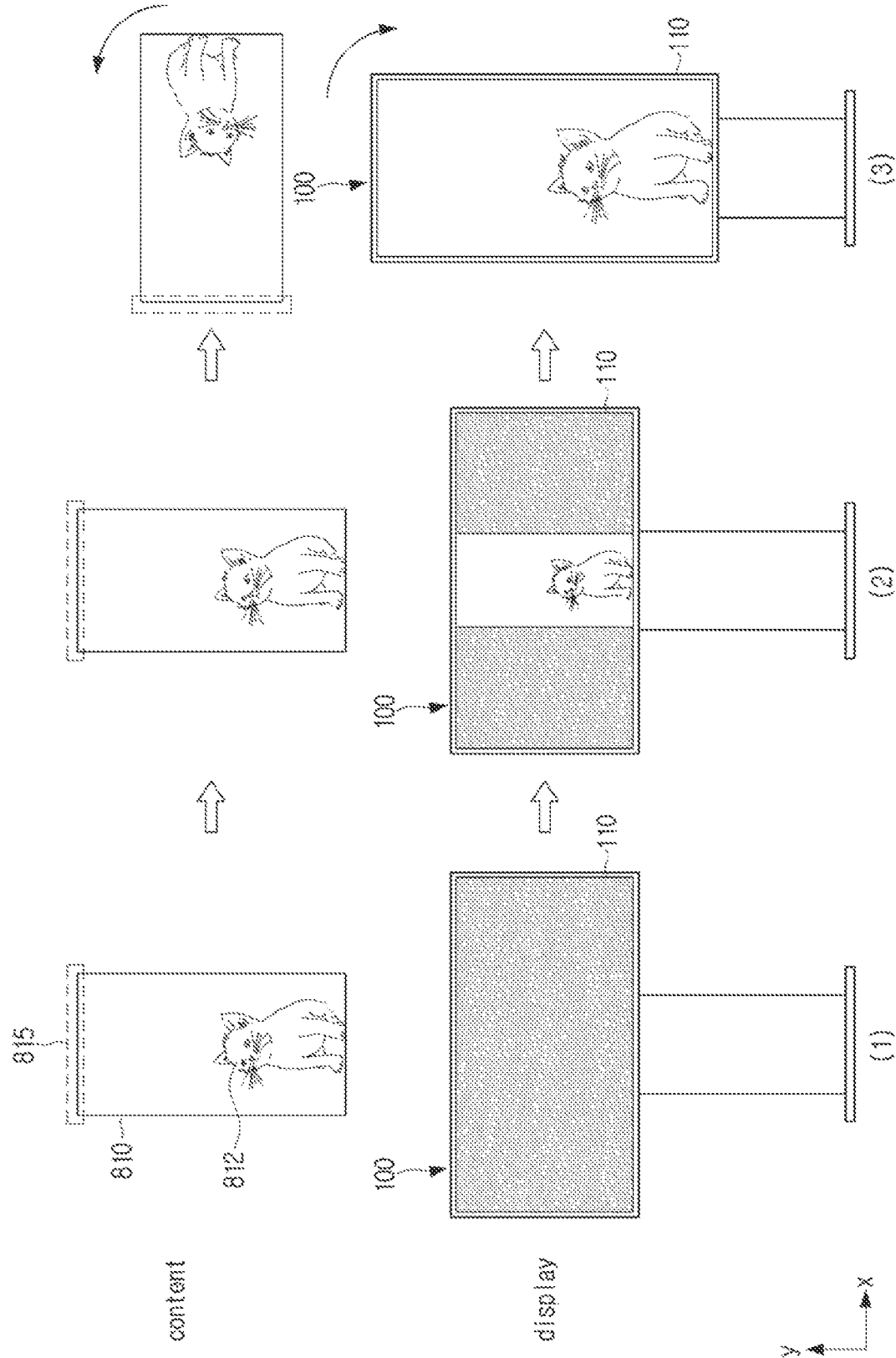
FIG. 8A is a view illustrating the operation of the display device in a state where a display is disposed in a landscape orientation according to an embodiment.
Figure 8C:
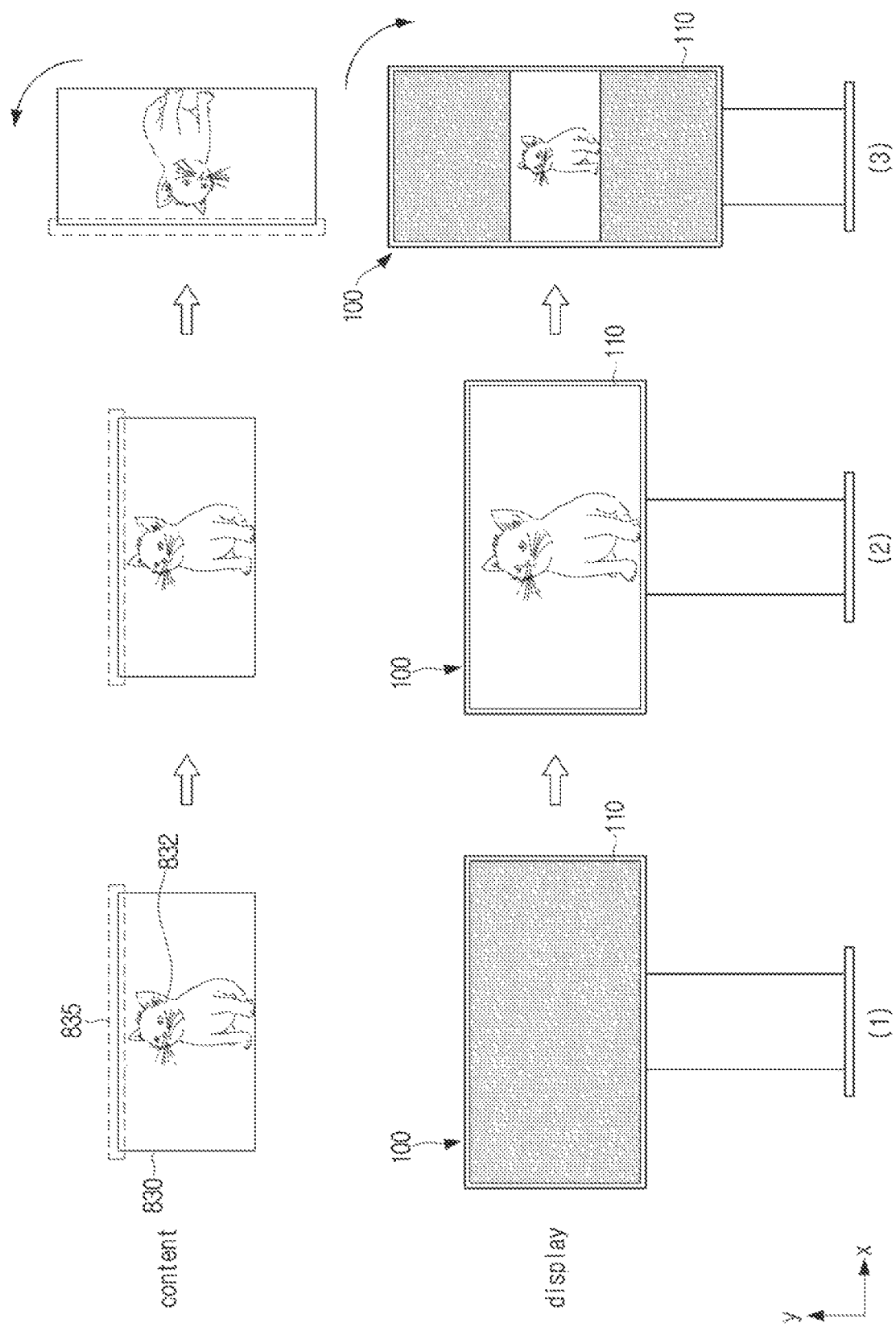
FIG. 8C is a view illustrating an operation of the display device in a state where the display is disposed in the landscape orientation according to an embodiment.

The first portions of FIG. 8A or 8D shows that the image content 810 or 840 provided from the source has a content resolution of the portrait type. The first portions of FIG. 8B or 8C shows that the image content 820 or 830 provided from the source has a content resolution of the landscape type.

Referring to the first portions of FIGS. 8A, 8B, 8C, and 8D, it may be assumed that the display device 100 displays the image content 810, 820, 830 or 840 in a direction identified on the basis of the content resolution information of the image content 810, 820, 830 or 840 provided from the source.

Here, in the case of the first portion of FIG. 8A, the object 812 included in the image content 810 may be in the normal direction. However, left and right blanks may occur due to a difference between the orientation of the display 110 and the type of the image content 810. In addition, in the case of the first portion of 8B, the orientation of the display 110 and the type of the image content 820 may be the same as (or match) each other to minimize the occurrence of the blank. However, the object 822 included in the image content 820 may be in the direction in which the object is lying down. In addition, in the first portion of FIG. 8C, the object 832 included in the image content 830 may be in the normal direction, and the orientation of the display 110 and the type of the image content 830 may be the same as each other, thereby minimizing the occurrence of the blank. In addition, in the first portion of FIG. 8D, the object 842 included in the image content 840 may be in the direction in which the object is lying down, and the left and right blanks may occur due to a difference between the orientation of the display 110 and the type of the image content 840.

The processor 130 of the display device 100 according to an embodiment may identify the direction of the object 812, 822, 832 or 842 included in the image content 810, 820, 830 or 840. Here, in the first portions of FIG. 8A or 8C, the direction of the identified object 812 or 832 may be the +y-axis direction. In addition, in the first portions of FIG. 8B or 8D, the direction of the identified object 822 or 842 may be the +x-axis direction.

Referring to the second portion of FIGS. 8A, 8B, 8C, and 8D, the processor 130 may adjust the direction of the image content 810, 820, 830 or 840 for the identified object 812, 822, 832 or 842 to be oriented in the predetermined direction (e.g., +y-axis direction). Here, the object 812, 822, 832 or 842 included in the image content 810, 820, 830 or 840, whose direction is adjusted as shown in the second portion of FIGS. 8A, 8B, 8C, and 8D, may be oriented to be in the predetermined direction (e.g., +y-axis direction). For example, the identified object 822 or 842 as shown in the first portions of FIGS. 8B and 8D, may be oriented to be in the +x-axis direction (or zero degree direction). In this case, the processor 130 may adjust the direction of the image content 820 or 840 by rotating the image content 820 or 840 by +90 degrees (or by 90 degrees in the counterclockwise direction) for the identified object 822 or 842 to be oriented in the predetermined direction (or +y-axis direction or 90 degree direction).

In addition, the processor 130 may control the display 110 to display the image content 810, 820, 830 or 840 whose direction is adjusted.

Here, in the second portion of FIG. 8A or 8B, the type of the image content 810 or 820 whose direction is adjusted is the portrait type. In this case, the type of the image content 810 or 820 whose direction is adjusted and the position of the disposed display 110 may be different from each other, thereby causing the left and right blanks. In the second portion of FIG. 8C or 8D, the type of the image content 830 or 840 whose direction is adjusted is the landscape type. In this case, the type of the image content 830 or 840 whose direction is adjusted and the orientation of the disposed display 110 may be the same as each other, thereby minimizing the left and right blanks.

In addition, the processor 130 may control the motor 120 to rotate the display 110 in case that the predetermined event is provided. Here, the case where the predetermined event is provided may be at least one of a case where the orientation of the display 110 and the type of the image content 810 or 820 displayed on the display 110 are different from each other as shown in the second portion of FIG. 8A or 8B, or a case where the processor 130 receives the user command corresponding to the user interface (UI) for rotating the display 110.

The processor 130 may identify that the predetermined event is provided in case that the orientation of the display 110 and the type of the image content 810 or 820 displayed on the display 110 are different from each other as shown in the second portion of FIG. 8A or 8B.

To this end, the processor 130 may identify the orientation of the display 110 on the basis of a reference orientation (e.g., landscape orientation) of the display 110 and the control signal of the motor 120. In addition, the display device 100 may include a sensor 180 (see FIG. 20) such as an acceleration sensor which may detect the orientation of the display 110. In this case, the processor 130 may identify the orientation of the display 110 on the basis of a detection signal value of the sensor 180.

In addition, the processor 130 may identify the type of the image content 810, 820, 830 or 840 on the basis of the direction of the object 812, 822, 832 or 842. For example, the processor may identify a direction parallel to the direction of the object 812, 822, 832 or 842 as a height direction of the image content 810, 820, 830 or 840, and identify a direction perpendicular to the direction of the object 812, 822, 832 or 842) as a width direction of the image content 810, 820, 830 or 840. Here, the processor may identify the type of image content 810, 820, 830 or 840 as the portrait type in case that the number of pixels included in the height direction is greater than the number of pixels included in the width direction, and identify the type of image content 810, 820, 830 or 840 as the landscape type in case that the number of pixels included in the height direction is less than the number of pixels included in the width direction. However, this identification is only an example, and may be implemented in various ways. For example, a length of the image content in the width direction may be a width (or number of pixels) of one region (or an upper region) 815, 825, 835 or 845 of the image content 810, 820, 830 or 840 whose direction intersects the direction of the object 812, 822, 832 or 842, and a length of the image content in the height direction may be a height (or number of pixels) of the other region of the image content 810, 820, 830 or 840. Here, the type of the image content 810, 820, 830 or 840 may be the landscape type in case that its length in the width direction is longer than its length in the height direction, and the type of the image content 810, 820, 830 or 840 may be the portrait type in case that its length in the width direction is shorter than its length in the height direction.

As shown in the third portion of FIGS. 8A and 8B, the processor 130 may control the motor 120 to rotate the display 110 in case that the predetermined event is provided. In addition, the processor 130 may control the display 110 to rotate the displayed image content 810 or 820 in the direction opposite to the direction in which the display 110 is rotated in case that the display 110 is rotated by the motor 120. Here, the display 110 may be rotated by 90 degrees in the clockwise direction (or in the counterclockwise direction), and the orientation of the rotated display 110 may be the portrait orientation. In addition, the displayed image content 810 or 820 may be rotated by 90 degrees in the counterclockwise direction (or in the clockwise direction) opposite to the rotation direction of the display 110, and the type of the image content 810 or 820 may be the portrait type.

Here, the object 812 or 822 included in the image content 810 or 820 displayed on the display 110 may be oriented in the normal direction, and the orientation of the display 110 and the type of the image content 810 or 820 may be the same as each other, thereby minimizing the occurrence of the blank. That is, the image content 810 or 820 displayed on the display 110 may have a maximized size of the image content 810 or 820 while maintaining the ratio of the width to the height. In addition, the object 812 or 822 may be displayed on the display 110 in a direction that is natural to the user.

As such, the display device 100 may optimize the direction and size of the image content on the basis of the direction of the object and display the same on the display 110. Accordingly, the display device 100 may provide the user with the optimized viewing experience.

In the second portion of FIG. 8C or 8D, the type of the image content 830 or 840 and the orientation of the display 110 may be the same as each other, and the image content 830 or 840 may thus be optimized and displayed on the display 110.

Even in this case, the user command for rotating the display 110 may be received. Here, the processor 130 may control the motor 120 to rotate the display 110 as shown in the third portion of FIG. 8C or 8D. In addition, the processor 130 may control the display 110 to rotate the displayed image content 830 or 840 in the direction opposite to the rotation direction of the display 110 in case that the display 110 is rotated by the motor 120.

FIGS. 9A to 9D are views illustrating the operation of the display device in a state where the display is disposed in a portrait orientation according to an embodiment. Meanwhile, the description omits or briefly describes a content overlapping with the above description with reference to FIGS. 8A to 8D.

Referring to FIG. 9A to FIG. 9D, FIGS. the first portion of FIG. 9A, 9B, 9C, or 9D shows an image content 910, 920, 930 or 940 provided from the source and a state before the display device 100 displays the image content 910, 920, 930 or 940 on the display 110. Here, the image content 910, 920, 930 or 940 may include an object 912, 922, 932 or 942 such as the cat, and the display 110 may be disposed in the portrait orientation. However, the display device 100 may identify a type of the image content 910, 920, 930 or 940 based on the object 912, 922, 932 or 942 rather than the type of the image content 910, 920, 930 or 940 provided from the source. A length of the image content in the width direction may be a width (or number of pixels) of one region (or an upper region) 915, 925, 935 or 945 of the image content 910, 920, 930 or 940 whose direction intersects the direction of the object 912, 922, 932 or 942, and a length of the image content in the height direction may be a height (or number of pixels) of the other region of the image content 910, 920, 930 or 940.

Figure 9C:
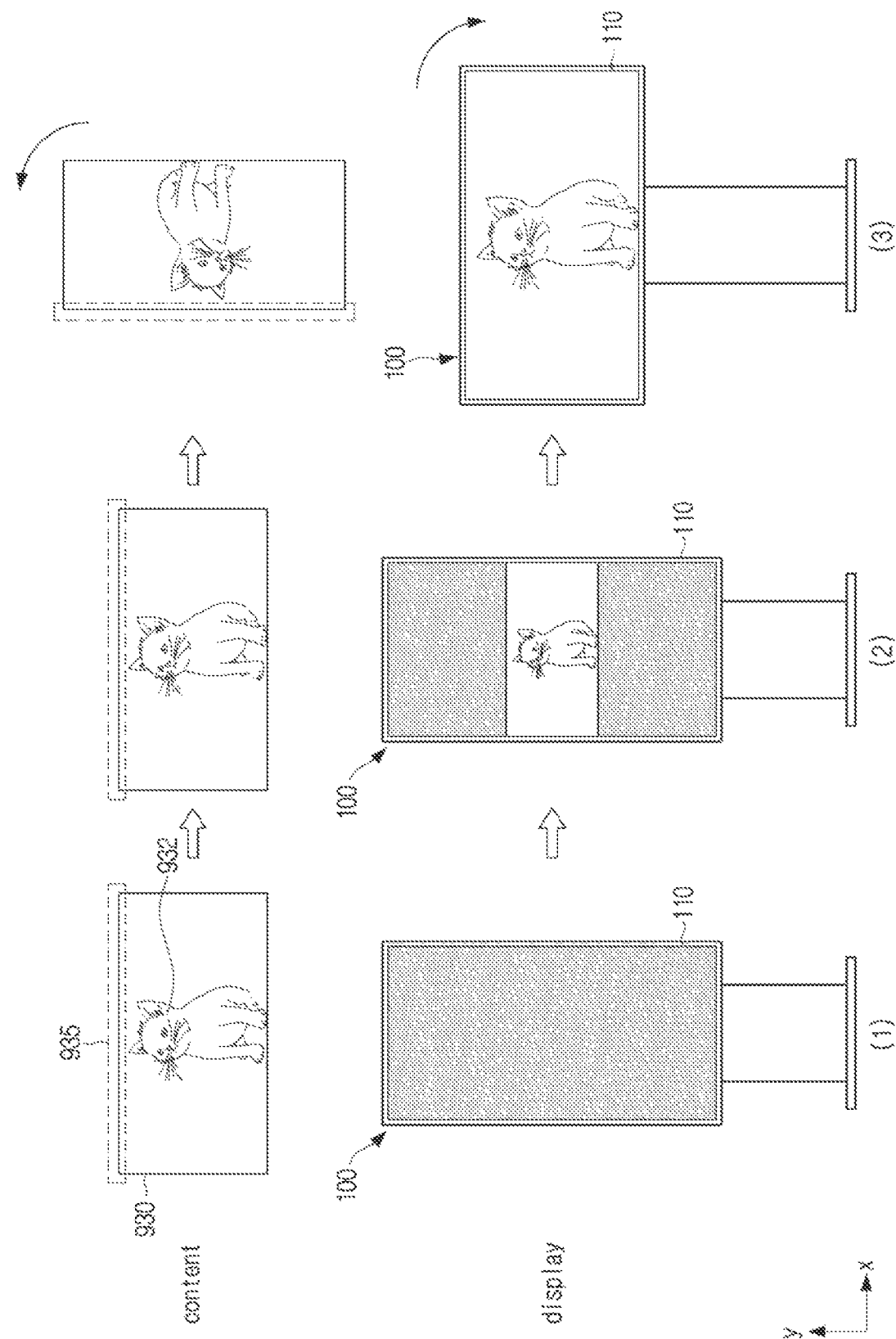
FIG. 9C is a view illustrating an operation of the display device in a state where the display is disposed in the portrait orientation according to an embodiment.

The first portion of FIG. 9A or 9D shows that the image content 910 or 940 provided from the source has a content resolution of the portrait type. The first portion of FIG. 9B or 9C shows that the image content 920 or 930 provided from the source has a content resolution of the landscape type.

The processor 130 may identify the direction of the object 912, 922, 932 or 942 included in the image content 910, 920, 930 or 940 provided from the source. Here, in the first portion of FIG. 9A or 9C, the direction of the identified object 912 or 932 may be the +y-axis direction. In addition, in the first portion of FIG. 9B or 9D, the direction of the identified object 922 or 942 may be the +x-axis direction.

Referring to the second portion of FIG. 9A, 9B, 9C, or 9D, the processor 130 may adjust the direction of the image content 910, 920, 930 or 940 for the identified object 912, 922, 932 or 942 to be oriented in the predetermined direction (e.g., +y-axis direction).

Here, the object 912, 922, 932 or 942 included in the image content 910, 920, 930 or 940, whose direction is adjusted as shown in the second portion of FIG. 9A, 9B, 9C, or 9D, may be oriented to be in the predetermined direction (e.g., +y-axis direction). For example, the identified object 922 or 942 as shown in the first portion of FIGS. 9B and 9D may be oriented to be in the +x-axis direction (or zero degree direction). In this case, the processor 130 may adjust the direction of the image content 920 or 940 by rotating the image content by +90 degrees (or by 90 degrees in the counterclockwise direction) for the identified object 922 or 942 to be oriented in the predetermined direction (or +y-axis direction or 90 degree direction).

In addition, the processor 130 may control the display 110 to display the image content 910, 920, 930 or 940 whose direction is adjusted.

Here, in the second portion of FIG. 9A or 9D, the type of the image content 910 or 920 whose direction is adjusted is the portrait type. In this case, the type of the image content 910 or 920 whose direction is adjusted and the orientation of the disposed display 110 may be the same as each other, thereby minimizing upper and lower blanks. In the second portion of FIG. 9C or 9D, the type of the image content 930 or 940 whose direction is adjusted is the landscape type. In this case, the type of the image content 930 or 940 whose direction is adjusted and the orientation of the disposed display 110 may be different from each other, thereby causing the upper and lower blanks.

The processor 130 may identify that the predetermined event is provided in case that the orientation of the display 110 and the type of the image content 930 or 940 displayed on the display 110 are different from each other as shown in the second portion of FIG. 9C or 9D.

As shown in the third portion of FIGS. 9A and 9B, the processor 130 may control the motor 120 to rotate the display 110 in case that the predetermined event is provided. In addition, the processor 130 may control the display 110 to rotate the displayed image content 930 or 940 in the direction opposite to the rotation direction of the display 110 in case that the display 110 is rotated by the motor 120. Here, the display 110 may be rotated by 90 degrees in the clockwise direction (or in the counterclockwise direction), and the orientation of the rotated display 110 may be the landscape orientation. In addition, the displayed image content 930 or 940 may be rotated by 90 degrees in the counterclockwise direction (or in the clockwise direction) opposite to the rotation direction of the display 110, and the type of the image content 930 or 940 may be the landscape type.

Here, the object 932 or 942 included in the image content 930 or 940 displayed on the display 110 may be oriented in the normal direction, and the orientation of the display 110 and the type of the image content 930 or 940 may be the same as each other, thereby minimizing the occurrence of the blank. That is, the image content 930 or 940 displayed on the display 110 may have a maximized size of the image content 930 or 940 while maintaining the ratio of the width to the height. In addition, the object 932 or 942 may be displayed on the display 110 in a direction that is natural to the user.

Meanwhile, in the second portion of FIG. 9A or 9B, the type of the image content 910 or 920 and the orientation of the display 110 may be the same as each other, and the image content 910 or 920 may thus be optimized and displayed on the display 110.

Even in this case, the user command for rotating the display 110 may be received. Here, the processor 130 may control the motor 120 to rotate the display 110 as shown in the third portions of FIG. 9A or 9B. In addition, the processor 130 may control the display 110 to rotate the displayed image content 910 or 920 in the direction opposite to the rotation direction of the display 110 in case that the display 110 is rotated by the motor 120.

Meanwhile, directions of a plurality of objects 1011 and 1012 included in an image content 1010 may be different from each other. In this case, the processor 130 according to an embodiment may adjust the image content to be oriented in a predetermined direction of a reference object on the basis of the directions of the objects according to the predetermined priority. Here, the predetermined priority may be set in an order of the text and the animal. This priority is described with reference to FIG. 10.

Figure 10:
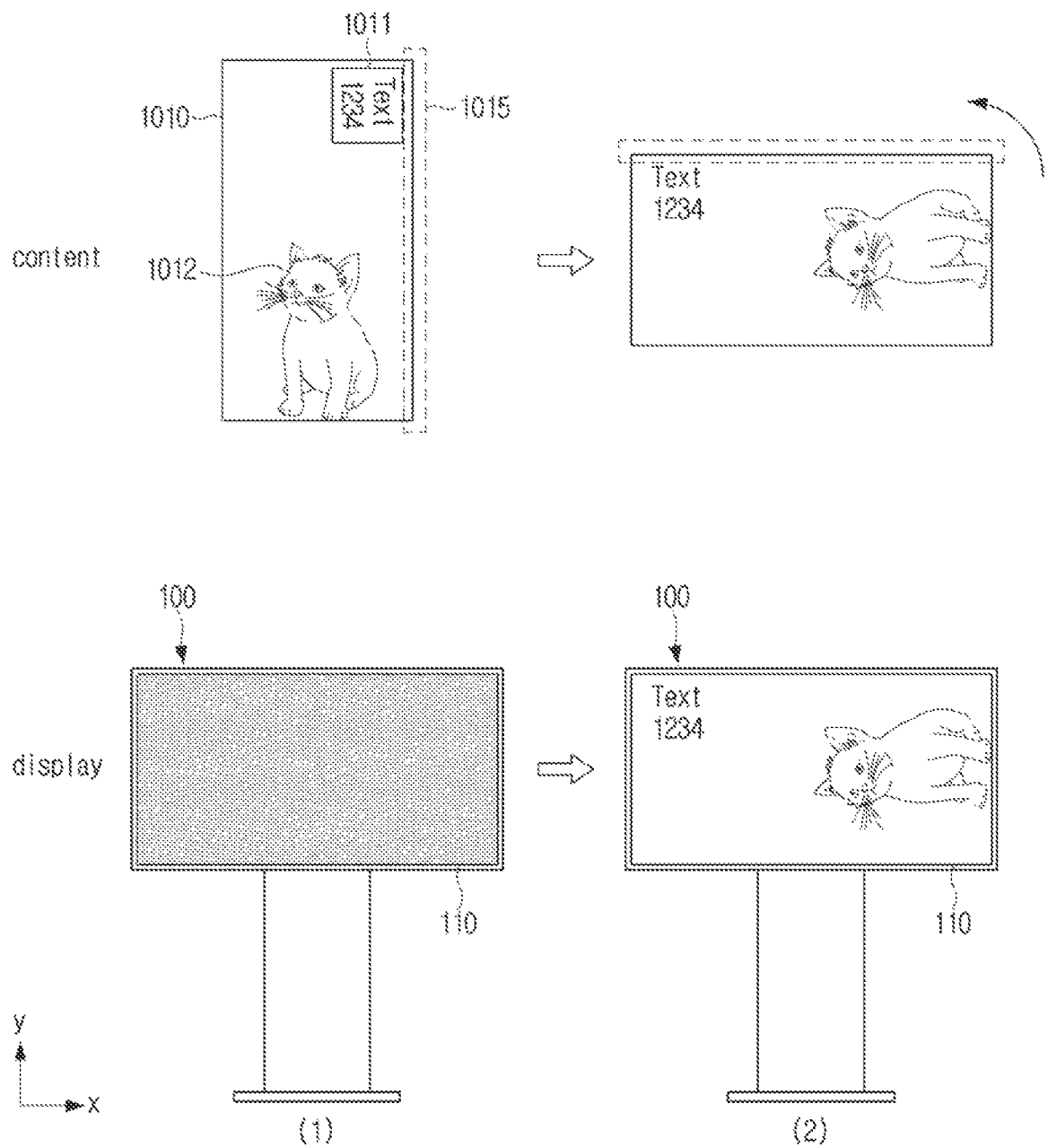
FIG. 10 is a view illustrating an operation of the display device in a state where a text and an animal have directions different from each other according to an embodiment.

FIG. 10 is a view illustrating the operation of the display device in a state where the text and the animal have directions different from each other according to an embodiment.

Referring to FIG. 10, the image content 1010 may include the text 1011 and the animal 1012 whose directions are different from each other. In this case, the processor 130 may adjust a direction of the image content 1010 for the text 1011 to be oriented in the predetermined direction based on the direction of the text 1011.

For example, as shown in the first portion of FIG. 10, the image content 1010 provided from the source may include the text 1011 and the animal 1012.

In this case, the processor 130 may identify, as the +x axis direction, the direction (or direction oriented from a lower end portion to an upper end portion) of the text 1011 included in the image content 1010, and identify, as a +y-axis direction, the direction (or direction oriented from a lower end portion to an upper end portion) of the animal 1012 included in the image content 1010.

In addition, the processor 130 may identify that the text 1011 and the animal 1012 whose directions are different from each other are included in the image content 1010, and adjust the direction of the image content 1010 for the direction (e.g., +x-axis direction) of the text 1011 to be the predetermined direction (e.g., +y-axis direction) based on the direction (e.g., +x-axis direction) of the text 1011. In this case, the processor 130 may rotate the image content 1010 by +90 degrees (or by 90 degrees in the counterclockwise direction).

In addition, as shown in the second portion of FIG. 10, the processor 130 may control the display 110 to display the image content 1010 whose direction is adjusted.

In this manner, the display device 100 may give the priority to the direction of the text to adjust the direction of the image content and then display the same on the display 110, thereby preventing the lower transmission power of the information indicated by the text.

Meanwhile, the above-mentioned priority is only an example, and the priority may be set or changed in various ways.

Figure 11:
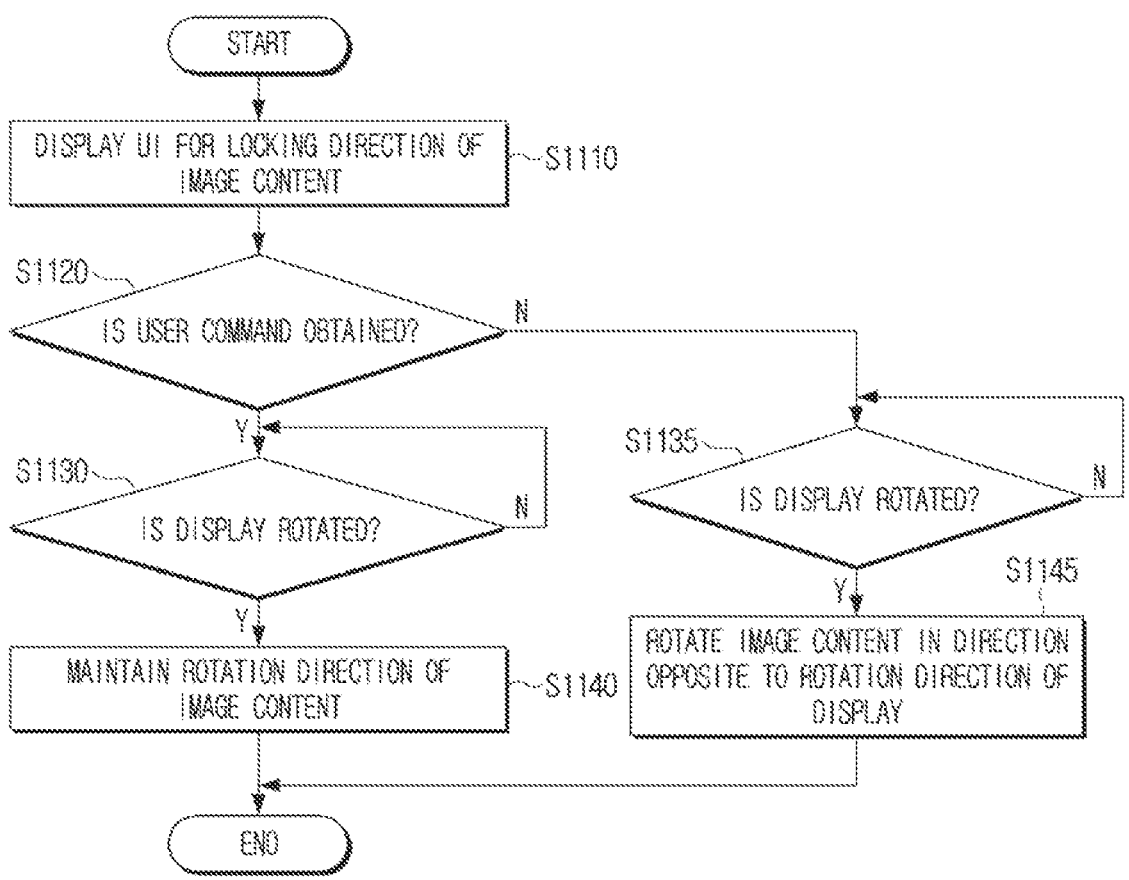
FIG. 11 is a view illustrating a function to fix an image direction of an image content according to an embodiment.
Figure 12:
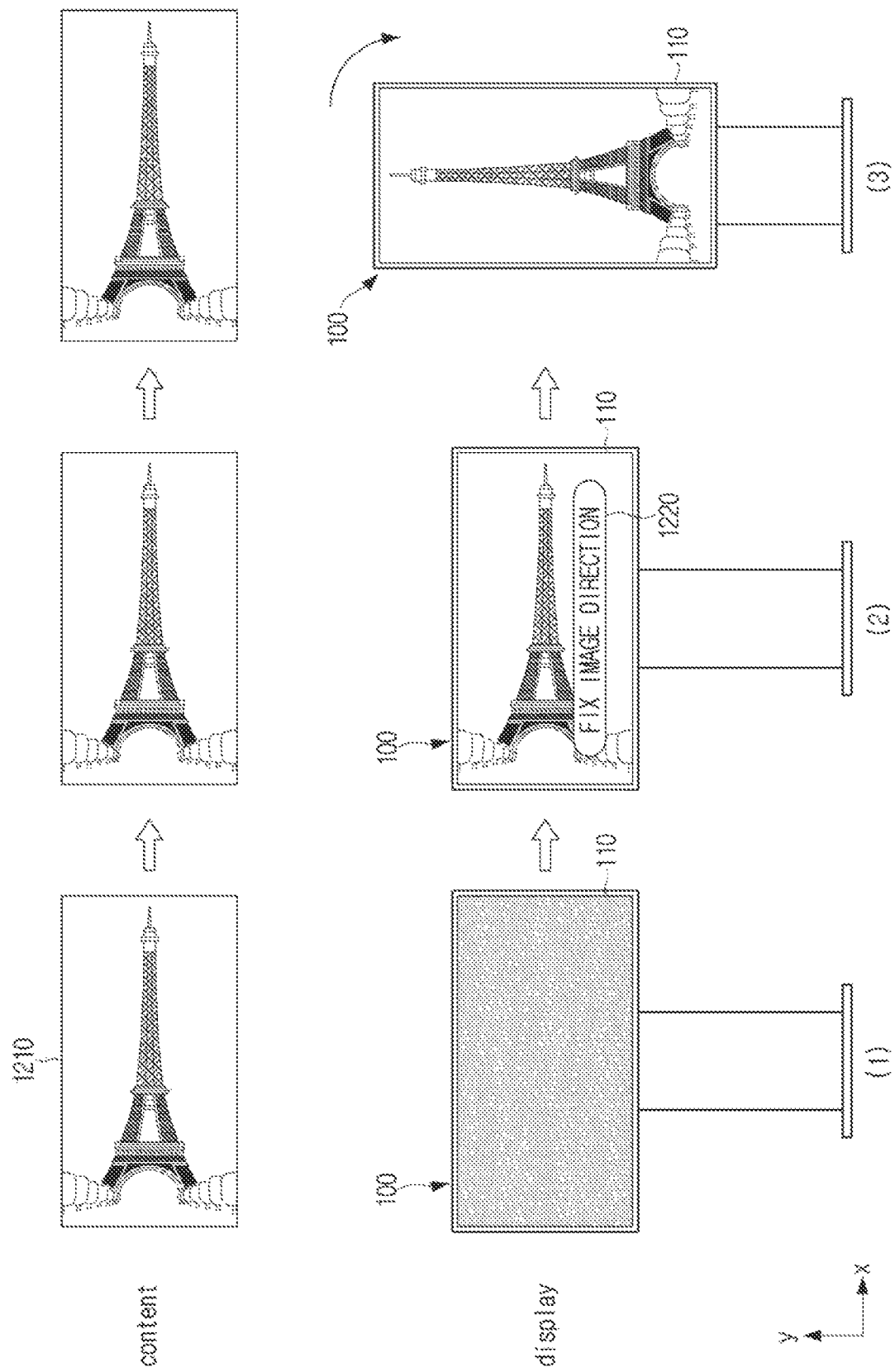
FIG. 12 is a view illustrating a function to fix an image direction of an image content according to an embodiment.

FIGS. 11 and 12 are views illustrating a function to fix the image direction of the image content according to an embodiment.

The display device 100 according to an embodiment may provide the function to fix the image direction of the image content.

Referring to FIGS. 11 and 12, the processor 130 may control the display 110 to display a user interface (UI) S1220 for fixing the image direction of the image content S1210 (or for locking the image direction, prohibiting rotation of the image, preventing the rotation of the image, or the like) in case that the predetermined event is provided (S1110).

In detail, the predetermined event may be at least one of an event where the direction of the object included in the image content is not identified, an event where the display device 100 starts to receive the image content such as a TV broadcast signal, or an event where the display device 100 starts to receive the image content from an external electronic device connected through the high definition multimedia interface (HDMI) or the like.

For example, the display device 100 may be connected to the external electronic device while not connected to the external electronic device, or the display device 100 may be connected to the external electronic device while the external electronic device in a power-off state is powered on. In this case, as shown in the first portion of FIG. 12, the processor 130 of the display device 100 may start to receive the image content 1210 from the external electronic device.

Here, the processor 130 may identify that the predetermined event is provided, and display the UI 1220 for fixing the image direction of the image content 1210 as shown in the second portion of FIG. 12. The UI 1220 may be implemented in the form of at least one of the message, the image or the icon.

A user command corresponding to the UI 1220 for fixing the image direction may be received (S1120-Y). In this case, the processor 130 may set the function to fix the image direction to be performed (or in an ON state). Here, the user command corresponding to the UI 1220 may be the user command for selecting the icon included in the UI 1220. For example, the user command may be various types of input, such as the button press command, the touch command, and a user voice command.

In addition, the display 110 may be rotated after the user command is received (S1130-Y). In this case, the processor 130 may control the display 110 to maintain (or fix) the image direction of the image content 1210 as shown in FIG. 12-3 and display the same (S1140). That is, the processor 130 may not rotate the image content 1210 in case that the display 110 is rotated while the function to fix the image direction is in the ON state.

Accordingly, from a user viewpoint, the image content 1210 displayed on the display 110 may also appear to be rotated by 90 degrees in the counterclockwise direction in case that the display 110 is rotated by 90 degrees in the counterclockwise direction.

Meanwhile, the user command corresponding to the UI 1220 for fixing the image direction may not be received (S1120-N). In this case, the processor 130 may set the function to fix the image direction not to be performed (or in an off-state).

In addition, the display 110 may be rotated (S1135-Y) while the user command is not received. In this case, the processor 130 may rotate the image content in the direction opposite to the rotation direction of the display 110 (S1145). That is, the processor 130 may rotate the image content 1210 in the direction opposite to the rotation direction of the display 110 in case that the display 110 is rotated while the function to fix the image direction is in an OFF state.

Accordingly, from the user viewpoint, the image content displayed on the display 110 may appear not to be rotated in case that the display 110 is rotated by 90 degrees in the counterclockwise direction.

Figure 13:
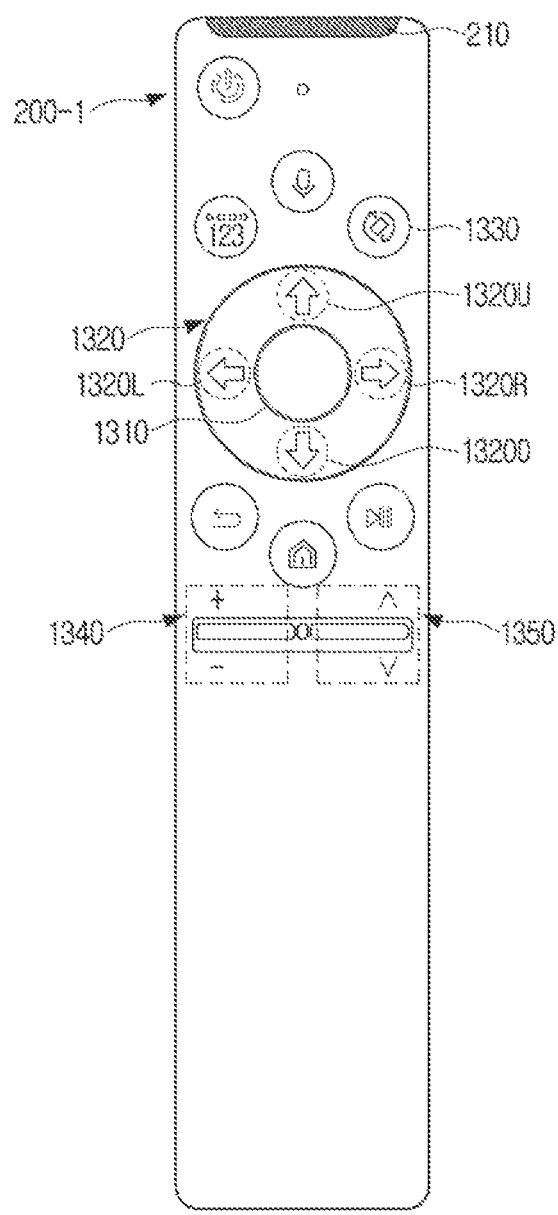
FIG. 13 is a view illustrating an external device according to an embodiment.
Figure 14:
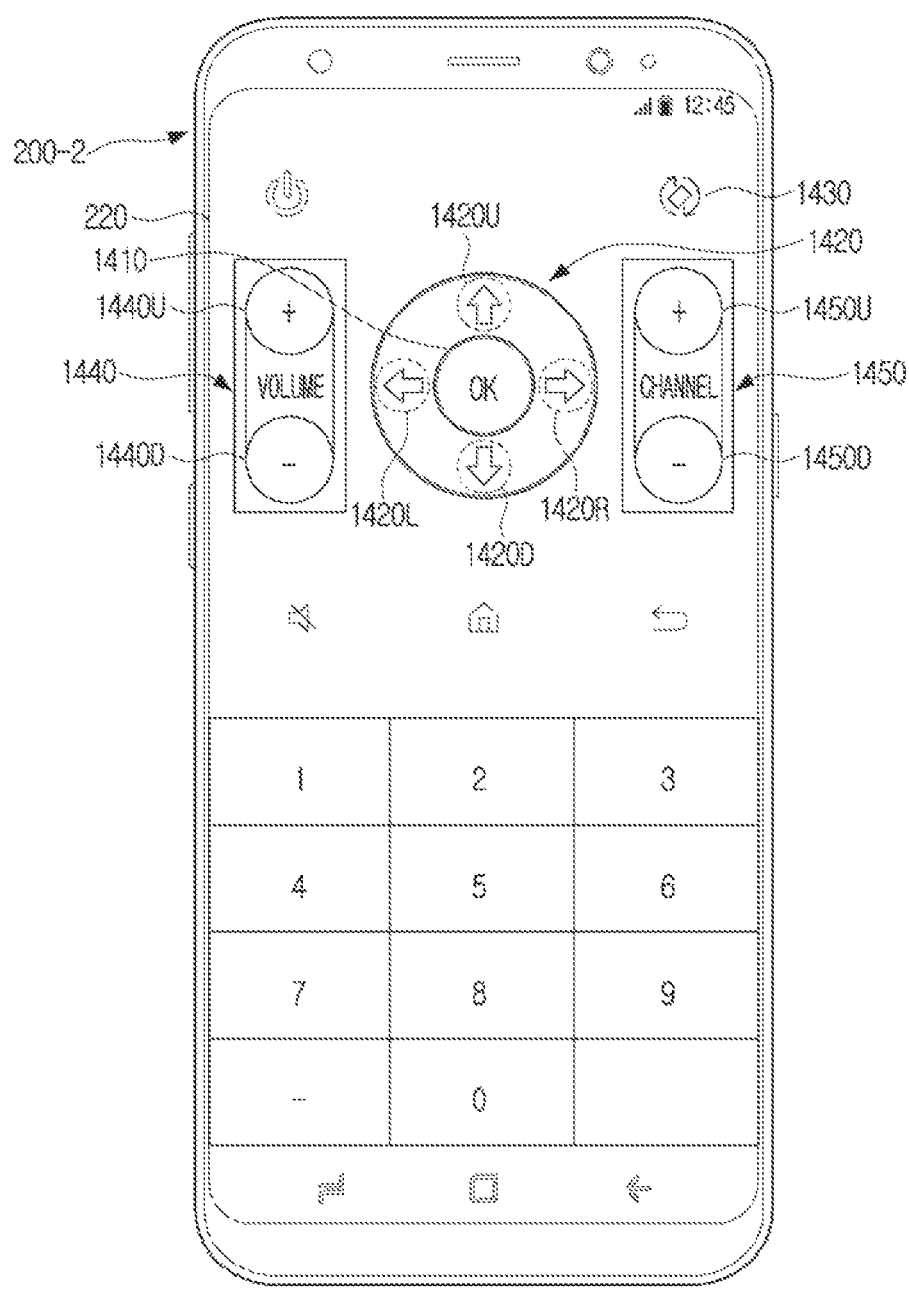
FIG. 14 is a view illustrating an external device according to an embodiment.

FIGS. 13 and 14 are views illustrating the external device according to an embodiment.

Referring to FIGS. 13 and 14, the external device 200-1 or 200-2 may transmit the signal for controlling the display device 100 to the display device 100. In addition, the display device 100 may perform the operation corresponding to the received signal.

Here, the first external device 200-1 according to an embodiment may be implemented as the electronic device such as the remote controller. In addition, the second external device 200-2 according to an embodiment may be implemented as the electronic device such as the smartphone.

The external device 200-1 or 200-2 may include the input interface and the communication interface.

The input interface may receive the user command. Here, the user command refers to a command that allows the user to manipulate the display device 100 or the external device 200-1 or 200-2 through the various ways such as the key (or button) input, the user voice input, the gesture input and the touch input.

To this end, the input interface may include various keys (, buttons or the like) for controlling the display device 100. The input interface may detect an input to a key by using the various methods such as the method of pressing a key, the method of touching a key, and a method of pushing the key in a specific direction. However, this input is only an example, and the input interface may be implemented as any of various interfaces such as the touch panel, the sensor and the microphone to detect various types of user input.

As an example, the key may be implemented as a physical key as hardware, or may be implemented as a virtual key as software displayed on the display 220. In case of the virtual key, for example, an application (e.g., SmartThings or remote control application) for controlling the display device 100 may be executed. In this case, as shown in FIG. 14, the second external device 200-2 may display icons (or objects) indicating various keys for controlling the display device 100 on a display 220. In this case, the second external device 200-2 may detect input to a key corresponding to a position where the user finger or the like touches through the touch panel coupled to the display 220 in case that the user finger or the like touches the position where a specific icon is displayed The key may indicate a medium the user manipulates to control the specific function of the display device 100. For example, referring to FIG. 13 or 14, the input interface may include a power key for turning on/off the power of the display device 100, a selection key 1310 or 1410 for selecting or executing an object on which the cursor is positioned among the objects (, menus or the like) displayed on the display device 100, a direction key 1320 or 1420 for moving the cursor for selecting the object (, menu or the like) displayed on the display device 100 based on the direction, a rotation key 1330 or 1430 for rotating the display 110 or image content of the display device 100, a volume control key 1340 or 1440 (1440U and 1440D) for adjusting a volume output from a speaker 140 (see FIG. 20) of the display device 100, a channel change key 1350 or 1450 (1450U and 1450D) for changing a channel of the image content displayed on the display 110 of the display device 100, a voice command key for receiving a voice uttered by the user through the microphone, etc. Here, the direction key 1320 or 1420 may include the following keys respectively having four directions of upward, downward, left and right directions respectively indicated by arrows: an upward direction key 1320U or 1420U, a downward direction key 1320D or 1420D, a left direction key 1320L or 1420L, and a right direction key 1320R or 1420R.

The communication interface may communicate with the display device 100 by using various types of communication methods (e.g., bluetooth, wi-fi or infrared communication). To this end, the communication interface may include at least one of a bluetooth module performing the bluetooth communication, a wi-fi module performing the wi-fi communication, an infrared (IR) module performing the infrared communication or a zigbee module (performing zigbee communication).

The communication interface may transmit a signal corresponding to the input user command to the display device 100 in case that the user command is input through the input interface. For example, the communication interface may transmit a signal corresponding to a pressed key to the display device 100 in case that the user presses a specific key.

In addition, the display device 100 may perform the operation corresponding to the received signal in case that the signal is received from the external device 200-1 or 200-2. For example, the display device 100 may rotate the display 110 on the basis of the received signal in case that the signal corresponding to input of the rotation key 1330 is received from the first external device 200-1.

Meanwhile, the separate rotation key 1330 may not be provided due to limitations of the size, design or the like of the first external device 200-1 in case that the physical key is positioned in the first external device 200-1. In this case, it is also possible to rotate the display 110 of the display device 100 through the input of the selection key 1310 of the first external device 200-1. In addition, the direction key 1320 of the four directions may not be positioned in the first external device 200-1. In this case, the direction key 1320 of the four directions may be displayed on the display 110 by being replaced by input of the volume control key 1340 of two directions and the channel change key 1350 of two directions, or changed to the UI including an object of two directions. Specific details thereof are described below.

Meanwhile, the second external device 200-2 may display, on the display 220, an icon (or object) indicating a display rotation key for rotating the display 110 of the display device 100 in the clockwise direction (or the counterclockwise direction) or an image rotation key for rotating the image content displayed on the display 110 in the clockwise direction (or the counterclockwise direction). The second external device 200-2 may transmit a signal corresponding to the touched key to the display device 100 in case that a touch on the display rotation key or the image rotation key displayed on the display 220 is detected. The display device 100 may rotate the display 110 or the image content in the clockwise direction (or in the counterclockwise direction) on the basis of the received signal.

Hereinafter, the description describes an example of rotating the image content or the display by using the UI for rotating the image content and the display according to an embodiment.

Figure 15:
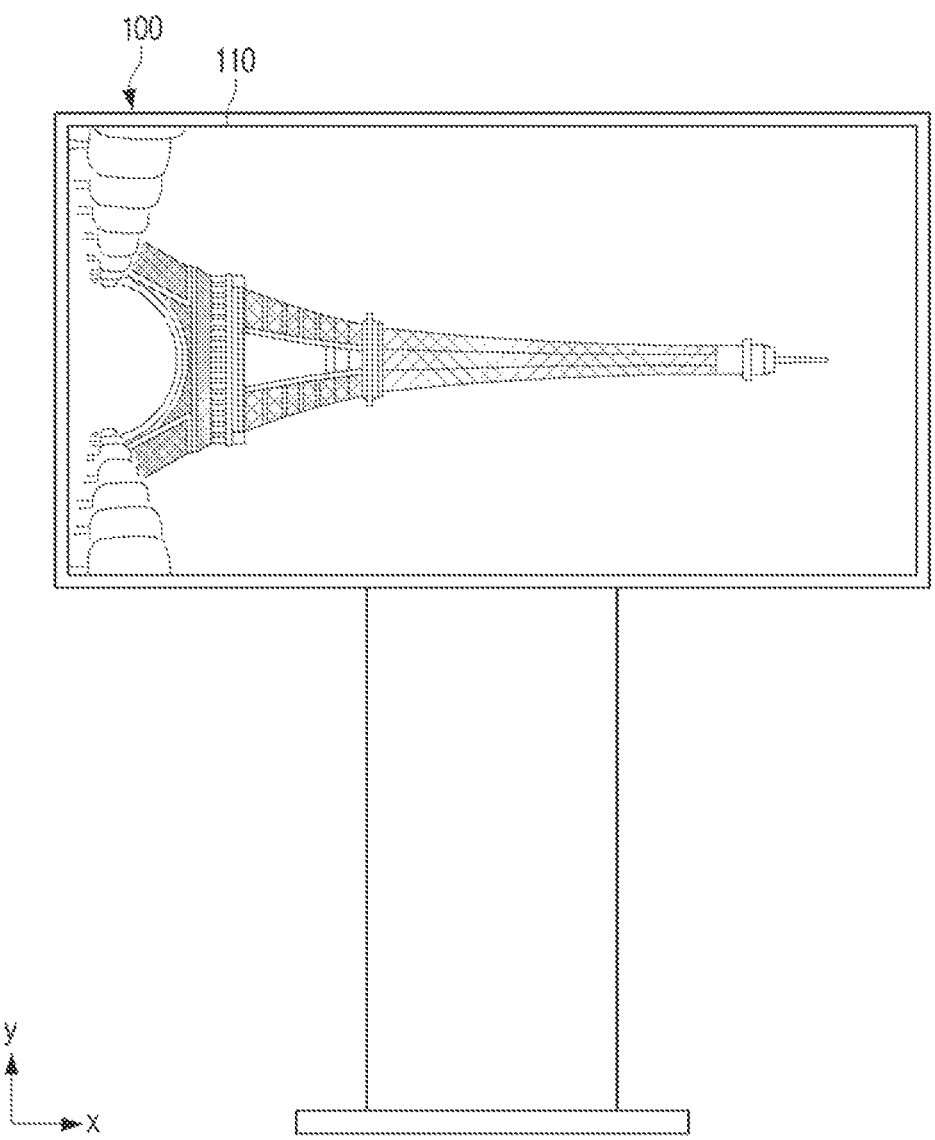
FIG. 15 is a view illustrating the display device according to an embodiment.

FIG. 15 is a view illustrating the display device according to an embodiment.

Referring to FIG. 15, the processor 130 of the display device 100 may display the image content on the display 110 disposed in the first orientation.

Here, as shown in FIG. 15, the description is provided assuming that the display 110 is disposed in the landscape orientation, and the image content including the object whose +x-axis direction is the upward direction is displayed on the display 110. Meanwhile, this case is only an example, and various modified examples are possible, such as the display 110 being disposed in the portrait orientation or the object being displayed in a different direction.

In addition, the processor 130 of the display device 100 may control the display 110 to display the user interface (UI) for rotating the image content or the display 110.

As an example, the processor 130 may control the display 110 to display the UI for rotating the image content or the display 110 in case that a signal according to input of the specific key is received from the external device 200-1 or 200-2 through the communication interface 170.

Here, the input specific key may be at least one of one input of the rotation key 1330 or 1430, twice input of the rotation key 1330 or 1430 that is input twice within predetermined time, or long press input of the rotation key 1330 or 1430 whose input time is greater than or equal to the predetermined time. Alternatively, the rotation key 1330 or 1430 may not be positioned in the external device 200-1 or 200-2. In this case, the input of the specific key may be at least one of twice input of the selection key 1310 or 1410 that is input twice for the predetermined time or long press input of the selection key 1310 or 1410 whose input time is greater than or equal to the predetermined time. However, this case is only an example and the input of the specific key may be variously modified.

Hereinafter, the description describes the user interface (UI) for rotating the image content and the display 110 with reference to FIGS. 16A to 16F and 17.

FIGS. 16A to 16F are views illustrating the user interface (UI) for controlling the rotation of the display or image content according to an embodiment. FIG. 17 is a view illustrating the operation of the display device according to an embodiment.

Referring to FIGS. 16A to 16F, the processor 130 may control the display 110 to display the user interface (UI) for rotating the image content and the display 110.

Here, the UI may include a plurality of objects 1601D to 1606L. As an example, the UI may include a first object 1601D, 1602D, 1603D, 1604D, 1605D or 1606D for rotating the image content by 90 degrees in the clockwise direction, a second object 1601U, 1602U, 1603U, 1604U, 1605U or 1606U for rotating the image content by 90 degrees in the counterclockwise direction, a third object 1601R, 1602R, 1603R, 1604R, 1605R or 1606R for rotating the display 110 by 90 degrees in the clockwise direction, and a fourth object 1601L, 1602L, 1603L, 1604L, 1605L or 1606L for rotating the display 110 by 90 degrees in the counterclockwise direction.

Here, a signal according to a user command corresponding to one object among the plurality of objects 1601D to 1606L may be received from the external device 200-1 or 200-2 through the communication interface 170. In this case, the processor 130 may perform an operation on the basis of the received signal. For example, the signal according to input of a key corresponding to one of the first to fourth objects 1601D to 1606L may be received from the external device 200-1 or 200-2 through the communication interface 170. In this case, the processor 130 may rotate the display 110 or the image content on the basis of the received signal. In this case, the display device 100 may be operated as shown in FIG. 17.

Here, the plurality of objects 1601D to 1606L may each include a text or image indicating the operation performed by the display device 100.

In detail, the first object 1601D, 1602D, 1603D, 1604D, 1605D or 1606D may represent a function of rotating the image content by 90 degrees in the clockwise direction, performed by the display device 100, in case that the user command corresponding to the first object 1601D, 1602D, 1603D, 1604D, 1605D or 1606D is input. In addition, the second object 1601U, 1602U, 1603U, 1604U, 1605U or 1606U may represent a function of rotating the image content by 90 degrees in the counterclockwise direction, performed by the display device 100, in case that the user command corresponding to the second object 1601U, 1602U, 1603U, 1604U, 1605U or 1606U is input. In addition, the third object 1601R, 1602R, 1603R, 1604R, 1605R or 1606R may represent a function of rotating display 110 by 90 degrees in the clockwise direction, performed by the display device 100, in case that the user command corresponding to the third object 1601R, 1602R, 1603R, 1604R, 1605R or 1606R is input. In addition, the fourth object 1601L, 1602L, 1603L, 1604L, 1605L or 1606L may represent a function of rotating display 110 by 90 degrees in the counterclockwise direction, performed by the display device 100, in case that the user command corresponding to the fourth object 1601L, 1602L, 1603L, 1604L, 1605L or 1606L is input.

Figure 16A:
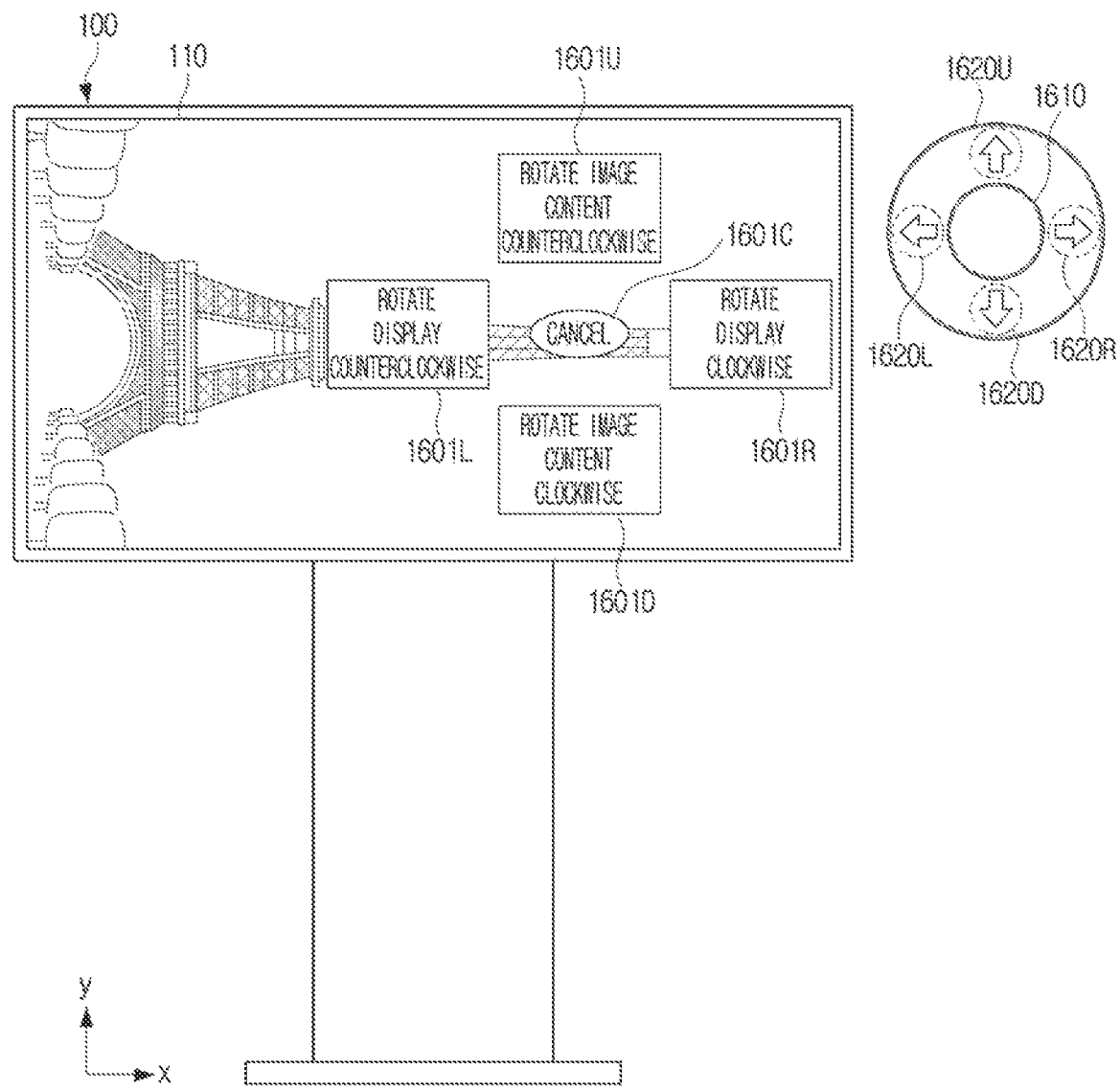
FIG. 16A is a view illustrating a user interface (UI) for controlling rotation according to an embodiment.
Figure 16B:
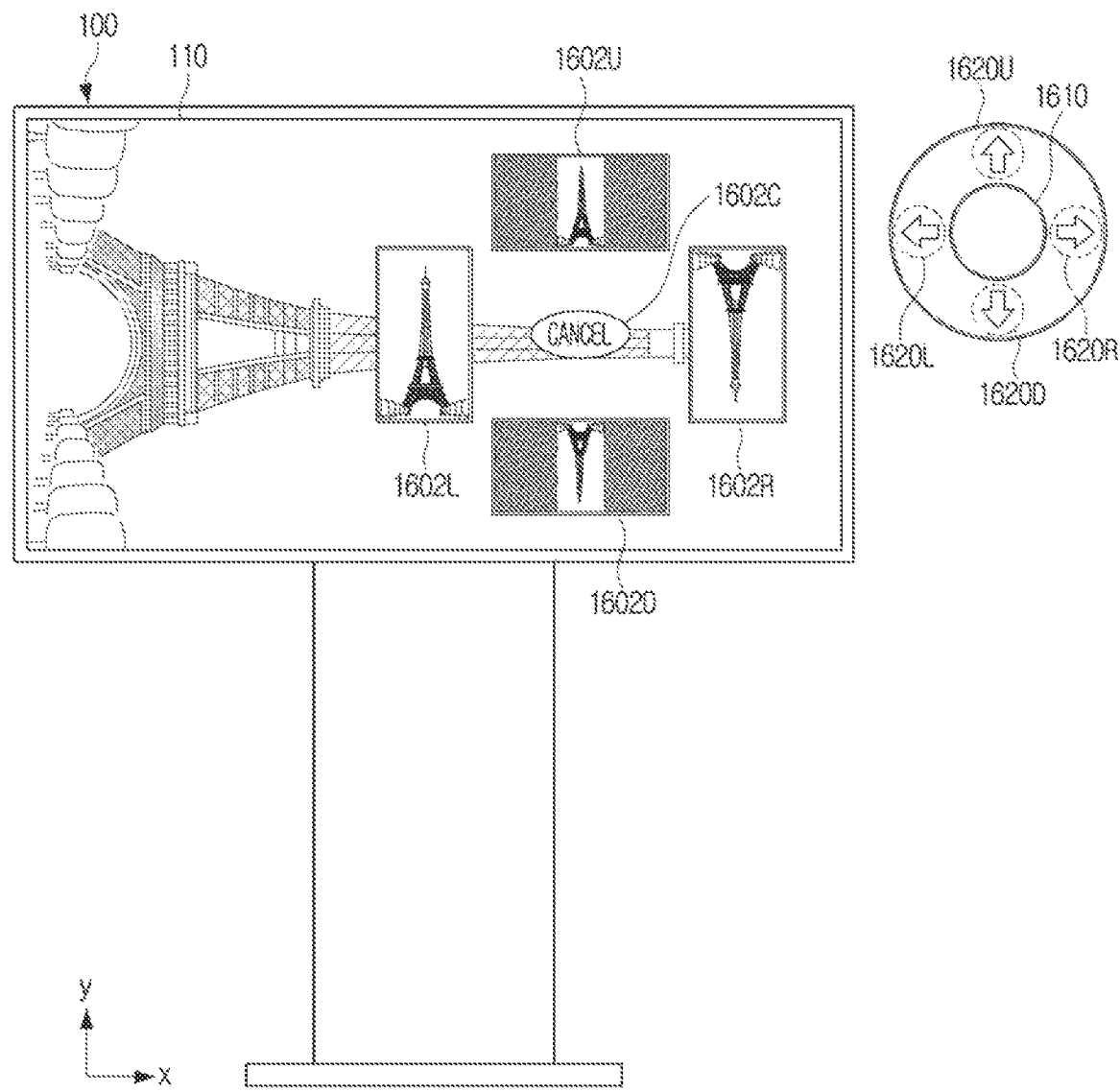
FIG. 16B is a view illustrating a user interface (UI) for controlling rotation according to an embodiment.
Figure 16C:
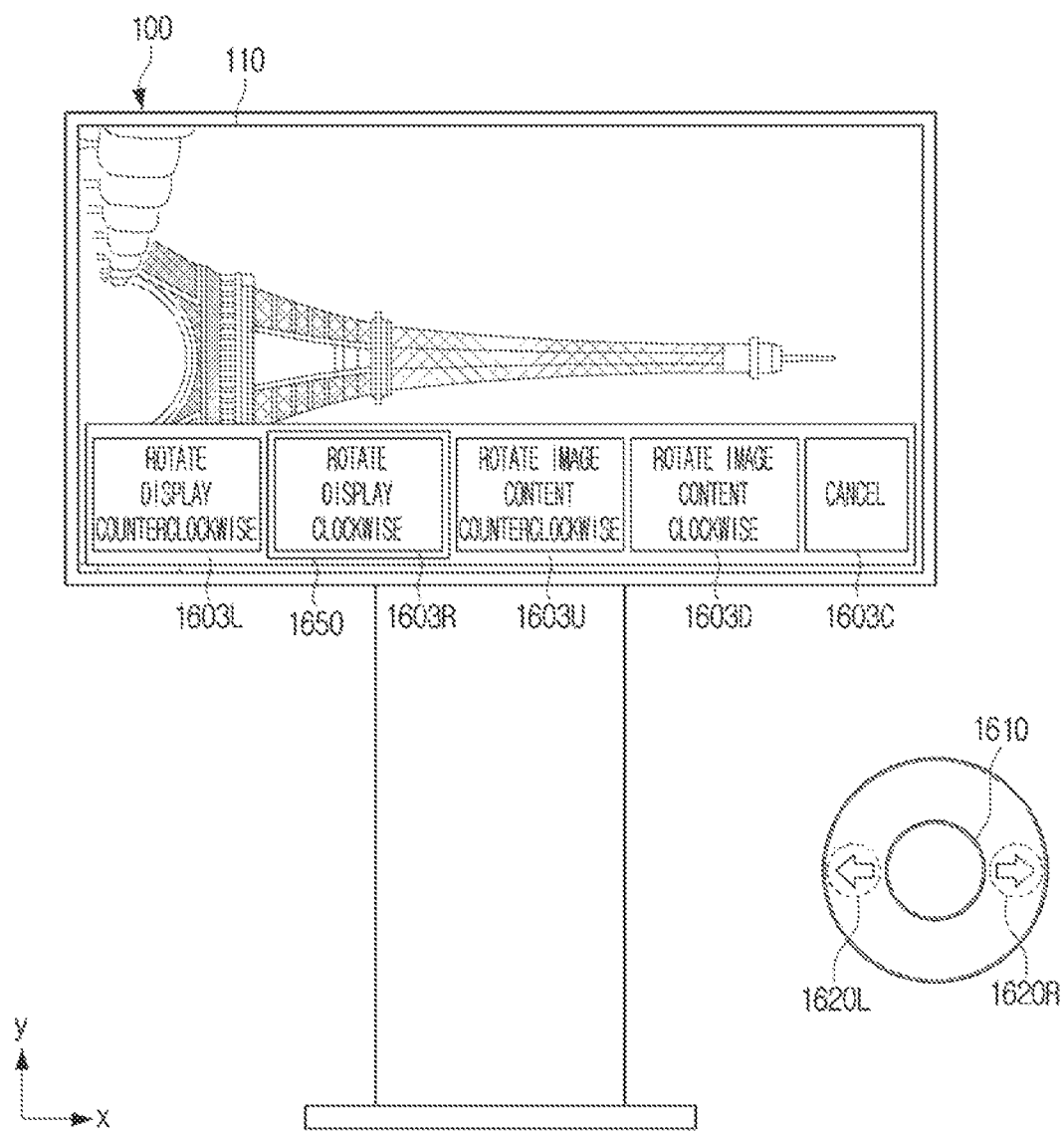
FIG. 16C is a view illustrating a user interface (UI) for controlling rotation according to an embodiment.
Figure 16D:
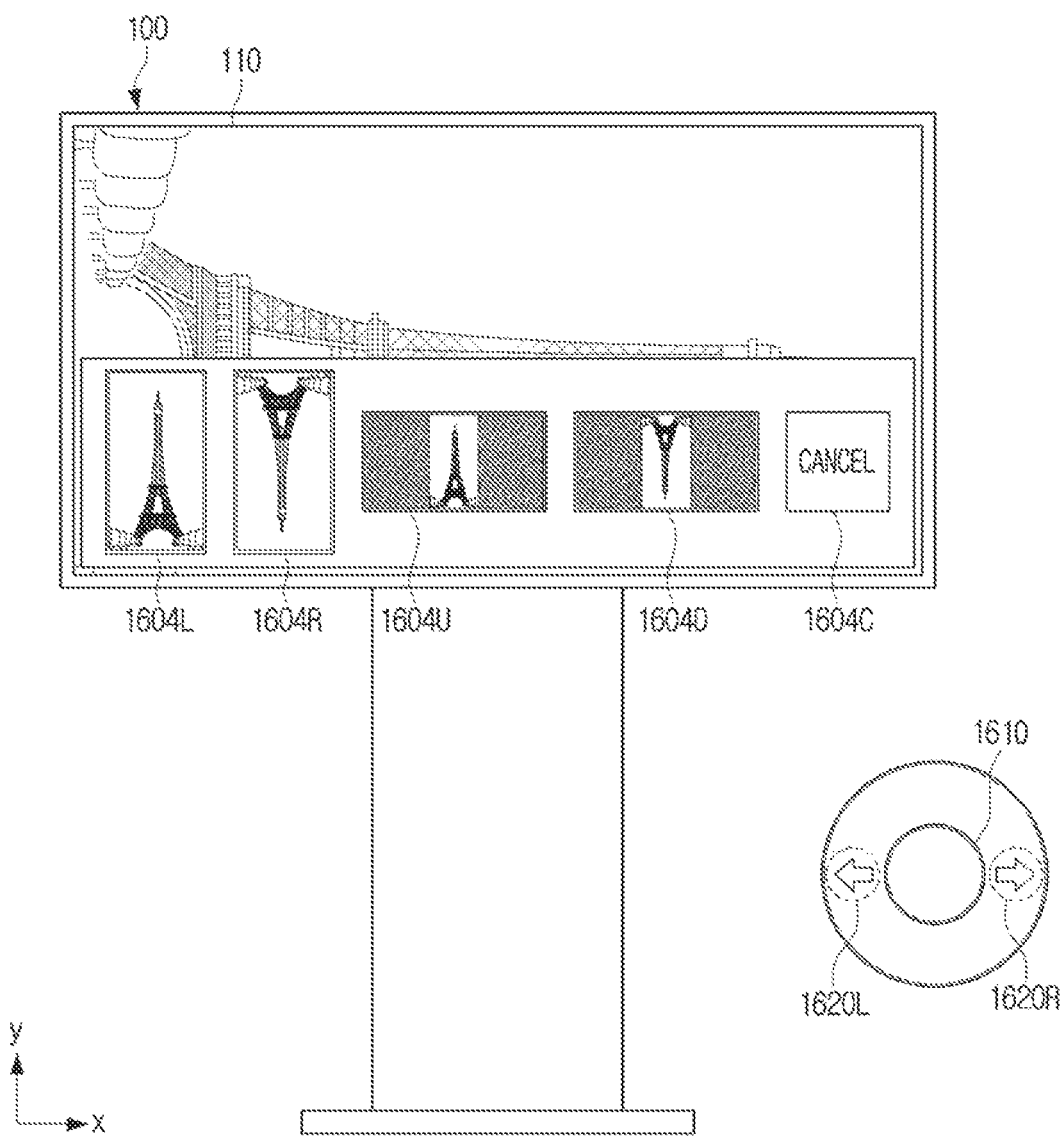
FIG. 16D is a view illustrating a user interface (UI) for controlling rotation according to an embodiment.
Figure 16E:
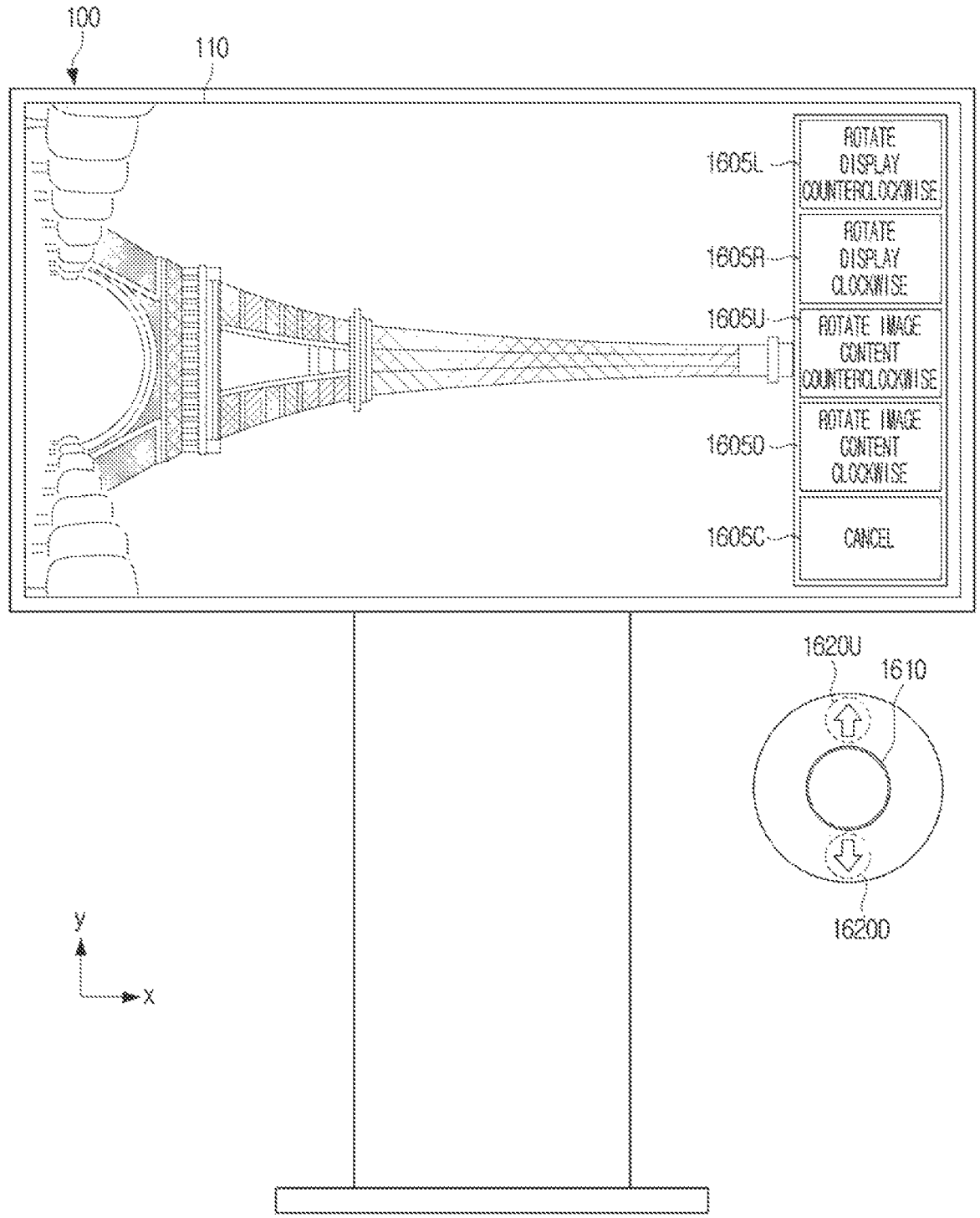
FIG. 16E is a view illustrating a user interface (UI) for controlling rotation according to an embodiment.
Figure 17:
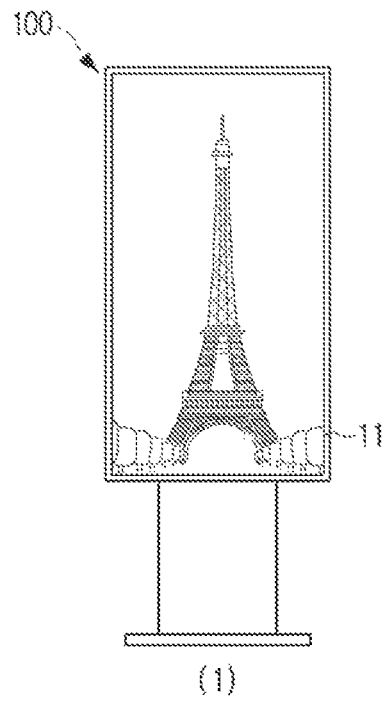
FIG. 17 is a view illustrating an operation of the display device according to an embodiment.
Figure 17:
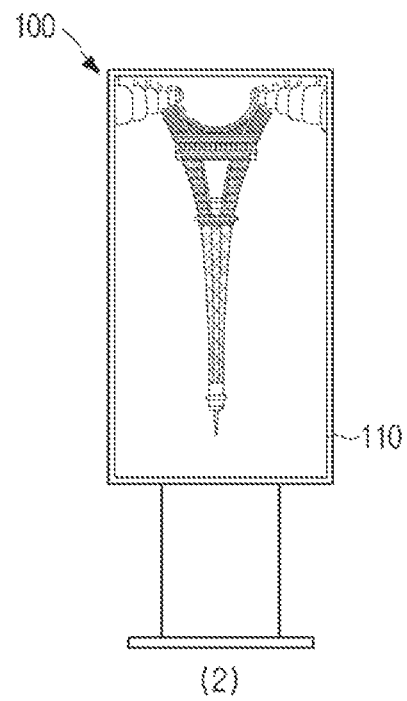
Figure 17:
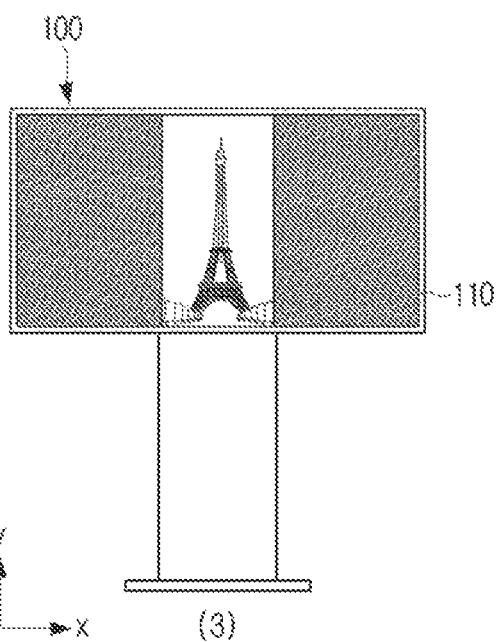
Figure 17:
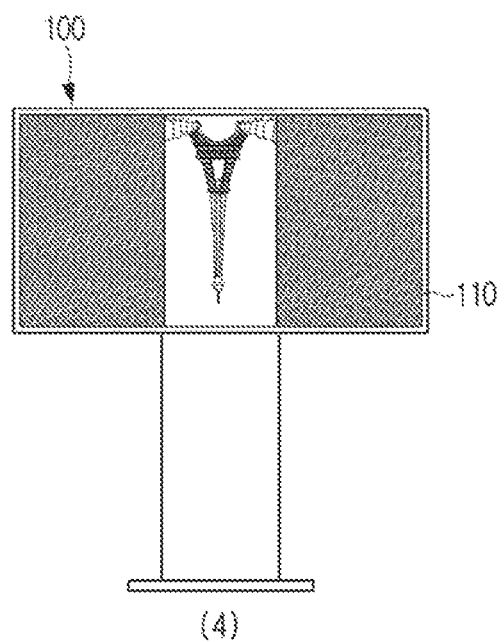

As an example, referring to FIG. 16A, 16C or 16E, the first object 1601D, 1603D or 1605D may include a text such as "rotate the image content clockwise." In addition, the second object 1601U, 1603U or 1605U may include a text such as "rotate the image content counterclockwise." In addition, the third object 1601R, 1603R or 1605R may include a text such as "rotate the display clockwise." In addition, the fourth objects 1601L, 1603L or 1605L may include a text such as "rotate the display counterclockwise." However, this text is only an example, and each object may be modified to include texts of various contents.

Figure 16F:
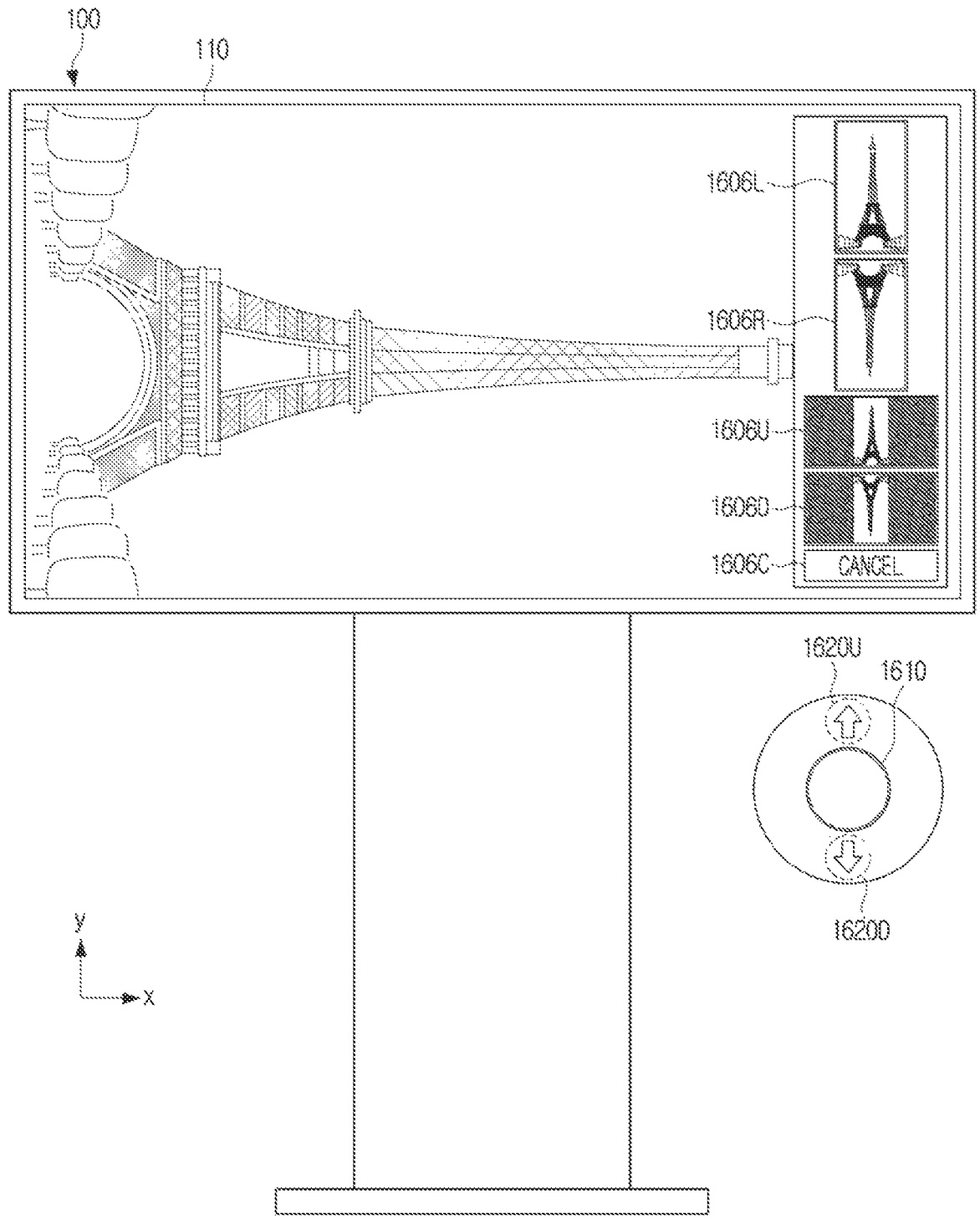
FIG. 16F is a view illustrating a user interface (UI) for controlling rotation according to an embodiment.

As another example, referring to FIG. 16B, 16D or 16F, the first object 1602D, 1604D or 1606D may include a preview image in which the image content is rotated by 90 degrees in the clockwise direction is displayed on the display 110 disposed in the first orientation. In addition, the second object 1602U, 1604U or 1606U may include a preview image in which the image content is rotated by 90 degrees in the counterclockwise direction is displayed on the display 110 disposed in the first orientation. In addition, the third object 1602R, 1604R or 1606R may include a preview image in which the image content is displayed on the display 110 rotated by 90 degrees in the clockwise direction to be disposed in the second orientation. In addition, the fourth object 1602L, 1604L or 1606L may include a preview image in which the image content is displayed on the display 110 rotated by 90 degrees in the counterclockwise direction to be disposed in the second orientation.

Here, the preview image may refer to an image showing in advance how the orientation of the display 110 and the direction of the image content displayed on the display 110 appear based on a result of the rotation of the display 110 or image content in the display device 100.

Meanwhile, the first orientation may indicate the orientation of the display 110 currently disposed, and the second orientation may indicate the orientation of the display 110 rotated by 90 degrees and then disposed. The first orientation may be one of the landscape orientation and the portrait orientation, and the second orientation may be the other one of the landscape orientation and the portrait orientation.

To this end, the processor 130 may obtain information on the orientation of the display 110 currently disposed. In this case, the processor 130 may obtain following information through the sensor 180 (see FIG. 20): the information on the orientation of the display 110 currently disposed, or a predetermined orientation (e.g., orientation which is one of the portrait and landscape orientations and set as a default) of the display 110 and the rotation degree of the display 110 driven by the motor 120.

That is, the preview image of the first object 1602D, 1604D or 1606D or second object 1602U, 1604U or 1606U may be an image showing that the image direction of the image content is rotated by 90 degrees in the clockwise or counterclockwise direction while the orientation of the display 110 disposed in the first orientation is fixed (or maintained). In addition, the preview image of the third object 1602R, 1604R or 1606R or the fourth object 1602L, 1604L or 1606L may be an image showing that the display 110 disposed in the first orientation is rotated in the clockwise or counterclockwise direction to be disposed in the second orientation while the image direction of the image content displayed on the display 110 disposed in the first orientation is fixed (or maintained).

Meanwhile, the above-described preview image is only an example, and each object may be modified to include various images (, icons or the like).

Meanwhile, the processor 130 according to an embodiment may control the display 110 to display each of the plurality of objects 1601D to 1606L to a size smaller than the image content displayed on the display 110. In addition, the processor 130 may control the display 110 to display the plurality of objects 1601D to 1606L in various ways such as displaying the plurality of objects 1601D to 1606L by using a picture-in-picture (PIP) method or a translucent method, dividing an entire region of the display 110 and displaying the plurality of objects 1601D to 1606L and the image content in each divided region, displaying the plurality of objects 1601D to 1606L in the entire region of the display 110 or the like.

Meanwhile, the processor 130 according to an embodiment may control the display 110 to display the plurality of objects 1601D to 1606L in an arrangement based on the input interface.

In this case, the plurality of objects 1601D to 1606L may be displayed on the display 110 to correspond to the disposition (or arrangement) of the plurality of direction keys 1310 and 1410 of the external devices 200-1 and 200-2. To this end, information on the disposition of the plurality of direction keys 1310 and 1410 included in the external devices 200-1 and 200-2 may be pre-stored in the memory 160 (see FIG. 20) of the display device 100.

As an example, as shown in FIGS. 16A and 16B, the plurality of direction keys 1310 and 1410 of the external devices 200-1 and 200-2 may include four direction keys indicating upward, downward, left and right directions such as an upward direction key 1620U, a downward direction key 1620D, and a left direction key 1620L and a right direction key 1620R. Here, the upward direction key 1620U may be disposed at a position indicating the upward direction, the downward direction key 1620D may be disposed at a position indicating the downward direction, the left direction key 1620L may be disposed at a position indicating the left direction, and the right direction key 1620R may be disposed at a position indicating the right direction.

In this case, the processor 130 may control the display 110 to display the first objects 1601D and 1602D to the fourth objects 1601L and 1602L at positions corresponding to the arrangement of the four direction keys 1620U to 1620R indicating the upward, downward, left and right directions.

In detail, the processor 130 may control the display 110 to display the first object 1601D or 1602D at the position indicating the downward direction, the second object 1601U or 1602U at the position indicating the upward direction, the third object 1601R or 1602R at a position indicating the right direction, and the fourth object 1601L or 1602L at a position indicating the left direction. Here, the first object 1601D or 1602D may be disposed downward (or at a position in the −y-axis direction) relative to the second object 1601U or 1602U. In addition, the third object 1601R or 1602R may be disposed at a position in the right direction (or +x-axis direction) relative to the fourth object 1601L or 1602L. That is, the directions in which the first object 1601D or 1602D to fourth object 1601L or 1602L are arranged may respectively correspond to the directions of the plurality of direction keys 1310 and 1410. Here, the first object 1601D or 1602D to the fourth object 1601L or 1602L may also be displayed together with icons (e.g., arrows, triangles, ">," "<") that may indicate the directions of the plurality of direction keys 1310 and 1410.

For example, the objects may be displayed on the display 110 while the first object 1601D or 1602D is disposed at the position (e.g., coordinates (200, 50)) in the downward direction (or −y-axis direction), the second object 1601U or 1602U is disposed at the position (e.g., coordinates (200, 150)) in the upward direction (or +y-axis direction), the third object 1601R or 1602R is disposed at the position (e.g., coordinates (250, 100)) in the right direction (or +x-axis direction), and the fourth object 1601L or 1602L is disposed at the position (e.g., coordinates 150, 100)) in the left direction (or −x-axis direction), based on the specific position (e.g., coordinates (200, 100)) of the display 110. Here, a fifth object 1601C or 1602C may be displayed at the specific position of the display 110.

In addition, the processor 130 may receive the signal for rotating the image content or the display 110 from the external device 200-1 or 200-2 through the communication interface while the UI is displayed on the display 110.

For example, the processor 130 may receive the signal for rotating the image content in the counterclockwise direction (or in the clockwise direction) from the external devices 200-1 and 200-2 through the communication interface 170 according to the input of the second object 1601U or 1602U (, the upward direction key 1620U of the external device 200-1 or 200-2, corresponding to the position of the first object 1601D or 1602D, or the downward direction key 1620D) displayed on the display 110. In this case, the processor 130 may rotate the image content in the counterclockwise direction (or in the clockwise direction) on the basis of the received signal. That is, the image content may appear as shown in FIG. 17-3 (or 17-4).

For another example, the processor 130 may receive the signal for rotating the display 110 in the counterclockwise direction (or in the clockwise direction) from the external device 200-1 or 200-2 through the communication interface 170 according to the input of the fourth object 1601L or 1602L (, the left direction key 1620L of the external device 200-1 or 200-2 corresponding to the position of the third object 1601R or 1602R, or the right direction key 1620R) displayed on the display 110. In this case, the processor 130 may control the motor 120 to rotate the display 110 in the counterclockwise direction (or in the clockwise direction) on the basis of the received signal. That is, the image content may appear as shown in the first portion or second portion of FIG. 17.

As such, the display device 100 may provide the user with a result of a case where the display 110 or the image content is rotated in advance for the user to input the user command more easily and conveniently, thereby providing the user with the improved user experience.

Meanwhile, as an example, it may be assumed that the plurality of direction keys 1310 and 1410 of the external devices 200-1 and 200-2 include the left direction key 1620L and the right direction key 1620R as shown in FIG. 16C or 16D.

In this case, the processor 130 may control the display 110 to display the first object 1603D or 1604D to the fourth object 1603L or 1604L at the positions corresponding to the disposition of the left and right direction keys 1620L and 1620R. For example, the processor 130 may control the display 110 to arrange the first object 1603D or 1604D to the fourth object 1603L or 1604L in the left and right direction (i.e., +x-axis or −x-axis direction) and display the same.

In addition, the processor 130 may control the display 110 to display a cursor 1650 indicating that a specific object is selected from the first object 1603D or 1604D to the fourth object 1603L or 1604L. In this case, a signal according to the input of the left direction key 1620L or right direction key 1620R of the external device 200-1 or 200-2 may be received through the communication interface 170. Here, the processor 130 may move the cursor 1650 in the left direction or the right direction based on the received signal. In addition, a signal according to the input of the selection key 1610 of the external device 200-1 or 200-2 may be received through the communication interface 170. In this case, the processor 130 may identify that an object on which the cursor 1650 is positioned is selected and perform a function corresponding to the selected object.

Meanwhile, as another example, it may be assumed that the plurality of direction keys 1310 and 1410 of the external devices 200-1 and 200-2 include the upward direction key 1620U and the downward direction key 1620D as shown in FIG. 16E or 16F.

In this case, the processor 130 may control the display 110 to display the first object 1605D or 1606D to the fourth object 1605L or 1606L at the positions corresponding to the disposition of the upward and downward direction keys 1620U and 1620D. For example, the processor 130 may control the display 110 to arrange the first object 1605D or 1606D to the fourth object 1605L or 1606L in the upward and downward direction (i.e., +y-axis or −y-axis direction) and display the same.

In addition, the processor 130 may control the display 110 to display the cursor indicating that the specific object is selected. In this case, a signal according to the input of the upward direction key 1620U or downward direction key 1620D of the external device 200-1 or 200-2 may be received through the communication interface 170. Here, the processor 130 may move the cursor in the upward direction or the downward direction based on the received signal. In addition, the signal according to the input of the selection key 1610 of the external device 200-1 or 200-2 may be received through the communication interface 170. In this case, the processor 130 may identify that an object on which the cursor is positioned is selected and perform a function corresponding to the selected object.

As such, the display device 100 may communicate with the external devices 200-1 and 200-2 having different direction keys. Even in this case, the display device 100 may optimize the disposition of the plurality of objects based on the disposition of the direction keys of the external devices 200-1 and 200-2 and provide the same.

Meanwhile, the content described above with reference to FIGS. 16C to 16F is provided assuming that the plurality of direction keys are implemented as two direction keys indicating the left and right direction or the upward and downward direction. However, the content is not limited thereto, and may be applied even in case that the plurality of direction keys are implemented as the four direction keys indicating the upward, downward, left, and right directions.

Furthermore, the plurality of objects 1601D to 1606L may include the fifth object 1601C, 1602C, 1603C, 1604C, 1605C or 1606C for canceling the rotation of the display 110 or image content.

In this case, a signal according to the input of a key corresponding to the fifth object 1601C, 1602C, 1603C, 1604C, 1605C or 1606C is received from the external device 200-1 or 200-2 through the communication interface 170. Here, the processor 130 may control the plurality of objects 1601D to 1606L to be deleted from the display 110 on the basis of the received signal. In this case, the image content may return to a state shown in FIG. 15. Here, the input of the key corresponding to the fifth object 1601C, 1602C, 1603C, 1604C, 1605C or 1606C may be one input of the selection key 1310, 1410 or 1610 as shown in FIG. 16A or 16B or one input of the selection key 1310, 1410 or 1610 while the cursor 1650 is positioned on the fifth object 1601C, 1602C, 1603C, 1604C, 1605C or 1606C through the input of the direction key 1320, 1420, 1620U, 1620D, 1620L or 1620R as shown in FIG. 16C to 16F.

Figure 18A:
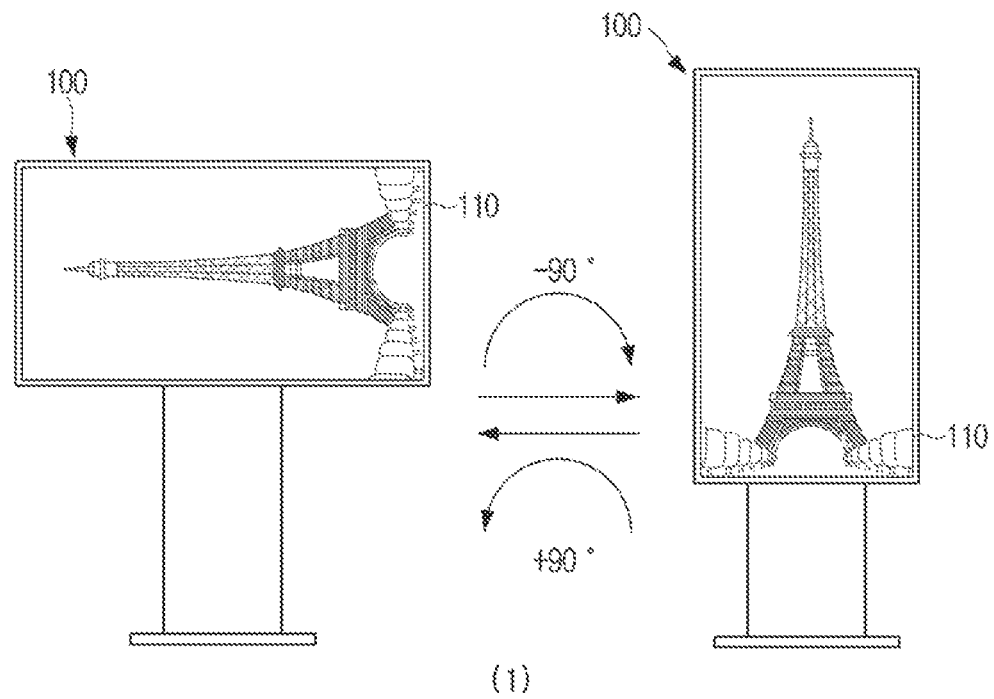
FIG. 18A is a view illustrating rotation of the display device according to an embodiment.
Figure 18A:
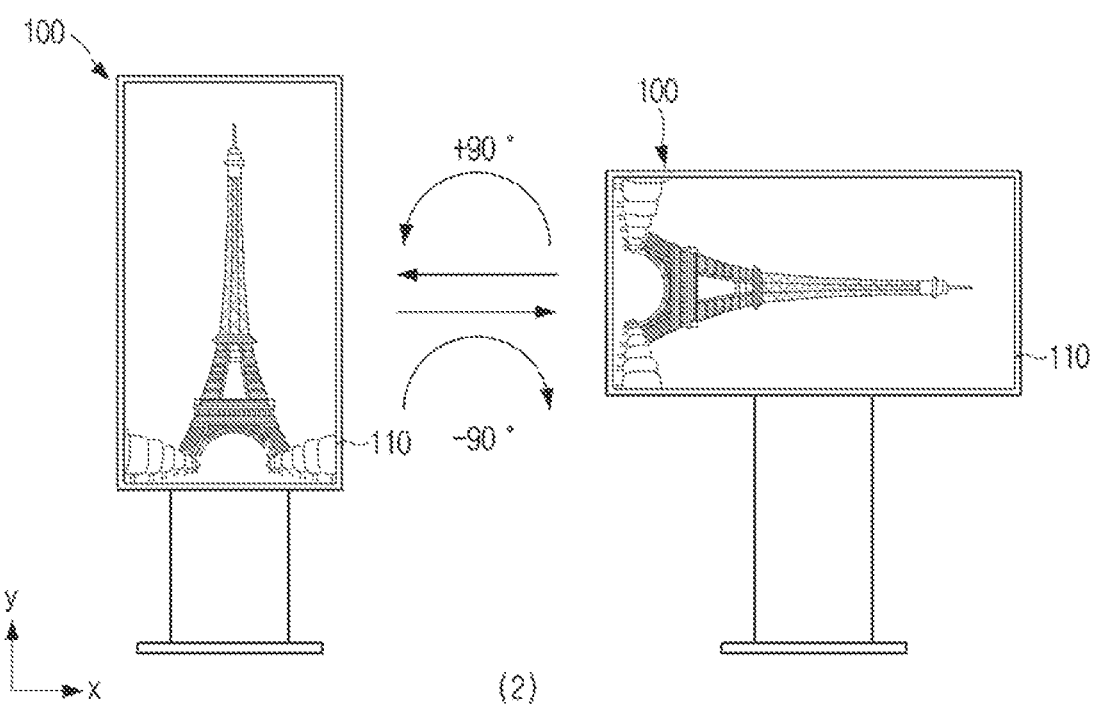
Figure 18B:
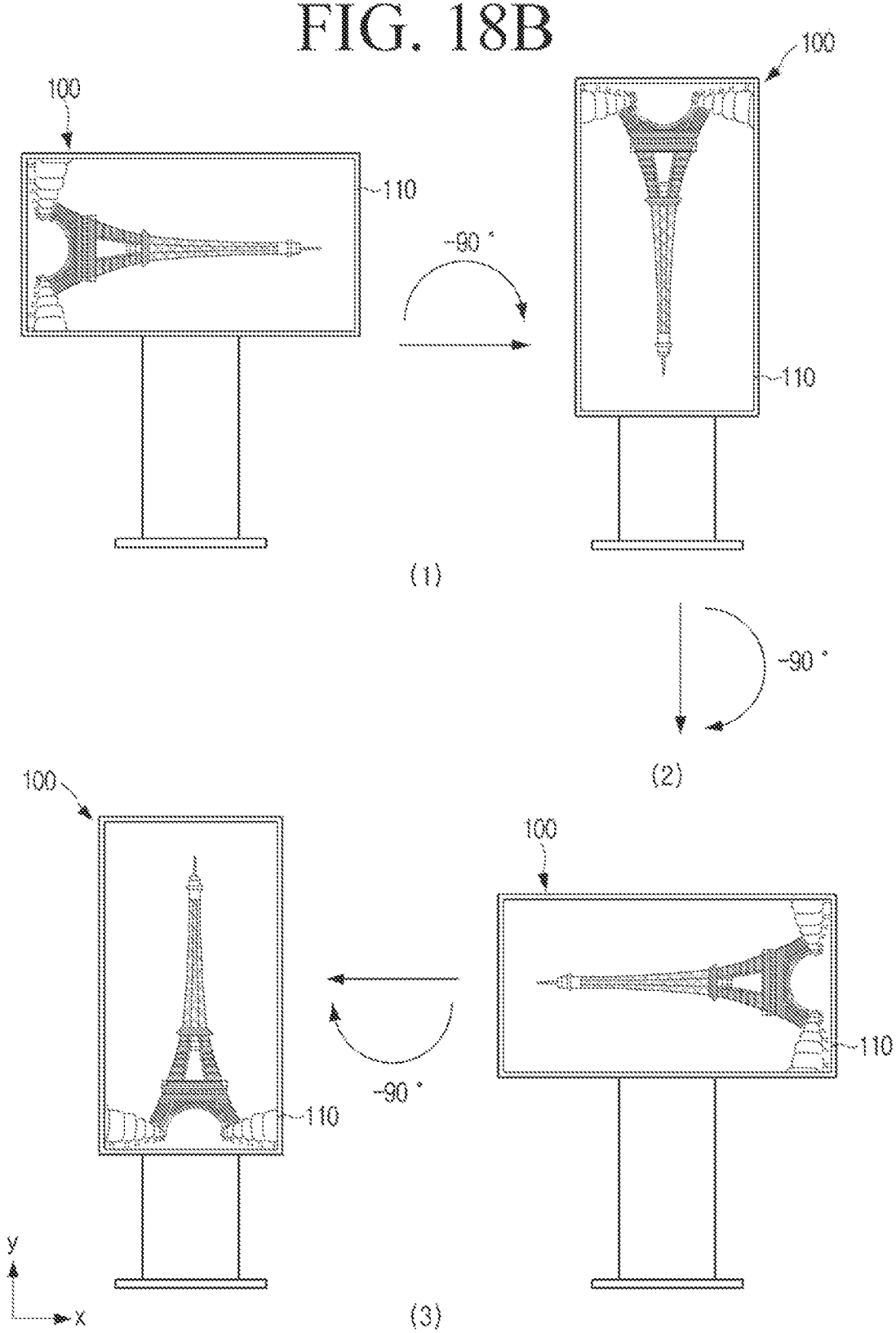
FIG. 18B is a view illustrating rotation of the display device according to an embodiment.

FIGS. 18A and 18B are views illustrating the rotation of the display device according to an embodiment.

Referring to the first portion of FIG. 18A, a signal according to one input of the rotation key 1330 or 1430 may be received from the external device 200-1 or 200-2. In this case, the processor 130 of the display device 100 according to an embodiment may rotate the display 110 in the clockwise direction by the motor 120 for the display 110 disposed in the landscape orientation to be disposed in the portrait orientation based on the received signal. In addition, a signal according to one input of the rotation key 1330 or 1430 may be received from the external device 200-1 or 200-2. In this case, the processor 130 may rotate the display 110 by 90 degrees in the counterclockwise direction by the motor 120 for the display 110 disposed in the portrait orientation to be disposed in the landscape orientation based on the received signal.

Referring to the second portion of FIG. 18, a signal according to one input of the rotation key 1330 or 1430 may be received from the external device 200-1 or 200-2. In this case, the processor 130 according to an embodiment may rotate the display 110 by 90 degrees in the clockwise direction by the motor 120 for the display 110 disposed in the portrait orientation to be disposed in the landscape orientation based on the received signal. In addition, a signal according to one input of the rotation key 1330 or 1430 may be received from the external device 200-1 or 200-2. In this case, the processor 130 may rotate the display 110 by 90 degrees in the counterclockwise direction by the motor 120 for the display 110 disposed in the landscape orientation to be disposed in the portrait orientation based on the received signal.

In addition, the display device 100 according to an embodiment may rotate the display 110 by combining of the first and second portions of FIG. 18A with each other. For example, a signal according to the one input of the rotation key 1330 or 1430 may be received from the external device 200-1 or 200-2. In this case, the processor 130 may control the motor 120 to rotate the display 110 by 90 degrees in the clockwise direction (or in the counterclockwise direction). In addition, a signal according to the twice input (or long press input) of the rotation key 1330 or 1430 that is input within the predetermined time may be received from the external device 200-1 or 200-2. In this case, the processor 130 may control the motor 120 to rotate the display 110 by 90 degrees in the counterclockwise direction (or in the clockwise direction).

Referring to FIG. 18B, the processor 130 according to an embodiment may control the motor 120 for the display 110 to be sequentially (or continuously) rotated in units of 90 degrees in the clockwise direction (or in the counterclockwise direction) on the basis of the received user command, i.e., user command received from the external device 200-1 or 200-2.

For example, the display 110 may be sequentially rotated in the clockwise direction (or in the counterclockwise direction) by 90 degrees whenever the rotation key 1330 or 1430 of the external device 200-1 or 200-2 is input once. That is, the number of rotations of the display 110 may be proportional to the number of inputs of the rotation key 1330 or 1430.

For another example, the rotation key 1330 or 1430 of the external device 200-1 or 200-2 may be input as the long press input. In this case, the display 110 may be sequentially (or continuously) rotated in the clockwise direction (or in the counterclockwise direction) by 90 degrees whenever the input time of the long press input elapses the predetermined time.

Accordingly, the display device 100 may display the optimized image content on the display 110 only by rotating the display 110 which may be rotated by 360 degrees even without the rotation of the image content (i.e., even in case that the function to fix the image direction is the ON state).

Meanwhile, in an embodiment of FIG. 18A or 18B described above, the display 110 of the display device 100 is described to be rotated by the input of the rotation key 1330 or 1430 of the external device 200-1 or 200-2 in various ways. However, this way is only an example, and the image content may also be rotated by the input of the rotation key 1330 or 1430. For example, the rotation key 1330 or 1430 may be input as the long press input. In this case, the image content may be sequentially (or continuously) rotated in the clockwise direction (or in the counterclockwise direction) by 90 degrees whenever the input time of the long press input elapses the predetermined time.

Meanwhile, in an embodiment of FIG. 18A or 18B described above, the image direction of the image content is described as being fixed in case that the display 110 is rotated based on the input of the rotation key 1330 or 1430. However, the display 110 and the image content may also be simultaneously rotated. For example, the rotation key 1330 or 1430 may be input in a state where the image content and the display 110 are prepared as shown in the second portion of FIG. 8A. In this case, as shown in the third portion of FIG. 8A, the display 110 may be rotated by 90 degrees in the clockwise direction (or in the counterclockwise direction), and the image content may be simultaneously rotated by 90 degrees in the counterclockwise direction (or in the clockwise direction).

FIG. 18C is a view illustrating the user command for controlling the rotation of the display or image content according to an embodiment.

Referring to FIG. 18C, function information matched with a user input (or the user command), and a first function (or a second function) may be pre-stored in the memory 160 of the display device 100.

Here, the first function (or the second function) may indicate an operation performed in case that a signal according to the user input is received. Meanwhile, the second function shows a modified example of the first function. Hereinafter, for convenience of explanation, the first function is described and an overlapping content is omitted. Meanwhile, the function matched with the user command may be set or changed by a manufacturer or the user.

The key described with reference to FIG. 18C may be the rotation key 1330 or 1430 of the external device 200-1 or 200-2. Meanwhile, the rotation key 1330 or 1430 is not positioned in the external device 200-1 or 200-2. In this case, the key described with reference to FIG. 18C may be the selection key 1310 or 1410 of the external device 200-1 or 200-2. However, this key is only an example, and the key described with reference to FIG. 18C may be any of various keys positioned in the external device 200-1 or 200-2.

For example, the rotation key 1330 or 1430 of the external device 200-1 or 200-2 may be input once. In this case, the display device 100 may receive a signal according to the one input of the rotation key 1330 or 1430 from the external device 200-1 or 200-2 through the communication interface 170. Here, the display device 100 may search for the first function matched with the received signal from the function information and perform the searched first function (e.g., rotating the display 110 by 90 degrees in the clockwise direction).

For another example, it may be assumed that the external device 200-1 or 200-2 includes a gyro sensor that detects the orientation of the external device 200-1 or 200-2. Here, the external device 200-1 or 200-2 may be pointed to the left while the rotation key 1330 or 1430 of the external device 200-1 or 200-2 is input. In this case, the display device 100 may receive signals according to the input of the rotation key 1330 or 1430 and the orientation in which the external device 200-1 or 200-2 is pointed to the left from the external device 200-1 or 200-2 through the communication interface 170. Here, the display device 100 may search for the first function matched with the received signal from the function information and perform the searched first function (e.g., rotating the display 110 by 90 degrees in the clockwise direction).

Figure 19A:
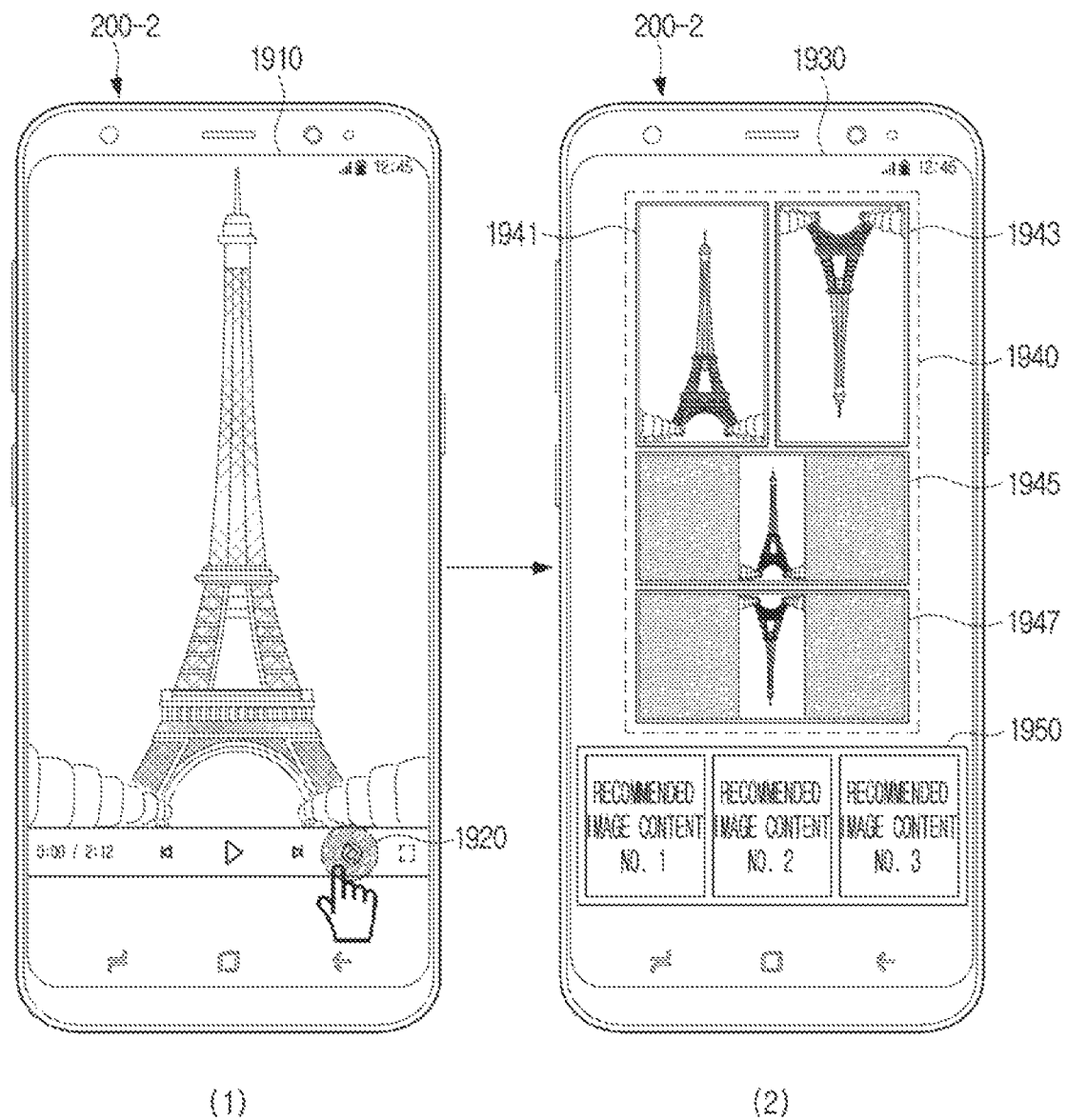
FIG. 19A is a view illustrating a method for controlling a display device by using an external device according to an embodiment.
Figure 19B:
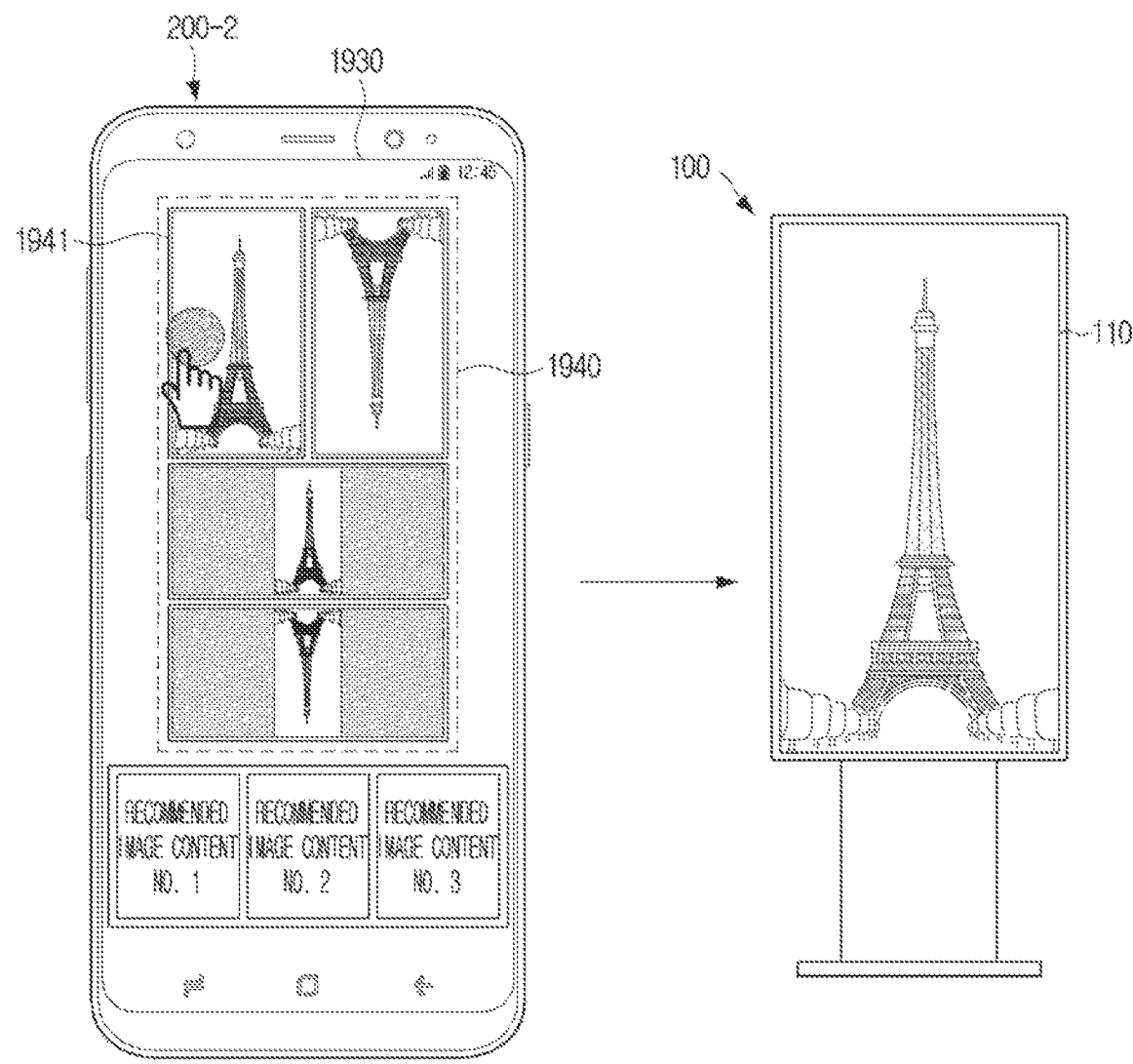
FIG. 19B is a view illustrating a method for controlling a display device by using an external device according to another embodiment.
Figure 19C:
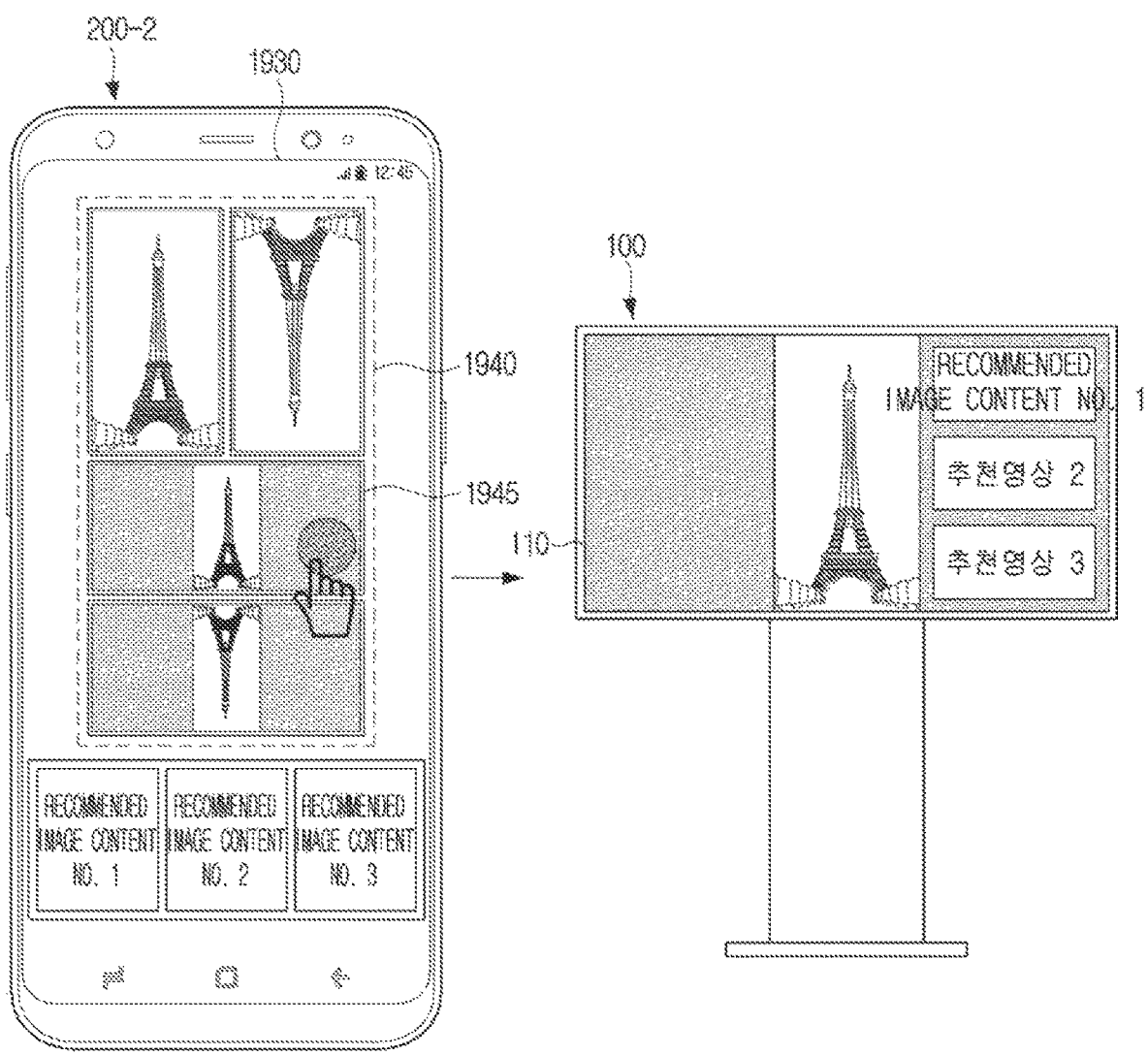
FIG. 19C is a view illustrating a method for controlling a display device by using an external device according to another embodiment.

FIGS. 19A to 19C are views illustrating a method for controlling the display device by using an external device according to another embodiment. Here, it may be assumed that a second external device 200-2 is implemented as a smartphone and the display device 100 is disposed in a landscape orientation.

Referring to FIG. 19A to FIG. 19C, the display device 100 according to an embodiment may perform a casting function or a mirroring function on the basis of the information received from the second external device 200-2. Here, the display device 100 may rotate the display 110 or the image content through the UI displayed on the second external device 200-2.

Here, the casting function or the mirroring function is technology for transmitting image content information (, the image content itself, a network address for reproducing the image content or the like) from an electronic device to another electronic device for the image content to be displayed on a display of another electronic device. The mirroring function is technology for displaying the same image as the image displayed on the electronic device on the display of another electronic device (i.e., image displayed on the electronic device and the image displayed on another electronic device may be the same as each other), and the casting function may be technology for displaying an image on the display of another electronic device instead of the display of the corresponding electronic device (i.e., image displayed on the electronic device and the image displayed on another electronic device may be different from each other). Hereinafter, for convenience of explanation, the description describes a process of performing the casting function.

Referring to the first portion of FIG. 19A, an application for reproducing the image content may be executed. In this case, the second external device 200-2 may display a first UI 1910 on a display 220 of the second external device 200-2 as the application is executed.

Here, the first UI 1910 may include the image content, a casting (or mirroring icon) 1920 for performing the casting (or mirroring function) for the image content, and a control icon for controlling the reproduction of the image content. The image content may be stored in an internal memory of the second external device 200-2 or an external memory connected to the second external device 200-2, or may be received from a network that provides the image content (e.g., streaming service provider, cloud service provider or network-attached storage (NAS)).

In this case, in case of receiving the user command (e.g., touch input) for selecting the casting (or mirroring) icon 1920 from the first UI 1910 displayed on the display 220, the second external device 200-2 may display a list of the plurality of electronic devices which may perform the casting function (or the mirroring function) on the display 220. The second external device 200-2 may then select the casting function (or the mirroring function) for one electronic device (e.g., display device 100) according to the user command input from the list. Here, it may be assumed that the display device 100 disposed in a portrait orientation is selected as shown in FIG. 15.

In addition, the second external device 200-2 may display a second UI 1930 on the display 220 as shown in the second portion of FIG. 19A, on the basis of the orientation of the display device 100.

Here, the second UI 1930 may include a plurality of objects 1940 for rotating the display 110 of the display device 110 or image content to be displayed on the display device 110. In addition, the second UI 1930 may further include a recommended image list 1950.

For example, the plurality of objects 1940 may include a first object 1941 for rotating the display 110 by 90 degrees in the counterclockwise direction in a state where the image direction of the image content is fixed (i.e., state where the rotation of the image content is prohibited), a second object 1943 for rotating the display 110 by 90 degrees in a clockwise direction in the state where the image direction of the image content is fixed, a third object 1945 for rotating the image content by 90 degrees in the counterclockwise direction in a state where the orientation of the display 110 is fixed (i.e., state where the rotation of the display 110 is prohibited), and a fourth object 1947 for rotating the image content by 90 degrees in the clockwise direction in the state where the orientation of the display 110 is fixed.

Meanwhile, the recommended image list 1950 may include at least one recommended image content. The recommended image content may be the image content provided based on a user's network usage history or the like, and may be another image content belonging to a category (e.g., game or cooking) of the image content previously viewed by the user. However, this case is only an example and the recommended image content may be variously modified and implemented.

As an example, referring to FIG. 19B, it may be assumed that a user command for selecting the first object 1941 from the plurality of objects 1940 displayed on the second external device 200-2 is input. In this case, the second external device 200-2 may transmit, to the display device 100, a signal corresponding to the first object 1941 (e.g., signal to rotate the display 110 by 90 degrees in the counterclockwise direction in the state where the image direction of the image content is fixed) and the image content information (e.g., image content itself or network address for reproducing the image content).

The display device 100 may then maintain the image direction of the image content to be fixed, rotate the display 110 by 90 degrees in the counterclockwise direction, and display the image content on the rotated display 110, on the basis of the received signal and the received image content information.

As an example, referring to FIG. 19C, it may be assumed that a user command for selecting the third object 1945 from the plurality of objects 1940 displayed on the second external device 200-2 is input. In this case, the second external device 200-2 may transmit, to the display device 100, a signal corresponding to the third object 1945 (e.g., signal to rotate the image content by 90 degrees in the counterclockwise direction in the state where the orientation of the display 110 is fixed) and the image content information (e.g., image content itself or network address for reproducing the image content).

The display device 100 may then rotate the image content by 90 degrees in the counterclockwise direction, maintain the orientation of the display 110 to be fixed, and display the rotated image content on the display 110, on the basis of the received signal and the received image content.

Meanwhile, as shown in FIG. 19C, the display device 100 according to an embodiment may have a long axis direction (e.g., x-axis direction) of the orientation of the display 110 and a long axis direction (e.g., y-axis direction) of the image content displayed on the display 110, which are different from each other. In this case, a blank where no image content is displayed may occur in the display 110. In this case, the display device 100 may display at least one recommended image content on the blank (or blank region) where no image content is displayed on a display 110. Here, the recommended image content may be received from the second external device 200-2. In addition, a user command for selecting recommended image content no. 1 may be input from the second external device 200-2. In this case, the second external device 200-2 may transmit, to the display device 100, information on the recommended image content no. 1 (e.g., recommended image content no. 1 itself or network address of the recommended image content no. 1). The display device 100 may then display (or reproduce) the recommended image content no. 1 on the display 110 on the basis of the received information.

FIG. 20 is a block diagram illustrating an additional configuration of the display device according to an embodiment.

Referring to FIG. 20, the display device 100 according to an embodiment may further include at least one of the speaker 140, the input interface 150, and the memory 160, the communication interface 170, the sensor 180 or a camera 190 in addition to the display 110, the motor 120 and the processor 130.

The speaker 140 may output various audio signals. For example, the speaker 140 may provide vibration as the audio signal (i.e., sound). To this end, the speaker 140 may include an analog to digital converter (ADC) that converts an analog audio signal to a digital audio signal, a digital to analog converter (DAC) that converts the digital audio signal to the analog audio signal, a diaphragm that provides an analog sound wave (, sound wave or acoustic wave), or the like.

The input interface 150 may receive various user commands and transmit the same to the processor 130. That is, the processor 130 may identify the user command input from the user through the input interface 150. Here, the user command may be implemented using various methods, such as the user touch input (on the touch panel), the key input (through the keyboard) or the button input (from the physical button, the mouse or the like), and the user voice input (through the microphone).

In detail, for example, the input interface 150 may include at least one of the touch panel (not shown), a pen sensor (not shown), the button (not shown) or the microphone (not shown) The touch panel may use, for example, at least one of a capacitive manner, a resistive manner, an infrared manner or an ultrasonic manner, and for this purpose, the touch panel may also include a control circuit. The touch panel may further include a tactile layer to provide the user with a tactile reaction. The pen sensor may be, for example, a part of the touch panel or may include a separate identification sheet. The button may include, for example, a button for detecting a user touch, a button for detecting a pressed state, an optical key or a keypad. The microphone may directly receive the user voice, and convert the user voice, which is the analog signal, to the digital signal by the digital converter (not shown), thereby obtaining the audio signal.

Meanwhile, this case is only an example, and the processor 130 may also receive the user command through the communication interface 170 performing the communication with the external device (e.g., wired/wireless keyboard, wired/wireless mouse, pen, remote control device or smartphone).

The memory 160 may be a component for storing various information (or data). For example, the memory 160 may store the information in an electrical form or a magnetic form.

In detail, the memory 160 may store at least one instruction, module or data, required for the operation of the display device 100 or processor 130. Here, the instruction is a unit for instructing the operation of the display device 100 or processor 130 and may be written in a machine language that the display device 100 or the processor 130 may understand. The module may be an instruction set of a sub-unit configuring a software program (, an operating system, an application, a dynamic library, a runtime library or the like). However, the module is only an example, and may be the program itself. The data may be data in units such as bits or bytes which may be processed by the display device 100 or the processor 130 to indicate information such as letters, numbers, sounds, and images.

The communication interface 170 may transmit/receive the various types of data by performing the communication with the various types of external devices 200-1 and 200-2 according to the various types of communication methods.

The communication interface 170 is a circuit for performing various types of wireless communication, and may include at least one of an Ethernet module, a universal serial bus (USB) module, a high definition multimedia interface (HDMI), a DisplayPort (DP), a D-subminiature (D-SUB), a digital visual interface (DVI), a Thunderbolt and a component, which perform the wired communication with the bluetooth module (or bluetooth method), the wi-fi module (or wi-fi method), a wireless communication module (cellular method such as 3G, 4G or 5G), an NFC module (or NFC method), the IR module (or infrared method), the zigbee module (or zigbee method), an ultrasonic module (or ultrasonic method) or the like. In this case, the module for performing the wired communication may communicate with the external device 200-1 or 200-2 through an input/output port.

The sensor 180 may refer to a device that detects an amount or change of various physical signals (e.g., temperature, light, sound, chemical substance, electricity, magnetism and pressure). Here, the detected signal may be converted into data in a format that the processor 130 may interpret.

The sensor 180 may be implemented as various sensors, such as a proximity sensor, an illuminance sensor, a motion sensor, a time-of-flight (TOF) sensor and a global positioning system (GPS) sensor.

Here, the proximity sensor may detect presence of a surrounding object, and may obtain data on whether the surrounding object is present or whether the surrounding object is in proximity. The illuminance sensor may obtain data on illuminance by detecting an amount of light (or brightness) of a surrounding environment of the display device 100. The motion sensor may detect a movement distance, movement direction, tilt or the like of the display device 100. To this end, the motion sensor may be implemented as a combination of the acceleration sensor, the gyro sensor, a geomagnetic sensor and the like, and may detect the orientation of the display 110. The time-of-flight (TOF) sensor may obtain data on a distance from (or a position of) an object by emitting various electromagnetic waves (e.g., ultrasonic, infrared, laser and the like) having a specific velocity and detecting return time of flight. The global positioning system (GPS) sensor may obtain radio signals from a plurality of satellites, calculate a distance from each satellite by using transmission time of the received signal, and use triangulation of the calculated distance, thereby receiving data on the current position of the display device 100.

However, the above-described implementation example of the sensor 180 is only an example. The sensor 180 is not limited thereto, and may be implemented as various types of sensors.

The camera 190 may divide light into pixels, detect intensity of light for red (R), green (G) and blue (B) colors for each pixel, and convert the intensity of light into an electrical signal, thereby obtaining data representing the color, shape, contrast or the like of the object. Here, a data type may be an image having the R, G and B color values for each of the plurality of pixels.

Figure 21:
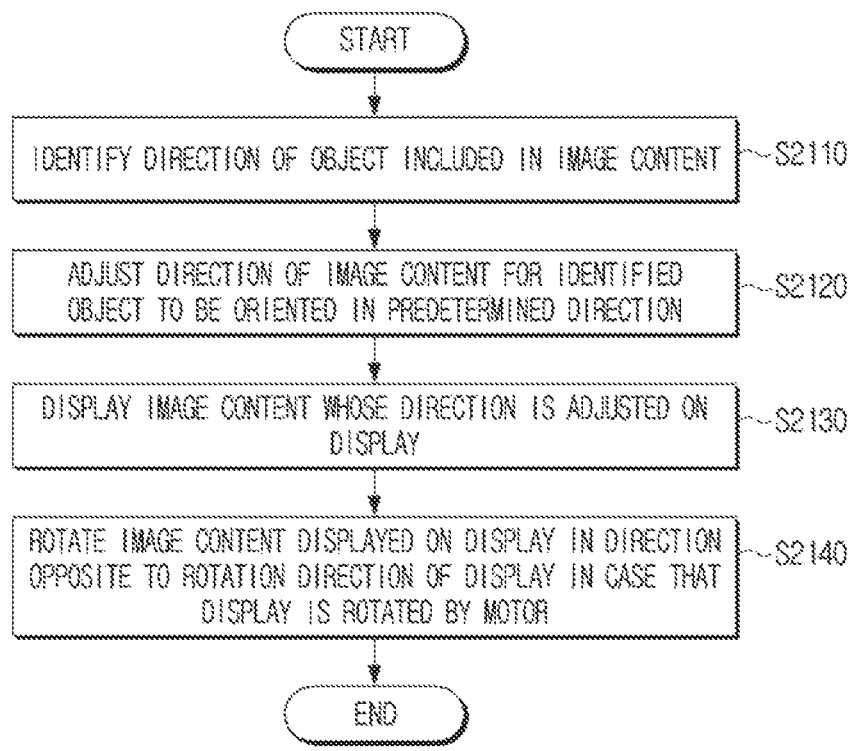
FIG. 21 is a view illustrating a flowchart of the control method according to another embodiment.

FIG. 21 is a view illustrating a flowchart of the control method according to another embodiment.

Referring to FIG. 21, the method for controlling the display device 100 according to another embodiment of the present disclosure may include identifying the direction of the object included in the image content (S1410), adjusting the direction of the image content for the identified object to be oriented in the predetermined direction (S1420), displaying the image content whose direction is adjusted on the display 110 (S1430), and rotating the image content displayed on the display 110 in the direction opposite to the rotation direction of the display 110 in case that the display 110 is rotated by a motor 120 (S1440).

In detail, the direction of the object included in the image content may be identified (in S1410).

Here, the image content may indicate a content including at least one of a still image or a moving image. Here, the object may include at least one of a text or an animal.

The direction of the image content may then be adjusted for the identified object to be oriented in the predetermined direction (in S1420).

Here, the predetermined direction may include an upward direction of the display 110 disposed in the landscape orientation in case that the display 110 is disposed in the landscape orientation, and include an upward direction of the display 110 disposed in the portrait orientation in case that the display 110 is disposed in the portrait orientation.

Meanwhile, in the adjusting, the direction of the image content may be adjusted for the text to be oriented in the predetermined direction based on the direction of the text in case that the image content includes the text and the animal in directions different from each other.

The image content whose direction is adjusted may then be displayed on the display 110 (in S1430). Here, the upward direction of the object included in the image content whose direction is adjusted may match the upward direction of the display 110. Here, the upward direction of the object included in the image content whose direction is adjusted and the upward direction of the display 110 may be substantially the same as each other.

The image content displayed on the display 110 in the direction opposite to the rotation direction of the display 110 may then be rotated in case that the display 110 is rotated by the motor 120 (in S1440).

As an example, the control method may further include identifying whether the image content is the image content of the landscape type or the image content of the portrait type on the basis of the direction of the identified object.

Here, in the displaying, the image content whose direction is adjusted may be displayed on the display 110 disposed in the landscape orientation. In addition, in case that the displayed image content is identified as the image content of the portrait type, the motor 120 may be controlled to rotate the display 110 to the portrait orientation, and rotate the image content displayed on the display 110 in the direction opposite to the rotation direction of the display 110.

Meanwhile, in the displaying, the image content whose direction is adjusted may be displayed on the display 110 disposed in the portrait orientation. In addition, in case that the displayed image content is identified as the image content of the landscape type, the motor 120 may be controlled to rotate the display 110 to the landscape orientation, and rotate the image content displayed on the display 110 in the direction opposite to the rotation direction of the display 110.

Meanwhile, as another example, according to a control method, the user interface (UI) for rotating the display 110 may be displayed in one region of the display 110.

In addition, the motor 120 may be controlled to rotate the display 110 in case that the user command corresponding to the UI is received.

Meanwhile, according to the control method in an embodiment, the UI for locking the rotation of the image content may be displayed in one region of the display 110.

Here, in the displaying of the UI, the UI for locking the rotation of the image content may be displayed in one region of the display 110 in case that the direction of the object included in the image content is not identified.

In addition, the direction of the image content displayed on the display 110 before the display 110 is rotated may be maintained in case that the display 110 is rotated by the motor 120 after the user command corresponding to the UI is received.

Figure 22:
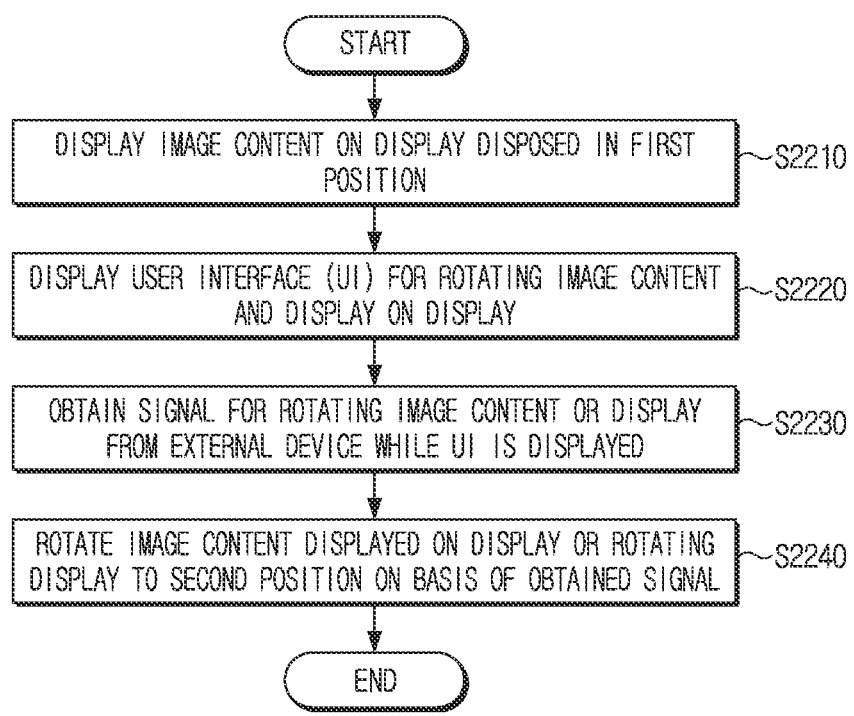
FIG. 22 is a view illustrating a flowchart of the control method according to another embodiment.

FIG. 22 is a view illustrating a flowchart of the control method according to another embodiment.

Referring to FIG. 22, the method for controlling the display device 100 according to another embodiment includes displaying the image content on the display 110 disposed in a first orientation (S2210), displaying the user interface (UI) for rotating the image content and the display 110 on the display 110 (S2220), receiving a signal for rotating the image content or the display 110 from the external device 200-1 or 200-2 while the UI is displayed (S2230), and rotating the image content displayed on the display 110 or rotating the display 110 to a second orientation on the basis of the received signal (S2240).

In detail, the image content may be displayed on the display 110 disposed in the first orientation (in S2210).

Here, the first orientation may be the portrait orientation or the landscape orientation. The second orientation may be the landscape orientation in case that the first orientation is the portrait orientation, and may be the portrait orientation in case that the first orientation is the landscape orientation.

The user interface (UI) for rotating the image content and the display 110 may then be displayed on the display 110 (in S2220).

As an example, the UI may include a first object for rotating the image content by 90 degrees in the clockwise direction, a second object for rotating the image content by 90 degrees in the counterclockwise direction, a third object for rotating the display 110 by 90 degrees in the clockwise direction and a fourth object for rotating the display 110 by 90 degrees in the counterclockwise direction.

The signal for rotating the image content or the display 110 may be received from the external device 200-1 or 200-2 while the UI is displayed (in S2230).

The image content displayed on the display 110 may then be rotated or the display 110 may be rotated to the second orientation on the basis of the received signal (in S2240).

In detail, as an example, the rotating of the image content or the display 110 may include rotating the content displayed on the display in the clockwise or counterclockwise direction while the display 110 maintains its orientation in the first orientation in case that the signal for rotating the image content is received. As another example, the rotating of the image content or the display 110 may include rotating the display 110 in the clockwise or counterclockwise direction for the display 110 to be disposed in the second orientation while the image content displayed on the display 110 in the first orientation maintains its direction in case that the signal for rotating the display 110 is received.

Meanwhile, in the rotating of the image content or the display 110, the image content or the display 110 may be rotated by 90 degrees in a direction corresponding to a selected object on the basis of a received signal in case that the signal for selecting one of the first to fourth objects is received.

Here, the first object may include a preview image in which the image content is rotated by 90 degrees in the clockwise direction is displayed on the display 110 disposed in the first orientation. In addition, the second object may include a preview image in which the image content is rotated by 90 degrees in the counterclockwise direction is displayed on the display 110 disposed in the first orientation. In addition, the third object may include a preview image in which the image content is rotated by 90 degrees in the clockwise direction is displayed on the display 110 disposed in the second orientation. The fourth object may include a preview image in which the image content is rotated by 90 degrees in the counterclockwise direction is displayed on the display 110 disposed in the second orientation.

Meanwhile, the first to fourth objects according to another embodiment may be displayed on the display 110 to correspond to the arrangement of the plurality of direction keys of the external devices 200-1 and 200-2. In the rotating of the image content or the display 110, an object corresponding to a selected direction key among the first to fourth objects may be identified on the basis of a received signal in case that the signal indicating that one of the plurality of direction keys is selected is received from the external devices 200-1 and 200-2, and the image content or the display 110 may be rotated by 90 degrees in a direction corresponding to the identified object.

Meanwhile, the rotating of the image content or the display 110 according to an embodiment may include displaying a cursor on one of the first to fourth objects. The rotating of the image content or the display 110 may include moving the cursor displayed on the object to another object positioned in a direction corresponding to a selected direction key on the basis of a received signal in case that the signal indicating that one of the plurality of direction keys of the external devices 200-1 and 200-2 is selected is received from the external devices 200-1 and 200-2. The rotating of the image content or the display 110 may include rotating the image content or the display 110 by 90 degrees in a direction corresponding to the object on which the cursor is displayed on the basis of a received signal in case that the signal for selecting the object on which the cursor is displayed is received from the external device 200-1 or 200-2.

According to one or more embodiments as described above, it is possible to provide the display device which may display the image content optimized in the normal direction and the method for controlling the same.

The various embodiments may be implemented by software including an instruction stored in a machine-readable storage medium (for example, a computer-readable storage medium). A machine may be an apparatus that invokes the stored instruction from the storage medium and may be operated based on the invoked instruction, and may include the electronic device (for example, display device 100) according to the disclosed embodiments. In case that the instruction is executed by the processor 130, the processor 130 may directly perform a function described in the instruction or by using other components under control of the processor 130. The command may include codes provided or executed by a compiler or an interpreter. The machine-readable storage medium may be provided in a form of a non-transitory storage medium. Here, the term "non-transitory" may indicate that the storage medium is tangible without including a signal, and does not distinguish whether data are semi-permanently or temporarily stored in the storage medium.

The method according to the various embodiments may be provided by being included in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store or a relay server, or be temporarily provided.

Each of components (for example, modules or programs) according to the various embodiments may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

What is claimed is:

1. A display device comprising:
    a display;
    a communication interface;
    a motor configured to rotate the display; and
    a processor configured to:
        control the display to display an image content on the display disposed in a first orientation,
        display a first user interface (UI) for rotating the image content and the display,
        based on a signal for rotating the display being received from an external device through the communication interface while fixing a direction of the image content according to a user command, control the motor to rotate the display to a second orientation and maintain the direction of the image content displayed on the display disposed in the first orientation, and
        based on the signal for rotating the display being received from the external device through the communication interface while not fixing the direction of the image content according to the user command, control the motor to rotate the display to the second orientation and rotate the image content in a direction opposite to a rotation direction of the display,
    wherein the user command comprises receiving a user input for an amount of time as a long press input, and
    wherein the processor is further configured to:
        control the motor to sequentially rotate the display in a clockwise direction or in a counterclockwise direction by a predetermined amount of degrees based on an input time of the long press input elapses a predetermined time.

2. The display device as claimed in claim 1, wherein the processor is further configured to:
    based on the received signal being for rotating the image content, rotate the image content displayed on the display in the clockwise direction or the counterclockwise direction and maintain the display in the first orientation, and
    based on the received signal being for rotating the display, rotate the display in the clockwise direction or the counterclockwise direction for the display to be disposed in the second orientation and maintain the direction of the image content displayed on the display disposed in the first orientation.

3. The display device as claimed in claim 1, wherein the first UI includes a first object for rotating the image content by 90 degrees in the clockwise direction, a second object for rotating the image content by 90 degrees in the counterclockwise direction, a third object for rotating the display by 90 degrees in the clockwise direction, and a fourth object for rotating the display by 90 degrees in the counterclockwise direction.

4. The display device as claimed in claim 3, wherein the processor is configured to:
based on the received signal being for selecting an object among the first object, the second object, the third object and the fourth object, rotate the image content or rotate the display by 90 degrees in a direction corresponding to the selected object.

5. The display device as claimed in claim 4, wherein the first object, the second object, the third object, and the fourth object are displayed on the display to correspond to an arrangement of a plurality of direction keys of the external device, and
wherein the processor is further configured to:
based on the received signal indicating a direction key among the plurality of direction keys is selected, identify an object corresponding to a selected direction key among the first object, the second object, the third object, and the fourth object, and
rotate the image content or the display by 90 degrees in a direction corresponding to the identified object.

6. The display device as claimed in claim 4, wherein the processor is configured to:
display a cursor on an object among the first object, the second object, the third object, and the fourth object,
based on the received signal indicating that a direction key among a plurality of direction keys is selected, move the cursor displayed on the object to another object positioned in a direction corresponding to the selected direction key, and
based on the received signal being for selecting the object on which the cursor is displayed, rotate the image content or the display by 90 degrees in a direction corresponding to the object on which the cursor is displayed.

7. The display device as claimed in claim 3, wherein the first object includes a preview image in which the image content is rotated by 90 degrees in the clockwise direction and is displayed on the display disposed in the first orientation,
the second object includes a preview image in which the image content is rotated by 90 degrees in the counterclockwise direction and is displayed on the display disposed in the first orientation,
the third object includes a preview image in which the image content is displayed on the display rotated by 90 degrees in the clockwise direction and disposed in the second orientation, and
the fourth object includes a preview image in which the image content is displayed on the display rotated by 90 degrees in the counterclockwise direction and disposed in the second orientation.

8. The display device as claimed in claim 1, wherein the first orientation is a portrait orientation or a landscape orientation, and
the second orientation is the landscape orientation in a case that the first orientation is the portrait orientation, and the second orientation is the portrait orientation in a case that the first orientation is the landscape orientation.

9. The display device as claimed in claim 1, wherein the processor is further configured to:
based on the input time of the long press input being greater than the predetermined time, control the motor to sequentially rotate the display in the clockwise direction or in the counterclockwise direction, and
based on the input time of the long press input being same or greater than the predetermined time while not fixing the direction of the image content according to the user command, rotate the image content in a direction opposite to a rotation direction of the display.

10. The display device as claimed in claim 1, wherein the processor is further configured to:
the external device being connected with the display device, display a second UI for fixing the direction of the image content, and
based on a user command, corresponding to the second UI for fixing the direction of the image content, being received, performing a function to fix the direction of the image content.

11. A method for controlling a display device, the method comprising:
displaying an image content on a display disposed in a first orientation;
displaying a first user interface (UI) for rotating the image content and the display on the display;
based on a signal for rotating the display being received from an external device through a communication interface while fixing a direction of the image content according to a user command, rotating the display to a second orientation and maintaining a direction of the image content displayed on the display disposed in the first orientation; and
based on the signal for rotating the display being received from the external device through the communication interface while not fixing the direction of the image content according to the user command, rotating the display to the second orientation and rotating the image content in a direction opposite to a rotation direction of the display,
wherein the user command comprises receiving a user input for an amount of time as a long press input, and
wherein the method further comprises:
control the motor to sequentially rotate the display in a clockwise direction or in a counterclockwise direction by a predetermined amount of degrees based on an input time of the long press input elapses a predetermined time.

12. The method as claimed in claim 11, wherein the rotating of the image content or the display comprises:
based on the received signal being for rotating the image content, rotating the image content displayed on the display in the clockwise direction or the counterclockwise direction and maintaining the first orientation; and
based on the received signal being for rotating the display, rotating the display in the clockwise direction or the counterclockwise direction for the display to be disposed in the second orientation and maintaining the direction of the image content displayed on the display disposed in the first orientation.

13. The method as claimed in claim 11, wherein the first UI includes a first object for rotating the image content by 90 degrees in the clockwise direction, a second object for rotating the image content by 90 degrees in the counterclockwise direction, a third object for rotating the display by 90 degrees in the clockwise direction, and a fourth object for rotating the display by 90 degrees in the counterclockwise direction.

14. The method as claimed in claim 13, wherein in the rotating of the image content or the display, based on the received signal being for selecting an object among the first object, the second object, the third object and the fourth object, the image content or the display is rotated by 90 degrees in a direction corresponding to a selected object.

15. The method as claimed in claim 14, wherein the first object, the second object, the third object, and the fourth object are displayed on the display to correspond to an arrangement of a plurality of direction keys of the external device, and in the rotating of the image content or the display,
based on the received signal indicating a direction key among the plurality of direction keys is selected, an object corresponding to a selected direction key among the first object, the second object, the third object, and the fourth object is identified, and the image content or the display is rotated by 90 degrees in a direction corresponding to the identified object.

16. The method as claimed in claim 13, wherein the first object includes a preview image in which the image content is rotated by 90 degrees in the clockwise direction and is displayed on the display disposed in the first orientation, the second object includes a preview image in which the image content is rotated by 90 degrees in the counterclockwise direction and is displayed on the display disposed in the first orientation, the third object includes a preview image in which the image content is displayed on the display rotated by 90 degrees in the clockwise direction and disposed in the second orientation, and the fourth object includes a preview image in which the image content is displayed on the display rotated by 90 degrees in the counterclockwise direction and disposed in the second orientation.

17. The method as claimed in claim 14, wherein the rotating of the image content or the display includes:

displaying a cursor on an object among the first object, the second object, the third object, and the fourth object, based on the received signal indicating that a direction key among a plurality of direction keys is selected, moving the cursor displayed on the object to another object positioned in a direction corresponding to the selected direction key, and based on the received signal being for selecting the object on which the cursor is displayed, rotating the image content or the display by 90 degrees in a direction corresponding to the object on which the cursor is displayed.

18. A non-transitory computer readable storage medium having instructions stored thereon which, when executed by a processor of a server, cause the processor to execute the instructions to implement:

displaying an image content on a display disposed in a first orientation;

displaying a user interface (UI) for rotating the image content and the display on the display;

based on a signal for rotating the display being received from an external device through a communication interface while fixing a direction of the image content according to a user command, rotating the display to a second orientation and maintaining a direction of the image content displayed on the display disposed in the first orientation; and based on the signal for rotating the display being received from the external device through the communication interface while not fixing the direction of the image content according to the user command, rotating the display to the second orientation and rotating the image content in a direction opposite to a rotation direction of the display, wherein the user command comprises receiving a user input for an amount of time as a long press input, and wherein the instructions, when executed by the processor, cause the processor to execute the instructions to implement:

controlling the motor to sequentially rotate the display in the clockwise direction or in the counterclockwise direction by a predetermined amount of degrees based on an input time of the long press input elapses a predetermined time.

19. The non-transitory computer readable storage medium of claim 18, further causing the processor to execute the instructions to implement:

based on the received signal being for rotating the image content, rotating the image content displayed on the display in a clockwise direction or a counterclockwise direction and maintaining the first orientation; and based on the received signal being for rotating the display, rotating the display in the clockwise direction or the counterclockwise direction for the display to be disposed in the second orientation and maintaining the direction of the image content displayed on the display disposed in the first orientation.

* * * * *